(12) United States Patent
Shinn et al.

(10) Patent No.: US 11,950,597 B2
(45) Date of Patent: Apr. 9, 2024

(54) MIXTURES OF BEFLUBUTAMID OR OPTICALLY ENRICHED FORMS THEREOF WITH A SECOND HERBICIDE

(71) Applicant: FMC CORPORATION, Philadelphia, PA (US)

(72) Inventors: Sandra L. Shinn, Columbus, NJ (US); Frank J. D'Amico, Jr., Robbinsville, NJ (US); Joachim Duus, Jaegerspris (DK)

( * ) Notice: Subject to any disclaimer, the term of this patent is extended or adjusted under 35 U.S.C. 154(b) by 0 days.

(21) Appl. No.: 17/871,380

(22) Filed: Jul. 22, 2022

(65) Prior Publication Data

US 2023/0112154 A1 Apr. 13, 2023

Related U.S. Application Data

(63) Continuation of application No. 16/472,045, filed as application No. PCT/US2017/068077 on Dec. 22, 2017, now Pat. No. 11,412,737.

(60) Provisional application No. 62/471,444, filed on Mar. 15, 2017, provisional application No. 62/437,963, filed on Dec. 22, 2016.

(51) Int. Cl.
| | |
|---|---|
| A01N 47/12 | (2006.01) |
| A01N 35/10 | (2006.01) |
| A01N 37/20 | (2006.01) |
| A01N 37/22 | (2006.01) |
| A01N 37/26 | (2006.01) |
| A01N 37/40 | (2006.01) |
| A01N 39/04 | (2006.01) |
| A01N 41/10 | (2006.01) |
| A01N 43/20 | (2006.01) |
| A01N 43/30 | (2006.01) |
| A01N 43/40 | (2006.01) |
| A01N 43/54 | (2006.01) |
| A01N 43/653 | (2006.01) |
| A01N 43/70 | (2006.01) |
| A01N 43/707 | (2006.01) |
| A01N 43/76 | (2006.01) |
| A01N 43/80 | (2006.01) |
| A01N 43/84 | (2006.01) |
| A01N 43/90 | (2006.01) |
| A01N 47/30 | (2006.01) |
| A01N 33/22 | (2006.01) |
| A01N 43/10 | (2006.01) |
| A01N 57/20 | (2006.01) |

(52) U.S. Cl.
CPC ............ *A01N 47/12* (2013.01); *A01N 37/20* (2013.01); *A01N 33/22* (2013.01); *A01N 35/10* (2013.01); *A01N 37/22* (2013.01); *A01N 37/26* (2013.01); *A01N 37/40* (2013.01); *A01N 39/04* (2013.01); *A01N 41/10* (2013.01); *A01N 43/10* (2013.01); *A01N 43/40* (2013.01); *A01N 43/54* (2013.01); *A01N 43/653* (2013.01); *A01N 43/70* (2013.01); *A01N 43/707* (2013.01); *A01N 43/76* (2013.01); *A01N 43/80* (2013.01); *A01N 43/84* (2013.01); *A01N 43/90* (2013.01); *A01N 47/30* (2013.01); *A01N 57/20* (2013.01)

(58) Field of Classification Search
None
See application file for complete search history.

(56) References Cited

U.S. PATENT DOCUMENTS

| | | | | |
|---|---|---|---|---|
| 4,929,273 | A ‡ | 5/1990 | Takematsu | A01N 39/02 504/133 |
| 8,680,121 | B2 ‡ | 3/2014 | Garizi | C05G 3/60 424/408 |
| 9,072,297 | B2 ‡ | 7/2015 | Kikugawa | A01N 43/54 |

(Continued)

FOREIGN PATENT DOCUMENTS

| | | | |
|---|---|---|---|
| CN | 102258021 | ‡ | 11/2011 |
| CN | 102258028 | ‡ | 11/2011 |

(Continued)

OTHER PUBLICATIONS

International Search Report dated Jun. 28, 2018 in copending PCT/US2017/068077 patent application.‡

(Continued)

*Primary Examiner* — Alton N Pryor
(74) *Attorney, Agent, or Firm* — Reed A Coats; FMC Corporation

(57) ABSTRACT

The present application discloses herbicidal compositions containing a first herbicide beflubutamid, or an optically enriched form thereof, and a second herbicide selected from WSSA Group 15 herbicides, WSSA Group 13 herbicides, WSSA Group 27 herbicides, WSSA Group 9 herbicides, WSSA Group 10 herbicides, WSSA Group 22 herbicides, WSSA Group 7 herbicides, WSSA Group 3 herbicides, WSSA Group 14 triazolinone herbicides, WSSA Group 1 cyclohexanedione herbicides, WSSA Group 2 imida-zolinone herbicides, WSSA Group 14 N-phenylphthalimide herbicides, WSSA Group 14 diphenylether herbicides, WSSA Group 14 pyrimidinedione herbicides, WSSA Group 5 1,2,4-triazine herbicides and herbicides selected from metamifop, atrazine, fenoxaprop-P-ethyl, 2,4-D (2,4-dichlorophenoxyacetic acid), florasulam, halosulfuron-methyl and prosulfocarb. The application also discloses a method of controlling undesired vegetation in a crop by applying to the locus of such vegetation a herbicidally effective amount of a herbicidal composition.

14 Claims, 3 Drawing Sheets

(56) References Cited

U.S. PATENT DOCUMENTS

| | | | | |
|---|---|---|---|---|
| 2006/0063677 | A1‡ | 3/2006 | Kotzian | A01N 43/76 504/136 |
| 2014/0106968 | A1‡ | 4/2014 | Taggi | A01N 43/707 544/182 |
| 2014/0323304 | A1‡ | 10/2014 | Sekino | A01N 65/00 504/118 |
| 2017/0042155 | A1* | 2/2017 | Walter | A01N 43/10 |

FOREIGN PATENT DOCUMENTS

| | | | | |
|---|---|---|---|---|
| CN | 102283199 | ‡ | 12/2011 | |
| CN | 102283234 | ‡ | 12/2011 | |
| CN | 102302017 | ‡ | 1/2012 | |
| CN | 102326550 | ‡ | 1/2012 | |
| CN | 102326552 | ‡ | 1/2012 | |
| CN | 102326565 | ‡ | 1/2012 | |
| CN | 102334483 | ‡ | 2/2012 | |
| CN | 102302017 | | 11/2013 | |
| CN | 102326565 | | 11/2013 | |
| CN | 102283234 | | 3/2014 | |
| CN | 102334483 | | 3/2014 | |
| CN | 102258021 | | 4/2014 | |
| CN | 102258028 | | 8/2014 | |
| CN | 105519531 | ‡ | 4/2016 | |
| CN | 102326550 | | 4/2018 | |
| EP | 0239414 | ‡ | 9/1987 | |
| EP | 352992 | ‡ | 11/1991 | |
| EP | 0901753 | ‡ | 3/1999 | |
| JP | H10101504 A | | 4/1998 | |
| JP | H10324603 | ‡ | 12/1998 | |
| JP | H1149609 | ‡ | 2/1999 | |
| JP | 2003212704 | ‡ | 7/2003 | |
| WO | 2004/045284 | | 6/2004 | |
| WO | WO-2004045284 A2 | ‡ | 6/2004 | |
| WO | 20060063834 | | 6/2006 | |
| WO | WO-20060063834 | ‡ | 6/2006 | |
| WO | 20070101587 | | 9/2007 | |
| WO | WO-20070101587 | ‡ | 9/2007 | |
| WO | 20090029518 | | 3/2009 | |
| WO | 2012002096 | | 1/2012 | |
| WO | WO-2012002096 A1 | ‡ | 1/2012 | A01N 43/64 |

OTHER PUBLICATIONS

International Search Report dated Jun. 28, 2018 for PCT/US2017/068077.

\* cited by examiner
‡ imported from a related application

BFL 125 g     125 g + 25 g     FPT 37.5 G

MIXTURES OF BEFLUBUTAMID OR OPTICALLY ENRICHED FORMS THEREOF WITH A SECOND HERBICIDE

CROSS-REFERENCE TO RELATED APPLICATIONS

This application claims the benefit of U.S. Provisional Application No. 62/471,444, filed Mar. 15, 2017, which is incorporated herein by reference in its entirety for all purposes.

TECHNICAL FIELD

This invention is directed to compositions and uses of beflubutamid in combination with a second herbicide, and optionally one or more further herbicides.

BACKGROUND OF THE INVENTION

The protection of crops from undesirable plants known as weeds that can interfere with crop growth and can reduce crop yield has long been a goal in agriculture. One approach that has been taken to achieve this goal is the development of selective herbicides that control weeds without exhibiting unacceptable phytotoxicity to the crops sought to be protected. Herbicides of many types have been disclosed in the literature and a number are in commercial use.

With the development of chemical crop protection and the increasing availability of effective selective herbicides, monocultures of crops have become common. This has led to repeated application of the same or similar herbicides to these crops. In conservation or zero-tillage crop establishment systems, cultivation for weed control has largely been replaced by the use of selective and non-selective herbicides. Thus, two prevailing conditions are present in these cropping systems: (i) the frequent use of a limited range of effective herbicides and (ii) reliance upon these herbicides to the exclusion of other forms of weed control. Where these conditions prevail, herbicide-resistant weeds will increase in frequency (i.e. evolve) if there is heritable variability in response to herbicide application in weed populations and selective mortality from the herbicides.

More recently, crops have been protected from weeds by genetically modifying the crop to be tolerant to a non-selective herbicide (such as glyphosate or glufosinate) and applying such herbicide over the top of such crops. Unfortunately, this latter approach has led to the evolution of herbicide-resistant weeds, with the result that there is still a need for a means of selectively controlling undesirable vegetation in crops.

EP 239 414 A discloses the preparation of beflubutamid and isomers thereof and describes combined use of beflubutamid and thiobencarb.

EP 352 992 A2 discloses herbicidal compositions of beflubutamid and cyanazine or mecoprop.

EP 901 753 A1 discloses herbicidal compositions of beflubutamid in combination with a second herbicide selected from nitrile compounds having herbicidal activity, double phenoxy, amide and cyclohexanedione compounds having controlling activity against gramineous weeds, sulfonylurea compounds having herbicidal activity and diphenyl ether compounds having herbicidal activity.

WO 2007/101587 A1 discloses herbicidal compositions of beflubutamid and (2E)-4-[2-chloro-5-[4-chloro-5-(difluoromethoxy)-1-methyl-1H-pyrazol-3-yl]-4-fluorophenoxy]-3-methoxy-2-butenoic acid methyl ester.

WO 2009/029518 A2 discloses herbicidal compositions of beflubutamid and pyridine and pyrimidine carboxylic acids.

CN 102283234B discloses herbicidal compositions of beflubutamid and the sulfonylureas chlorosulfuron, cyclosulfamuron. CN 105519531A discloses herbicidal compositions of beflubutamid and clodinafop-proparagyl. CN 102258021B discloses herbicidal compositions of beflubutamid and dicamba. CN 102258028B discloses herbicidal compositions of beflubutamid and pyraflufen. CN 102302017B discloses herbicidal compositions of beflubutamid and flumetsulam. CN 102283199B discloses herbicidal compositions of beflubutamid and bromoxynil. CN 102326550B discloses herbicidal compositions of beflubutamid and clopyralid. CN 102326552A discloses herbicidal compositions of beflubutamid and diflufenican. CN 102326565B discloses herbicidal compositions of beflubutamid and pinoxaden. CN 102334483B discloses herbicidal compositions of beflubutamid and terbutryn.

Due to increasing demands for more effective measures for weed control and potential to reduce chemical inputs, there is still a need for effective combinations of herbicides to reduce or nullify the injury of the crop plants by using selective formulations while not affecting the herbicidal action on the weeds to be controlled.

BRIEF SUMMARY OF THE INVENTION

This invention addresses such needs. This invention provides novel compositions for protecting crops from undesirable vegetation (often referred to as "weeds"). The present disclosure is based on the discovery that beflubutamid and a second herbicide (as further specified herein) display an "enhanced" herbicidal effects when applied in combination. In some embodiments, the beflubutamid is in the racemic form. In other embodiments, the beflubutamid is optically enriched, in particular optically enriched with respect to the (−)-enantiomer.

One aspect of the invention is directed to a composition herbicidal containing a first herbicide beflubutamid, and a second herbicide (as further specified herein, and—as will be appreciated—different from the first herbicide beflubutamid); and the use thereof in controlling undesirable vegetation which interfere with crop growth. Another aspect of the invention is directed to a herbicidal composition comprising a first herbicide beflubutamid, at least one second herbicide (as further specified herein), and at least one formulation component selected from formulation agents for emulsifiable concentrate (EC) formulations, formulation agents for suspension concentrate (SC) formulations, and formulation agents for capsule suspension (CS) formulations.

Embodiments include those wherein the second herbicide is selected from WSSA Group 9 herbicides, WSSA Group 13 herbicides, WSSA Group 15 herbicides, WSSA Group 27 herbicides, WSSA Group 10 herbicides, WSSA Group 22 herbicides, WSSA Group 7 herbicides, and WSSA Group 3 herbicides; including isomers and/or $C_{1-8}$-alkyl esters and/or salts thereof.

Other embodiments include those wherein the second herbicide is selected from WSSA Group 14 triazolinone herbicides, WSSA Group 1 cyclohexanedione herbicides, WSSA Group 2 imidazolinone herbicides, WSSA Group 14 N-phenylphthalimide herbicides, WSSA Group 14 diphenylether herbicides, WSSA Group 14 pyrimidinedione herbicides and WSSA Group 5 1,2,4-triazine herbicides; including isomers and/or $C_{1-8}$-alkyl esters and/or salts thereof.

Still other embodiments include those wherein the second herbicide is selected from metamifop, atrazine, fenoxaprop, fenoxaprop-ethyl, fenoxaprop-P, fenoxaprop-P-ethyl, 2,4-D (2,4-dichlorophenoxyacetic acid), florasulam, halosulfuron, halosulfuron-methyl and prosulfocarb; including isomers and/or $C_{1-8}$-alkyl esters and/or salts thereof.

Most preferred embodiments include those wherein the second herbicide is selected from sulfentrazone, pethoxamid, pyroxasulfone, metamifop, clomazone, glyphosate, 2-(2,4-dichlorophenyl)methyl-4,4-dimethyl-3-isoxazolidinone, 4-(4-Fluorophenyl)-6-(2-hydroxy-6-oxocyclohexane-1-carbonyl)-2-methyl-1,2,4-triazine-3,5(2H,4H)-dione, dimethenamid-P, acetochlor, isoxaflutole, mesotrione, topramezone, glufosinate, paraquat, linuron, metribuzin, clethodim, imazethapyr, flumioxazin, fomesafen, oxyfluorfen, saflufenacil, atrazine, fenoxaprop, fenoxaprop-ethyl, fenoxaprop-P, fenoxaprop-P-ethyl, 2,4-D, florasulam, halosulfuron, halosulfuron and prosulfocarb, including isomers and/or $C_{1-8}$-alkyl esters and/or salts thereof.

In another aspect, methods of controlling undesirable vegetation and protecting a crop are described using a herbicidal composition that contains a first herbicide beflubutamid, or an optically enriched form thereof, and at least one second herbicide (as further specified herein, and different from beflubutamid). The method of controlling undesired vegetation in a crop comprises applying to the locus of such vegetation a herbicidally effective amount of the herbicidal composition.

The herbicidal compositions defined herein as well as the herbicidal compositions used in the method defined herein may optionally also include one or more further herbicides.

DETAILED DESCRIPTION OF THE INVENTION

Definitions

Figure 1:
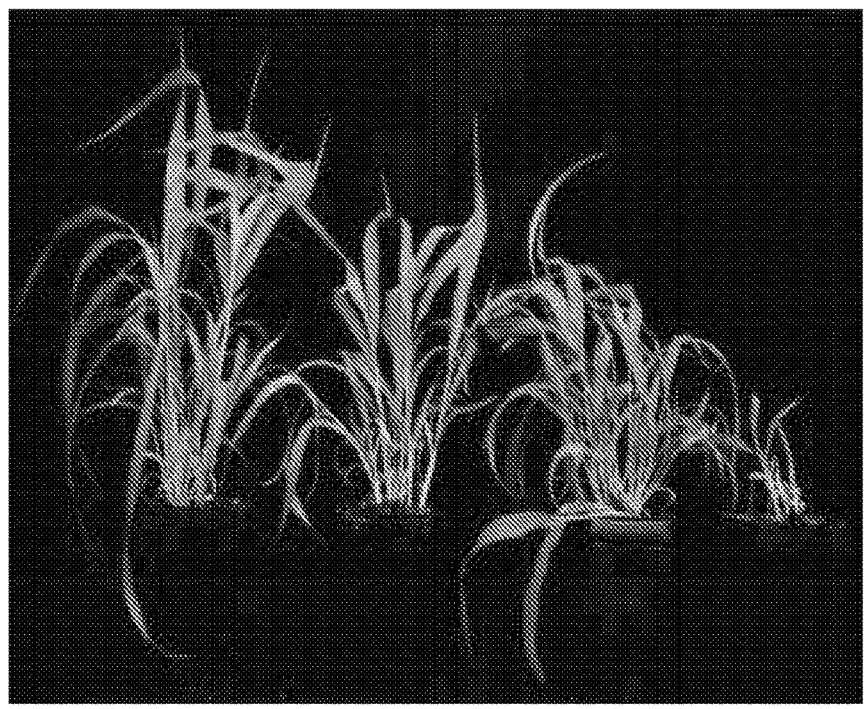
FIG. 1 shows a photograph of green foxtail plants as untreated, treated with beflubutamid, treated with 4-(4-fluorophenyl)-6-(2-hydroxy-6-oxocyclohexane-1-carbonyl)-2-methyl-1,2,4-triazine-3,5(2H,4H)-dione, and treated with a combination of the two herbicides.

As used in this application and unless otherwise indicated the term "herbicide product" refers to a compositional mixture that is produced, sold, or used in a field in order to kill or otherwise inhibit the growth of unwanted plants such as, but not limited to, deleterious or annoying weeds, broadleaf plants, grasses, and sedges; and can be used for crop protection, edifice protection, greenhouse cultures or turf protection. The term "herbicide product" includes the end-use herbicidal product. This composition can be a pure compound, a solution of chemical compounds, a mixture of chemical compounds, an emulsion, a suspension, a solid-liquid mixture, or a liquid-liquid mixture.

The term "herbicide product" also refers to the product that passes through the commercial channels from the manufacturer to the ultimate end user who can either apply the herbicide product to the affected field as sold, or suspend, dissolve or dilute the herbicide product, and/or mix it with other excipients or with other herbicide products.

The term "weed" means and includes any plant that grows where not wanted.

The term "herbicidally effective amount" means an amount necessary to produce an observable herbicidal effect on unwanted plant growth, including one or more of the effects of necrosis, chlorosis or bleaching, death, growth inhibition, reproduction inhibition, inhibition of proliferation, and removal, destruction, or otherwise diminishing the occurrence and activity of unwanted plants.

The definition of the term "herbicidal composition" refers to a herbicide product, and in addition, to any composition that comprises one or more herbicidally active ingredients. This composition can be a solution or a mixture like a suspension, dispersion, or powder as will be described further herein. Further, the definition of the term "herbicidal composition" also refers to a product intended for use in manufacturing, or any product intended for formulation or repackaging into other agricultural products.

The term "herbicidally active ingredient" (or simply "herbicide") means the active ingredient in the herbicidal composition that upon use thereof causes the herbicidal composition to prevent, destroy, repel or mitigate any weed. Other ingredients of the herbicidal composition that are not the herbicidally active ingredients are excipients that aid in forming, storing, or delivering the herbicidally active ingredient to the target. Examples of excipients in the present embodiment include, without limitation, an organic liquid in which herbicidally active ingredient is dissolved, a polyurea shell, a water-soluble polymer, and one or more salts.

The term "first herbicidally active ingredient", or simply "first herbicide", refers to beflubutamid as well as any optically enriched form thereof, and, if so, preferably enriched with respect to the (−)-enantiomer.

The term "second herbicidally active ingredient", or simply "second herbicide", is intended to mean a herbicidically active ingredient being used in addition to beflubutamid (including any optically enriched forms thereof), or combined with beflubutamid (including any optically enriched forms thereof) in a herbicidal composition. It will be appreciated that such a second herbicidically active ingredient is not beflubutamid or an optically enriched form thereof.

The term "further herbicidically active ingredients", or simply "further herbicides", is intended to mean one or more herbicidally active ingredients used in addition to beflubutamid (including any optically enriched forms thereof) and the second herbicide, or combined with beflubutamid (including any optically enriched forms thereof) and the second herbicide in a herbicidal composition. It will be appreciated that such further herbicidically active ingredients are not beflubutamid or an optically enriched form thereof or the second herbicide specified to be combined or used together with beflubutamid.

The term "pre-emergence" refers to application of the herbicidal composition to the soil surface before the emergence of the vegetation from the soil surface (also referred to as BBCH 00-09).

The term "post-emergence" refers to the application of the herbicidal composition on the vegetation (in particular on the leaves thereof) after emergence of the vegetation from the soil surface (also referred to as ≥BBCH 10).

The terms "isomer" and "isomers" refer to stereoisomer like enantiomers and diastereomers.

The term "$C_{1-8}$-alkyl esters" is intended to mean an ester derivative of the herbicide in question, wherein a residue is added to a carboxylic acid group of the herbicide molecule through an ester bond (—C(=O)—O—), and wherein the residue is an alkyl (or cycloalkyl) having one to eight carbon atoms, like methyl, ethyl, 1-propyl, 2-propyl, 1-butyl, 1-methylheptyl (meptyl), etc.

The term "salts" is intended to mean any salt formed between the herbicide molecule and a salt forming compound, like sodium salts, potassium salts, ammonium salts, etc.

The Weed Science Society of America (WSSA) and the Herbicide Resistance Action Committee (HRAC) have jointly developed a classification system for helping identify which herbicides are best suited to combat specific resistant weeds and to support the use of herbicides suitable for resistance management strategies. The herbicides are classified according to their target sites, sites of action, similarity of induced symptoms or chemical classes. As used herein, the term "WSSA Group" followed by a number indicates which WSSA group particular herbicides are included in according to the above-mentioned classification system. Reference herein to WSSA Group herbicides includes any and/or all herbicides listed for that group.

The term "beflubutamid" or the abbreviation "BFL" is used herein to denote the herbicidally active compound 2-[4-fluoro-3-(trifluoromethyl)phenoxy]-N-(phenylmethyl)butanamide, as shown in Formula I below, also referred to as the "first herbicide". Beflubutamid has been described as an herbicidal compound in U.S. Pat. No. 4,929,273.

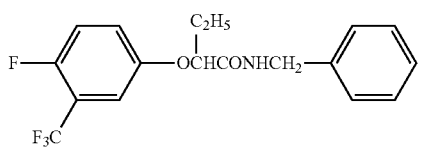

I

It can exist as a racemic mixture of two enantiomers or it can be prepared as a composition enriched in one enantiomer. Unless specified otherwise, the term "beflubutamid" is used herein with reference to the racemate or any non-racemic mixture of the two enantiomers. Preferably when optically enriched, the predominant enantiomer is the (−)-enantiomer, (−)-beflubutamid (more specifically (2S)-2-[4-fluoro-3-(trifluoromethyl)phenoxy]-N-(phenylmethyl)butanamide), which is more herbicidally active than the (+)-enantiomer, (+)-beflubutamid. Optically enriched forms of beflubutamid can be prepared, e.g., as described in EP 239 414 A.

In some particular embodiments, beflubutamid is enriched with respect to the (−)-enantiomer, (2S)-beflubutamid. In these embodiment, the enantiomeric excess (e.e.) is typically ≥60%, such as ≥70%, e.g. ≥80%, in particular ≥85%, especially ≥90%.

Beflubutamid is a WSSA Group 12 herbicide which has been shown to control broadleaf and grass weeds in cereals including wheat, barley, rye and triticale. Also, beflubutamid has been found useful in rice.

Without being bound to any particular theory, it appears that the identified syntergistic effect of the combinations of beflubutamid with second herbicides is a unique property of the WSSA Group 12 herbicide beflubutamid (and optically enriched forms thereof). Reference is made to the comparative studies where the effect of beflubutamid with second herbicides has been compared with the effect of diflufenican (another WSSA Group 12 herbicide) in combination with the same second herbicides. The results in Tables 20, 22, 25, 29-32, 35-38, 40-42 and 44 shows no enhanced effect of the herbicide combinations including diflufenican, whereas the same combinations with beflubutamid show an enhanced effect.

Selected Aspects of the Invention

In the following is described various aspects of the invention. When reference is made to "in combination with", it is intended to refer to a combination of beflubutamid and the specified second herbicide in the herbicidal compositions according to the invention as well as the combined use of beflubutamid and the specified second herbicide in the methods according to the invention.

In the following description of various aspects of the invention, and unless otherwise indicated, beflubutamid refers to beflubutamid as well as an optically enriched form thereof, and, if so, preferably enriched with respect to the (−)-enantiomer.

A. Combination with WSSA Group 15 Herbicides—Mitosis Inhibitors

In one selected aspect of the invention, beflubutamid is in combination with a second herbicide selected from those being classified in WSSA Group 15, i.e. active ingredients believed to act as mitosis inhibitors. This herbicides combination is believed to be particularly useful for the control of weeds selected from cheat grass (BROSE), littleseed canarygrass (PHAMI), common lambsquarters (CHEAL), large crabgrass (DIGSA), green foxtail (SETVI), common waterhemp (AMATA), and Italian ryegrass (LOLMU).

In one embodiment thereof, the WSSA Group 15 herbicide is selected from chloroacetamides, tetrazolinones, oxyacetamides, acetamides and isoxazolines, in particular from chloroacetamides and isoxazolines.

In particular embodiments thereof, the WSSA Group 15 herbicide is selected from acetochlor, thenylchlor, alachlor, diphenamid, butachlor, napropamide, napropamide-M, dimethachlor, naproanilide, dimethenamid, flufenacet, metazachlor, mefenacet, metolachlor, fentrazamide, pethoxamid, anilofos, pretilachlor, cafenstrole, propachlor, piperophos, and propisochlor, including isomers and/or $C_{1-8}$-alkyl esters and/or salts thereof, e.g. napropamide-M, dimethenamid-P, etc. Particularly interesting examples hereof are dimethenamid (including dimethenamid-P), pethoxamid, acetochlor, metolachlor (including S-metolachlor) and pyroxasulfone.

A.1 Beflubutamid and Pethoxamid:

In one variant of this aspect of the invention, beflubutamid is in combination with pethoxamid, a chloroacetamide type WSSA Group 15 herbicide. It has been shown (cf. the results in Tables 5, 6, 13, 16 and 17) that the combination is particularly useful for the control of cheat grass (BROSE), common lambsquarters (CHEAL), common chickweed (STEME), jimsonweed (DATST), wild oat (AVEFA), annual bluegrass (POAAN), barnyardgrass (ECHCG), common ragweed (AMBEL), Chinese sprangletop (LEFCH), goosegrass (ELEIN), green foxtail (SETVI), johnsongrass (SORHA), large crabgrass (DIGSA), and littleseed canarygrass (PHAMI), such as for providing weed control in corn, wheat, soybean, rice and sunflower. In some embodiments, the combination is applied pre-emergence, however it is envisaged that the combination may also be applied post-emergence.

The combination of beflubutamid with pethoxamid further surprisingly exhibits improved crop safety compared to that obtained for the individual active ingredients in respect of crops selected from barley, corn, rice and wheat.

In the above variants and embodiments and upon application thereof (see below), beflubutamid and pethoxamid are typically combined in a relative ratio of 1:0.5 to 1:60, such as 1:0.9 to 1:35, for example 1:1.5 to 1:20.

Hence, in interesting embodiments, the invention also provides a method of controlling undesired vegetation (for example the weed(s) mentioned above) in a crop (for example the crops mentioned above), wherein the method comprises the step of applying to the locus of such vegetation a herbicidally effective amount of a composition comprising beflubutamid in combination with pethoxamid. The application of the composition to the locus is typically conducted pre-emergence. In some embodiments, beflubutamid is applied in an amount of 30-400 g ai/ha, such as 45-320 g ai/ha, for example 60-250 g ai/ha, whereas pethoxamid is applied in an amount of 200-1900 g ai/ha, such as 300-1500 g ai/ha, for example 400-1200 g ai/ha. In some embodiments, the two active ingredients are applied in the above-mentioned relative ratios.

A.2 Beflubutamid and Dimethenamid-P:

In another variant beflubutamid is in combination with dimethenamid, in particular dimethenamid-P (a single isomer dimethenamid), a chloroacetamide type WSSA Group 15 herbicide. It has been shown (cf. the results in Tables 21 and 22) that the combination is particularly useful for the control of cheat (BROSE), wild proso millet (PANMI), common lambsquaters (CHEAL), and large crabgrass (DIGSA), in particular for control of large crabgrass (DIGSA), such as for providing weed control in crops selected from corn, soybean and sunflower. In some embodiments, the combination is applied pre-emergence, however it is envisaged that the combination may also be applied post-emergence.

In the above variants and embodiments and upon application thereof (see below), beflubutamid and dimethenamid-P are typically combined in a relative ratio of 1:0.05 to 1:60, such as 1:0.1 to 1:35, for example 1:0.2 to 1:20.

Hence, in interesting embodiments, the invention also provides a method of controlling undesired vegetation (for example the weed(s) mentioned above) in a crop (for example the crops mentioned above), wherein the method comprises the step of applying to the locus of such vegetation a herbicidally effective amount of a composition comprising beflubutamid in combination with dimethenamid-P. The application of the composition to the locus is typically conducted pre-emergence. In some embodiments, beflubutamid is applied in an amount of 30-400 g ai/ha, such as 45-320 g ai/ha, for example 60-250 g ai/ha, whereas dimethenamid-P is applied in an amount of 25-1900 g ai/ha, such as 35-1500 g ai/ha, for example 50-1200 g ai/ha. In some embodiments, the two active ingredients are applied in the above-mentioned relative ratios.

A.3 Beflubutamid and Acetochlor:

In another variant beflubutamid is in combination with acetochlor, a chloracetamide type WSSA Group 15 herbicide. It has been shown (cf. the results in Tables 19 and 20) that the combination is particularly useful for the control of common lambsquaters (CHEAL) and barnyardgrass (ECHCG), such as for providing weed control in crops selected from corn and soybean. In some embodiments, the combination is applied pre-emergence, however it is envisaged that the combination may also be applied post-emergence.

In the above variants and embodiments and upon application thereof (see below), beflubutamid and acetochlor are typically combined in a relative ratio of 1:0.1 to 1:100, such as 1:0.2 to 1:60, for example 1:0.4 to 1:35.

Hence, in interesting embodiments, the invention also provides a method of controlling undesired vegetation (for example the weed(s) mentioned above) in a crop (for example the crops mentioned above), wherein the method comprises the step of applying to the locus of such vegetation a herbicidally effective amount of a composition comprising beflubutamid in combination with acetochlor. The application of the composition to the locus is typically conducted pre-emergence. In some embodiments, beflubutamid is applied in an amount of 30-400 g ai/ha, such as 45-320 g ai/ha, for example 60-250 g ai/ha, whereas acetochlor is applied in an amount of 50-3200 g ai/ha, such as 75-2500 g ai/ha, for example 100-2000 g ai/ha. In some embodiments, the two active ingredients are applied in the above-mentioned relative ratios.

A.4 Beflubutamid and S-Metolachlor:

In another variant beflubutamid is in combination with metolachlor, in particular the isomer S-metolachlor (to which will be referred to in the following), a chloroacetamide type WSSA Group 15 herbicide. It has been shown (cf. the results in Table 21) that the combination is particularly useful for the control of barnyardgrass (ECHCG), wild proso millet (PANMI), common waterhemp (AMATA), and Italian ryegrass (LOLMU), in particular for control of common waterhemp (AMATA), and Italian ryegrass (LOLMU), such as for providing weed control in crops selected from corn, soybean and sunflower. In some embodiments, the combination is applied pre-emergence, however it is envisaged that the combination may also be applied post-emergence.

In the above variants and embodiments and upon application thereof (see below), beflubutamid and S-metolachlor are typically combined in a relative ratio of 1:0.06 to 1:60, such as 1:0.1 to 1:35, for example 1:0.15 to 1:20.

Hence, in interesting embodiments, the invention also provides a method of controlling undesired vegetation (for example the weed(s) mentioned above) in a crop (for example the crops mentioned above), wherein the method comprises the step of applying to the locus of such vegetation a herbicidally effective amount of a composition comprising beflubutamid in combination with S-metolachlor. The application of the composition to the locus is typically conducted pre-emergence. In some embodiments, beflubutamid is applied in an amount of 30-400 g ai/ha, such as 45-320 g ai/ha, for example 60-250 g ai/ha, whereas S-metolachlor is applied in an amount of 25-1900 g ai/ha, such as 33-1500 g ai/ha, for example 45-1200 g ai/ha. In some embodiments, the two active ingredients are applied in the above-mentioned relative ratios.

A.5 Beflubutamid and Pyroxasulfone:

In another variant beflubutamid is in combination with pyroxasulfone, a isoxazoline type WSSA Group 15 herbicide. It has been shown (cf. the results in Tables 5, 10-13, and 16-17) that the combination is particularly useful for the control of common chickweed (STEME), jimsonweed (DATST), *kochia* (KCHSC), barnyardgrass (ECHCG), Italian ryegrass (LOLMU), *Raphanus sativus* L. (RAPSN), wild oat (AVEFA), annual bluegrass (POAAN), green foxtail (SETVI), large crabgrass (DIGSA), redrice (ORYSA), redroot pigweed (AMARE) and shattercane (SOBIA), in particular for control of redroot pigweed (AMARE), shattercane (SOBIA), jimsonweed (DATST), *kochia* (KCHSC), barnyardgrass (ECHCG), Italian ryegrass (LOLMU), and wild oat (AVEFA), such as for providing weed control in crops selected from corn, wheat and soybean. In some embodiments, the combination is applied pre-emergence, however it is envisaged that the combination may also be applied post-emergence.

The combination of beflubutamid with pyroxasulfone further surprisingly exhibits improved crop safety compared to that obtained for the individual active ingredients in respect of crops selected from wheat and rice.

In the above variants and embodiments and upon application thereof (see below), beflubutamid or an optically enriched form thereof and pyroxasulfone are typically combined in a relative ratio of 1:0.06 to 1:6, such as 1:0.1 to 1:4, for example 1:0.15 to 1:2.

Hence, in interesting embodiments, the invention also provides a method of controlling undesired vegetation (for example the weed(s) mentioned above) in a crop (for example the crops mentioned above), wherein the method comprises the step of applying to the locus of such vegetation a herbicidally effective amount of a composition comprising beflubutamid or an optically enriched form thereof in combination with pyroxasulfone. The application of the composition to the locus is typically conducted pre-emergence. In some embodiments, beflubutamid is applied in an amount of 30-400 g ai/ha, such as 45-320 g ai/ha, for example 60-250 g ai/ha, whereas pyroxasulfone is applied in an amount of 20-200 g ai/ha, such as 30-150 g ai/ha, for example 45-120 g ai/ha. In some embodiments, the two active ingredients are applied in the above-mentioned relative ratios.

B. Combination with WSSA Group 13 Herbicides—Diterpene Synthesis Inhibitors

In another selected aspect of the invention, beflubutamid is in combination with a second herbicide selected from those being classified in WSSA Group 13, i.e. active ingredients believed to act as diterpene synthesis inhibitors. This herbicides combination is believed to be particularly useful for the control of weeds selected from redroot pigweed (AMARE), velvetleaf (ABUTH), barnyardgrass (ECHCG), goosegrass (ELEIN) and johnsongrass (SORHA).

In one embodiment thereof, the WSSA Group 13 herbicide is selected from isoxazolidinones, ureas and diphenyl ethers, in particular from isoxaxolidinones.

In particular embodiments thereof, the WSSA Group 13 herbicide is selected from clomazone, 2-(2,4-dichlorophenyl)methyl-4,4-dimethyl-3-isoxazolidinone, 2-(2,5-dichlorophenyl)methyl-4,4-dimethyl-3-isoxazolidinone, flumeturon, and aclonifen, including isomers and/or $C_{1-8}$-alkyl esters and/or salts thereof. Particularly interesting examples hereof are clomazone, 2-(2,4-dichlorophenyl)methyl-4,4-dimethyl-3-isoxazolidinone, and 2-(2,5-dichlorophenyl)methyl-4,4-dimethyl-3-isoxazolidinone, more particularly clomazone and 2-(2,4-dichlorophenyl)methyl-4,4-dimethyl-3-isoxazolidinone.

B.1 Beflubutamid and Clomazone:

In one variant of this aspect of the invention, beflubutamid is in combination with clomazone, an isoxazolidone type WSSA Group 13 herbicide. It has been shown (cf. the results in Tables 10 (CLZ) and 24) that the combination is particularly useful for the control of Italian ryegrass (LOLMU), redroot pigweed (AMARE), velvetleaf (ABUTH), barnyardgrass (ECHCG), goosegrass (ELEIN) and johnsongrass (SORHA), in particular for control of Italian ryegrass (LOLMU), redroot pigweed (AMARE), velvetleaf (ABUTH), and barnyardgrass (ECHCG), such as for providing weed control in crops selected from corn, soybean, rice and sunflower. In some embodiments, the combination is applied pre-emergence, however it is envisaged that the combination may also be applied post-emergence.

In the above variants and embodiments and upon application thereof (see below), beflubutamid and clomazone are typically combined in a relative ratio of 1:0.04 to 1:40, such as 1:0.06 to 1:25, for example 1:0.12 to 1:15.

Hence, in interesting embodiments, the invention also provides a method of controlling undesired vegetation (for example the weed(s) mentioned above) in a crop (for example the crops mentioned above), wherein the method comprises the step of applying to the locus of such vegetation a herbicidally effective amount of a composition comprising beflubutamid in combination with clomazone. The application of the composition to the locus is typically conducted pre-emergence. In some embodiments, beflubutamid is applied in an amount of 30-400 g ai/ha, such as 45-320 g ai/ha, for example 60-250 g ai/ha, whereas clomazone is applied in an amount of 15-1400 g ai/ha, such as 20-1100 g ai/ha, for example 30-850 g ai/ha. In some embodiments, the two active ingredients are applied in the above-mentioned relative ratios.

B.2 Beflubutamid and 2-(2,4-dichlorophenyl)methyl-4,4-dimethyl-3-isoxazolidinone (DCI):

In one variant of this aspect of the invention, beflubutamid is in combination with 2-(2,4-dichlorophenyl)methyl-4,4-dimethyl-3-isoxazolidinone (DCI in the following), an isoxazolidone type WSSA Group 13 herbicide. It has been shown (cf. the results in Tables 8-11, 13-14 and 16-17 (DCI) and FIG. 2) that the combination is particularly useful for the control of annual bluegrass (POAAN), Italian ryegrass (LOLMU), shattercane (SOBIA), wild oat (AVEFA), cheat grass (BROSE), johnsongrass (SORHA), blackgrass (ALOMY), common lambsquarters (CHEAL), green foxtail (SETVI), Palmer amaranth (AMAPA), yellow foxtail (SETLU), herbicide resistant blackgrass strain (HR3), barnyardgrass (ECHCG), large crabgrass (DIGSA), Chinese sprangletop (LEFCH), Common cocklebur (XANST), common ragweed (AMBEL), goosegrass (ELEIN), littleseed canarygrass (PHAMI), Marestail (horsetail) (ERICA), and rice flatsedge (CYPIR), in particular for control of Italian ryegrass (LOLMU), wild oat (AVEFA), Palmer amaranth (AMAPA), and rice flatsedge (CYPIR), such as for providing weed control in crops selected from corn, wheat, barley, soybean, rice and sunflower. In some embodiments, the combination is applied pre-emergence, however it is envisaged that the combination may also be applied post-emergence.

The combination of beflubutamid with DCI further surprisingly exhibits improved crop safety compared to that obtained for the individual active ingredients in respect of crops selected from oil seed rape and wheat.

In the above variants and embodiments and upon application thereof (see below), beflubutamid and DCI are typically combined in a relative ratio of 1:0.02 to 1:15, such as 1:0.04 to 1:9, for example 1:0.08 to 1:5.

Hence, in interesting embodiments, the invention also provides a method of controlling undesired vegetation (for example the weed(s) mentioned above) in a crop (for example the crops mentioned above), wherein the method comprises the step of applying to the locus of such vegetation a herbicidally effective amount of a composition comprising beflubutamid in combination with DCI. The application of the composition to the locus is typically conducted pre-emergence. In some embodiments, beflubutamid is applied in an amount of 30-400 g ai/ha, such as 45-320 g ai/ha, for example 60-250 g ai/ha, whereas DCI is applied in an amount of 10-500 g ai/ha, such as 15-400 g ai/ha, for example 20-300 g ai/ha. In some embodiments, the two active ingredients are applied in the above-mentioned relative ratios.

C. Combination with WSSA Group 27 Herbicides—Inhibitors of 4-hydroxyphenyl-pyruvate-dioxygenase (4-HPPD)

In another selected aspect of the invention, beflubutamid is in combination with a second herbicide selected from those being classified in WSSA Group 27, i.e. active ingredients believed to act as inhibitors of 4-hydroxyphenyl-pyruvate-dioxygenase (4-HPPD).

This herbicides combination is believed to be particularly useful for the control of weeds selected from redroot pigweed (AMARE), Palmer amaranth (AMAPA), large crabgrass (DIGSA), velvetleaf (ABUTH), goosegrass (ELEIN), redrice (ORYSA), and Volunteer Canola (BRSSN).

In one embodiment thereof, the WSSA Group 27 herbicide is selected from include pyrazoles, isoxazoles, benzoylbicyclooctanediones, and triketones, in particular from isoxazoles, triketones and pyrazoles.

In particular embodiments thereof, the WSSA Group 27 herbicide is selected from benzofenap, benzobicyclon, isoxaflutole, mesotrione, pyrazolynate, pyrazoxyfen, sulcotrione, tembotrione, topramezone and 4-(4-fluorophenyl)-6-(2-hydroxy-6-oxo-1-cyclohexen-1-yl)carbonyl)-2-methyl-1,2,4-triazine-3,5(2H,4H)-dione, including isomers and/or $C_{1-8}$-alkyl esters and/or salts thereof. Particularly interesting examples hereof isoxaflutole, mesotrione and topramezone.

C.1 Beflubutamid and Isoxaflutole:

In one variant of this aspect of the invention, beflubutamid is in combination with isoxaflutole, an isoxazole type WSSA Group 27 herbicide. It has been shown (cf. the results in Tables 26 and 27) that the combination is particularly useful for the control of shattercane (SOBIA), such as for providing weed control in crops selected from corn. In some embodiments, the combination is applied pre-emergence, and in other embodiments the combination is applied post-emergence.

In the above variants and embodiments and upon application thereof (see below), beflubutamid and isoxaflutole are typically combined in a relative ratio of 1:0.01 to 1:6, such as 1:0.02 to 1:3.5, for example 1:0.04 to 1:2.

Hence, in interesting embodiments, the invention also provides a method of controlling undesired vegetation (for example the weed(s) mentioned above) in a crop (for example the crops mentioned above), wherein the method comprises the step of applying to the locus of such vegetation a herbicidally effective amount of a composition comprising beflubutamid in combination with isoxaflutole. The application of the composition to the locus is may be conducted pre-emergence or post-emergence. In some embodiments, beflubutamid is applied in an amount of 30-400 g ai/ha, such as 45-320 g ai/ha, for example 60-250 g ai/ha, whereas isoxaflutole is applied in an amount of 5-200 g ai/ha, such as 7-150 g ai/ha, for example 10-120 g ai/ha. In some embodiments, the two active ingredients are applied in the above-mentioned relative ratios.

C.2 Beflubutamid and Mesotrione:

In one variant of this aspect of the invention, beflubutamid is in combination with mesotrione, a triketone type WSSA Group 27 herbicide. It has been shown (cf. the results in Tables 28 and 29) that the combination is particularly useful for the control of large crabgrass (DIGSA), barnyardgrass (ECHCG) and goosegrass (ELEIN), such as for providing weed control in crops selected from corn. In some embodiments, the combination is applied pre-emergence, and in other embodiments the combination is applied post-emergence.

In the above variants and embodiments and upon application thereof (see below), beflubutamid and mesotrione are typically combined in a relative ratio of 1:0.03 to 1:10, such as 1:0.05 to 1:6, for example 1:0.1 to 1:4.

Hence, in interesting embodiments, the invention also provides a method of controlling undesired vegetation (for example the weed(s) mentioned above) in a crop (for example the crops mentioned above), wherein the method comprises the step of applying to the locus of such vegetation a herbicidally effective amount of a composition comprising beflubutamid in combination with mesotrione. The application of the composition to the locus is conducted pre-emergence or post-emergence. In some embodiments, beflubutamid is applied in an amount of 30-400 g ai/ha, such as 45-320 g ai/ha, for example 60-250 g ai/ha, whereas mesotrione is applied in an amount of 10-350 g ai/ha, such as 15-250 g ai/ha, for example 25-120 g ai/ha. In some embodiments, the two active ingredients are applied in the above-mentioned relative ratios.

C.3 Beflubutamid and Topramezone:

In one variant of this aspect of the invention, beflubutamid is in combination with topramezone, a pyrazole type WSSA Group 27 herbicide. It has been shown (cf. the results in Table 31) that the combination is particularly useful for the control of common waterhemp (AMATA) and common ragweed (AMBEL), such as for providing weed control in crops selected from corn. In some embodiments, the combination is applied pre-emergence, and in other embodiments the combination is applied post-emergence.

In the above variants and embodiments and upon application thereof (see below), beflubutamid and topramezone are typically combined in a relative ratio of 1:0.002 to 1:1.5, such as 1:0.006 to 1:1, for example 1:0.01 to 1:0.5.

Hence, in interesting embodiments, the invention also provides a method of controlling undesired vegetation (for example the weed(s) mentioned above) in a crop (for example the crops mentioned above), wherein the method comprises the step of applying to the locus of such vegetation a herbicidally effective amount of a composition comprising beflubutamid in combination with topramezone. The application of the composition to the locus is conducted pre-emergence or post-emergence. In some embodiments, beflubutamid is applied in an amount of 30-400 g ai/ha, such as 45-320 g ai/ha, for example 60-250 g ai/ha, whereas topramezone is applied in an amount of 1-40 g ai/ha, such as 2-35 g ai/ha, for example 3-25 g ai/ha. In some embodiments, the two active ingredients are applied in the above-mentioned relative ratios.

C.4 Beflubutamid and 4-(4-fluorophenyl)-6-(2-hydroxy-6-oxo-1-cyclohexen-1-yl)carbonyl)-2-methyl-1,2,4-triazine-3,5(2H,4H)-dione (FPT)

In one variant of this aspect of the invention, beflubutamid or an optically enriched form thereof is in combination with 4-(4-fluorophenyl)-6-(2-hydroxy-6-oxo-1-cyclohexen-1-yl) carbonyl)-2-methyl-1,2,4-triazine-3,5(2H,4H)-dione (hereinafter FPT). It has been shown (cf. the results in Tables 7, 10, 11 and 13 and FIGS. 1 and 3) that the combination is particularly useful for the control of barnyardgrass (ECHCG), common chickweed (STEME), field bindweed (CONAR), Italian ryegrass (LOLMU), *kochia* (KCHSC), tall morningglory (BHPBU), wild oat (AVEFA), yellow nutsedge (CYPES), green foxtail (SETVI), blackgrass (ALOMY), and herbicide resistant blackgrass strains (HR1, HR3), in particular for control of Italian ryegrass (LOLMU), *kochia* (KCHSC) and yellow nutsedge (CYPES), such as for providing weed control in crops selected from corn and cereals. In some embodiments, the combination is applied pre-emergence, and in other embodiments the combination is applied post-emergence.

In the above variants and embodiments and upon application thereof (see below), beflubutamid or an optically enriched form thereof and FPT are typically combined in a relative ratio of 1:0.002 to 1:1.3, such as 1:0.006 to 1:1, for example 1:0.012 to 1:0.5.

Hence, in interesting embodiments, the present invention also provides a method of controlling undesired vegetation (for example the weed(s) mentioned above) in a crop (for example the crops mentioned above), wherein the method comprises the step of applying to the locus of such vegetation a herbicidally effective amount of a composition comprising beflubutamid or an optically enriched form thereof in combination with FPT. The application of the composition to the locus is conducted pre-emergence or post-emergence. In some embodiments, beflubutamid is applied in an amount of 30-400 g ai/ha, such as 45-320 g ai/ha, for example 60-250 g ai/ha, whereas FPT is applied in an amount of 2-80 g ai/ha, such as 3-70 g ai/ha, for example 5-50 g ai/ha. In some embodiments, the two active ingredients are applied in the above-mentioned relative ratios.

D. Combination with WSSA Group 9 Herbicides—Inhibitors of EPSP Synthase

In another selected aspect of the invention, beflubutamid is in combination with a second herbicide selected from those being classified in WSSA Group 9, i.e. active ingredients believed to act as inhibitors of 5-enolpyruvyl-shikimate-3-phosphate synthase (EPSPS). This herbicides combination is believed to be particularly useful for the control of weeds selected from Group 9 resistant weeds and susceptible Palmer amaranth (AMAPA).

In one embodiment thereof, the WSSA Group 9 herbicide is selected from glycines.

In particular embodiments thereof, the WSSA Group 9 herbicide is selected from glyphosate.

D.1 Beflubutamid and Glyphosate:

In one variant of this aspect of the invention, beflubutamid is in combination with glyphosate, glycine type WSSA Group 9 herbicide. It has been shown (cf. the results in Tables 15 and 25) that the combination is particularly useful for the control of redroot pigweed (AMARE), Canada thistle (CIRAR), glyphosate-resistant marestail strain (ERICA1) and glyphosate-resistant Palmer amaranth strain (AMAPA1), in particular for control of Canada thistle (CIRAR), glyphosate-resistant marestail strain (ERICA1) and glyphosate-resistant Palmer amaranth strain (AMAPA1), such as for providing weed control in crops selected from corn, wheat, barley, soybean, rice and sunflower. In some embodiments, the combination is applied post-emergence, however it is envisaged that the combination may also be applied pre-emergence.

In the above variants and embodiments and upon application thereof (see below), beflubutamid and glyphosate are typically combined in a relative ratio of 1:0.15 to 1:100, such as 1:0.3 to 1:60, for example 1:0.5 to 1:35.

Hence, in interesting embodiments, the invention also provides a method of controlling undesired vegetation (for example the weed(s) mentioned above) in a crop (for example the crops mentioned above), wherein the method comprises the step of applying to the locus of such vegetation a herbicidally effective amount of a composition comprising beflubutamid in combination with glyphosate. The application of the composition to the locus is typically conducted post-emergence. In some embodiments, beflubutamid is applied in an amount of 30-400 g ai/ha, such as 45-320 g ai/ha, for example 60-250 g ai/ha, whereas glyphosate is applied in an amount of 75-3000 g ai/ha, such as 100-2500 g ai/ha, for example 140-2000 g ai/ha. In some embodiments, the two active ingredients are applied in the above-mentioned relative ratios.

E. Combination with WSSA Group 10 Herbicides—Inhibitors of Glutamine Synthetase

In another selected aspect of the invention, beflubutamid is in combination with a second herbicide selected from those being classified in WSSA Group 10, i.e. active ingredients believed to act as inhibitors of glutamine synthetase. This herbicides combination is believed to be particularly useful for the control of weeds selected from field bindweed (CONAR), barnyardgrass (ECHCG), common ragweed (AMBEL) and velvetleaf (ABUTH).

In one embodiment thereof, the WSSA Group 10 herbicide is selected from glycines.

In particular embodiments thereof, the WSSA Group 10 herbicide is selected from glufosinate, including isomers and/or $C_{1-8}$-alkyl esters and/or salts thereof, e.g. glufosinate-ammonium, etc. A particularly interesting example hereof is glufosinate-ammonium.

E.1 Beflubutamid and Glufosinate:

In one variant of this aspect of the invention, beflubutamid is in combination with glufosinate (e.g. in the form of glufosinate-ammonium), a phosphinic acid type WSSA Group 10 herbicide. It has been shown (cf. the results in Table 30) that the combination is particularly useful for the control of Canada thistle (CIRAR), field bindweed (CONAR), barnyardgrass (ECHCG), common ragweed (AMBEL) and velvetleaf (ABUTH), in particular for control of common ragweed (AMBEL) and velvetleaf (ABUTH), such as for providing weed control in crops selected from corn and soybean. In some embodiments, the combination is applied post-emergence, however it is envisaged that the combination may also be applied pre-emergence.

In the above variants and embodiments and upon application thereof (see below), beflubutamid and glufosinate are typically combined in a relative ratio of 1:0.06 to 1:40, such as 1:0.1 to 1:25, for example 1:0.2 to 1:15.

Hence, in interesting embodiments, the invention also provides a method of controlling undesired vegetation (for example the weed(s) mentioned above) in a crop (for example the crops mentioned above), wherein the method comprises the step of applying to the locus of such vegetation a herbicidally effective amount of a composition comprising beflubutamid in combination with glufosinate. The application of the composition to the locus is typically conducted post-emergence. In some embodiments, beflubutamid is applied in an amount of 30-400 g ai/ha, such as 45-320 g ai/ha, for example 60-250 g ai/ha, whereas glufosinate is applied in an amount of 25-1250 g ai/ha, such as 35-1000 g ai/ha, for example 50-800 g ai/ha. In some embodiments, the two active ingredients are applied in the above-mentioned relative ratios.

F. Combination with WSSA Group 22 Herbicides—Photosystem I Electron Diverters

In another selected aspect of the invention, beflubutamid is in combination with a second herbicide selected from those being classified in WSSA Group 22, i.e. active ingredients believed to act as photosystem I electron diverters. This herbicides combination is believed to be particularly useful for the control of weeds selected from barnyardgrass (ECHCG), field bindweed (CONAR), common ragweed (AMBEL) and velvetleaf (ABUTH).

In one embodiment thereof, the WSSA Group 22 herbicide is selected from bipyridyliums.

In particular embodiments thereof, the WSSA Group 22 herbicide is selected from diquat and paraquat, including isomers and/or $C_{1-8}$-alkyl esters and/or salts thereof. A particularly interesting example hereof is paraquat.

F.1 Beflubutamid and Paraquat:

In one variant of this aspect of the invention, beflubutamid is in combination with paraquat, a bipyridylium type WSSA Group 22 herbicide. It has been shown (cf. the results in Table 30) that the combination is particularly useful for the control of field bindweed (CONAR), common ragweed (AMBEL) and velvetleaf (ABUTH), in particular for control of field bindweed (CONAR) and velvetleaf (ABUTH), such as for providing weed control in crops selected from corn, wheat, barley, soybean, rice and sunflower. In some embodiments, the combination is applied post-emergence, however it is envisaged that the combination may also be applied pre-emergence.

In the above variants and embodiments and upon application thereof (see below), beflubutamid and paraquat are typically combined in a relative ratio of 1:0.04 to 1:40, such as 1:0.06 to 1:25, for example 1:0.12 to 1:15.

Hence, in interesting embodiments, the invention also provides a method of controlling undesired vegetation (for example the weed(s) mentioned above) in a crop (for example the crops mentioned above), wherein the method comprises the step of applying to the locus of such vegetation a herbicidally effective amount of a composition comprising beflubutamid in combination with paraquat. The application of the composition to the locus is typically conducted post-emergence. In some embodiments, beflubutamid is applied in an amount of 30-400 g ai/ha, such as 45-320 g ai/ha, for example 60-250 g ai/ha, whereas paraquat is applied in an amount of 15-1250 g ai/ha, such as 20-1000 g ai/ha, for example 30-800 g ai/ha. In some embodiments, the two active ingredients are applied in the above-mentioned relative ratios.

G. Combination with WSSA Group 7 Herbicides—Inhibitors of Photosynthesis at Photosystem II Site a (Different Mode-of-Action than WSSA Group 5)

In another selected aspect of the invention, beflubutamid is in combination with a second herbicide selected from those being classified in WSSA Group 7, i.e. active ingredients believed to act as inhibitors of photosynthesis at photosystem II site A (different mode-of-action than WSSA Group 5). This herbicides combination is believed to be particularly useful for the control of weeds selected from common lambsquarters (CHEAL), redroot pigweed (AMARE), barnyardgrass (ECHCG) and common chickweed (STEME).

In one embodiment thereof, the WSSA Group 7 herbicide is selected from amides and ureas, in particular from ureas.

In particular embodiments thereof, the WSSA Group 7 herbicide is selected from chlorotoluron, dimefuron, diuron, fluometuron, isoproturon, linuron, methibenzuron, monolinuron, propanil, siduron and tebuthiuron, including isomers and/or $C_{1-8}$-alkyl esters and/or salts thereof. Particularly interesting examples hereof are diuron and linuron.

G.1 Beflubutamid and Linuron:

In one variant of this aspect of the invention, beflubutamid is in combination with linuron, a urea type WSSA Group 7 herbicide. It has been shown (cf. the results in Table 32) that the combination is particularly useful for the control of common lambsquarters (CHEAL), redroot pigweed (AMARE), barnyardgrass (ECHCG) and common chickweed (STEME), in particular for control of barnyardgrass (ECHCG) and common chickweed (STEME), such as for providing weed control in crops selected from soybean. In some embodiments, the combination is applied pre-emergence, however it is envisaged that the combination may also be applied post-emergence.

In the above variants and embodiments and upon application thereof (see below), beflubutamid and linuron are typically combined in a relative ratio of 1:0.06 to 1:40, such as 1:0.1 to 1:25, for example 1:0.2 to 1:15.

Hence, in interesting embodiments, the invention also provides a method of controlling undesired vegetation (for example the weed(s) mentioned above) in a crop (for example the crops mentioned above), wherein the method comprises the step of applying to the locus of such vegetation a herbicidally effective amount of a composition comprising beflubutamid in combination with linuron. The application of the composition to the locus is typically conducted pre-emergence. In some embodiments, beflubutamid is applied in an amount of 30-400 g ai/ha, such as 45-320 g ai/ha, for example 60-250 g ai/ha, whereas linuron is applied in an amount of 25-1250 g ai/ha, such as 35-1000 g ai/ha, for example 50-800 g ai/ha. In some embodiments, the two active ingredients are applied in the above-mentioned relative ratios.

H. Combination with WSSA Group 3 Herbicides—Inhibitors of Microtubule Assembly

In another selected aspect of the invention, beflubutamid or an optically enriched form thereof (if so, preferably enriched with respect to the (−)-enantiomer) is in combination with a second herbicide selected from those being classified in WSSA Group 3, i.e. active ingredients believed to act as inhibitors of microtubule assembly. This herbicides combination is believed to be particularly useful for the control of weeds selected from blackgrass (ALOMY) and barnyardgrass (ECHCG).

In one embodiment thereof, the WSSA Group 3 herbicide is selected from dinitroanilines, benzoic acids, pyridines, and benzamides, in particular from dinitroanilines.

In particular embodiments thereof, the WSSA Group 3 herbicide is selected from trifluralin, pendimethalin, benefin, DCPA, dithiopyr, ethalfluralin, oryzalin, prodiamine, pronamide and thiazopyr, as well as isomer and $C_{1-4}$-alkyl esters thereof. Particularly interesting examples hereof are trifluralin and pendimethalin.

H.1. Beflubutamid and Trifluralin:

In one variant of this aspect of the invention, beflubutamid or an optically enriched form thereof is in combination with trifluralin. It has been shown (cf. the results in Tables 47 and 48) that the combination is particularly useful for the control of blackgrass (ALOMY) and barnyardgrass (ECHCG), in particular for control of blackgrass (ALOMY), such as for providing weed control in crops selected from corn and soybean. In some embodiments, the combination is applied pre-emergence, however it is envisaged that the combination may also be applied post-emergence.

In the above variants and embodiments and upon application thereof (see below), beflubutamid or an optically enriched form thereof and trifluralin are typically combined in a relative ratio of 1:0.1 to 1:60, such as 1:0.2 to 1:35, for example 1:0.4 to 1:20.

Hence, in interesting embodiments, the present invention also provides a method of controlling undesired vegetation (for example the weed(s) mentioned above) in a crop (for example the crops mentioned above), wherein the method comprises the step of applying to the locus of such vegetation a herbicidally effective amount of a composition comprising beflubutamid or an optically enriched form thereof in combination with trifluralin. The application of the composition to the locus is typically conducted pre-emergence. In some embodiments, beflubutamid is applied in an amount of 30-400 g ai/ha, such as 45-320 g ai/ha, for example 60-250 g ai/ha, whereas trifluralin is applied in an amount of 50-1900 g ai/ha, such as 75-1500 g ai/ha, for example 100-1200 g ai/ha. In some embodiments, the two active ingredients are applied in the above-mentioned relative ratios.

I. Combination with WSSA Group 14 Triazolinone Herbicides

In another selected aspect of the invention, beflubutamid is in combination with a second herbicide selected from triazolinone herbicides being classified in WSSA Group 14.

This herbicides combination is believed to be particularly useful for the control of weeds selected from common chickweed (STEME), common ragweed (AMBEL) and common waterhemp (AMATA).

In particular embodiments thereof, the WSSA Group 14 triazolinone herbicide is selected from sulfentrazone and carfentrazone, including isomers and/or $C_{1-8}$-alkyl esters and/or salts thereof, e.g. carfentrazone-ethyl, etc. Particularly interesting examples hereof sulfentrazone.

I.1 Beflubutamid and Sulfentrazone:

In one variant of this aspect of the invention, beflubutamid is in combination with sulfentrazone. It has been shown (cf. the results in Table 45) that the combination is particularly useful for the control of yellow nutsedge (CYPES) and velvetleaf (ABUTH), such as for providing weed control in crops selected from soybean. In some embodiments, the combination is applied pre-emergence, however it is envisaged that the combination may also be applied post-emergence.

In the above variants and embodiments and upon application thereof (see below), beflubutamid and sulfentrazone are typically combined in a relative ratio of 1:0.03 to 1:10, such as 1:0.05 to 1:6, for example 1:0.1 to 1:3.5.

Hence, in interesting embodiments, the invention also provides a method of controlling undesired vegetation (for example the weed(s) mentioned above) in a crop (for example the crops mentioned above), wherein the method comprises the step of applying to the locus of such vegetation a herbicidally effective amount of a composition comprising beflubutamid in combination with sulfentrazone. The application of the composition to the locus is typically conducted pre-emergence. In some embodiments, beflubutamid is applied in an amount of 30-400 g ai/ha, such as 45-320 g ai/ha, for example 60-250 g ai/ha, whereas sulfentrazone is applied in an amount of 15-340 g ai/ha, such as 20-270 g ai/ha, for example 25-210 g ai/ha. In some embodiments, the two active ingredients are applied in the above-mentioned relative ratios.

J. Combination with WSSA Group 1 Cyclohexanedione Herbicides

In another selected aspect of the invention, beflubutamid is in combination with a second herbicide selected from cyclohexanedione herbicides being classified in WSSA Group 1. This herbicides combination is believed to be particularly useful for the control of barnyardgrass (ECHCG).

In one embodiment thereof, the WSSA Group 1 cyclohexanedione herbicide is selected from clethodim, alloxydim, butroxydim, cycloxydim, sethoxydim, tepraloxydim and tralkoxydim, including isomers and/or CIs-alkyl esters and/or salts thereof. A particularly interesting example hereof is clethodim.

J.1 Beflubutamid and Clethodim:

In one variant of this aspect of the invention, beflubutamid is in combination with clethodim. It has been shown (cf. the results in Table 35 and FIG. 5) that the combination is particularly useful for the control of barnyardgrass (ECHCG), such as for providing weed control in crops selected from corn, wheat, barley, soybean, rice and sunflower. In some embodiments, the combination is applied post-emergence, however it is envisaged that the combination may also be applied pre-emergence.

In the above variants and embodiments and upon application thereof (see below), beflubutamid and clethodim are typically combined in a relative ratio of 1:0.005 to 1:5, such as 1:0.009 to 1:3, for example 1:0.02 to 1:1.8.

Hence, in interesting embodiments, the invention also provides a method of controlling undesired vegetation (for example the weed(s) mentioned above) in a crop (for example the crops mentioned above), wherein the method comprises the step of applying to the locus of such vegetation a herbicidally effective amount of a composition comprising beflubutamid in combination with clethodim. The application of the composition to the locus is typically conducted post-emergence. In some embodiments, beflubutamid is applied in an amount of 30-400 g ai/ha, such as 45-320 g ai/ha, for example 60-250 g ai/ha, whereas clethodim is applied in an amount of 2-170 g ai/ha, such as 3-130 g ai/ha, for example 5-100 g ai/ha. In some embodiments, the two active ingredients are applied in the above-mentioned relative ratios.

K. Combination with WSSA Group 2 Imidazolinone Herbicides

In another selected aspect of the invention, beflubutamid is in combination with a second herbicide selected from imidazolinone herbicides classified in WSSA Group 2. This herbicides combination is believed to be particularly useful for the control of weeds selected from barnyard grass (ECHCG), jimsonweed (DATST), common lambsquarters (CHEAL).

In one embodiment thereof, the WSSA Group 2 imidazolinone herbicides is selected from imazethapyr, imazamethabenz, imazamox, imazapic, imazapyr, and imazaquin, including isomers and/or $C_{1-8}$-alkyl esters and/or salts thereof, e.g. imazamethabenz methyl, etc. A particularly interesting example hereof is imazethapyr.

K.1 Beflubutamid and Imazethapyr:

In one variant of this aspect of the invention, beflubutamid is in combination with imazethapyr. It has been shown (cf. the results in Table 39) that the combination is particularly useful for the control of barnyard grass (ECHCG), jimsonweed (DATST), common lambsquarters (CHEAL) and redroot pigweed (AMARE), in particular for control of barnyard grass (ECHCG), jimsonweed (DATST), common lambsquarters (CHEAL), such as for providing weed control in crops selected from corn, soybean, rice and sunflower. In some embodiments, the combination is applied post-emergence, however it is envisaged that the combination may also be applied pre-emergence.

In the above variants and embodiments and upon application thereof (see below), beflubutamid and imazethapyr are typically combined in a relative ratio of 1:0.005 to 1:3.5, such as 1:0.009 to 1:2, for example 1:0.02 to 1:1.8.

Hence, in interesting embodiments, the invention also provides a method of controlling undesired vegetation (for example the weed(s) mentioned above) in a crop (for example the crops mentioned above), wherein the method comprises the step of applying to the locus of such vegetation a herbicidally effective amount of a composition comprising beflubutamid in combination with imazethapyr. The application of the composition to the locus is typically conducted post-emergence. In some embodiments, beflubutamid is applied in an amount of 30-400 g ai/ha, such as 45-320 g ai/ha, for example 60-250 g ai/ha, whereas imazethapyr is applied in an amount of 2-110 g ai/ha, such as 3-90 g ai/ha, for example 5-70 g ai/ha. In some embodiments, the two active ingredients are applied in the above-mentioned relative ratios.

L. Combination with WSSA Group 14 N-phenylphthalimide Herbicides

In another selected aspect of the invention, beflubutamid is in combination with a second herbicide selected from N-phenylphthalimides herbicides being classified in WSSA Group 14. This herbicides combination is believed to be particularly useful for the control of weeds selected from common chickweed (STEME), yellow nutsedge (CYPES) and velvetleaf (ABUTH).

In one embodiment thereof, the WSSA Group 14 N-phenylphthalimide herbicide is selected from flumioxazin and flumiclorac, including isomers and/or $C_{1-8}$-alkyl esters and/or salts thereof. A particularly interesting example is flumioxazin.

L.1 Beflubutamid and Flumioxazin:

In one variant of this aspect of the invention, beflubutamid is in combination with flumioxazin. It has been shown (cf. the results in Table 41) that the combination is particularly useful for the control of such as for providing weed control in crops selected from soybean. In some embodiments, the combination is applied pre-emergence, however it is envisaged that the combination may also be applied post-emergence.

In the above variants and embodiments and upon application thereof (see below), beflubutamid and flumioxazin are typically combined in a relative ratio of 1:0.005 to 1:3.5, such as 1:0.009 to 1:2, for example 1:0.02 to 1:1.8.

Hence, in interesting embodiments, the invention also provides a method of controlling undesired vegetation (for example the weed(s) mentioned above) in a crop (for example the crops mentioned above), wherein the method comprises the step of applying to the locus of such vegetation a herbicidally effective amount of a composition comprising beflubutamid in combination with flumioxazin. The application of the composition to the locus is typically conducted pre-emergence. In some embodiments, beflubutamid is applied in an amount of 30-400 g ai/ha, such as 45-320 g ai/ha, for example 60-250 g ai/ha, whereas flumioxazin is applied in an amount of 2-110 g ai/ha, such as 3-90 g ai/ha, for example 5-70 g ai/ha. In some embodiments, the two active ingredients are applied in the above-mentioned relative ratios.

M. Combination with WSSA Group 14 Diphenylether Herbicides

In another selected aspect of the invention, beflubutamid is in combination with a second herbicide selected from diphenylether herbicides being classified in WSSA Group 14. This herbicides combination is believed to be particularly useful for the control of weeds selected from blackgrass (ALOMY) and barnyardgrass (ECHCG).

In particular embodiments thereof, the WSSA Group 14 diphenylether herbicide is selected from acifluorfen, bifenox, fluoroglycofen, fomesafen, lactofen, and oxyfluorfen, including isomers and/or $C_{1-8}$-alkyl esters and/or salts thereof. Particularly interesting examples hereof are fomesafen and oxyfluorfen.

M.1 Beflubutamid and Fomesafen:

In one variant of this aspect of the invention, beflubutamid is in combination with fomesafen. It has been shown (cf. the results in Table 42) that the combination is particularly useful for the control of common waterhemp (AMATA) and common ragweed (AMBEL), such as for providing weed control in crops selected from soybean. In some embodiments, the combination is applied pre-emergence, however it is envisaged that the combination may also be applied post-emergence.

In the above variants and embodiments and upon application thereof (see below), beflubutamid and fomesafen are typically combined in a relative ratio of 1:0.04 to 1:20, such as 1:0.06 to 1:12, for example 1:0.12 to 1:7.

Hence, in interesting embodiments, the invention also provides a method of controlling undesired vegetation (for example the weed(s) mentioned above) in a crop (for example the crops mentioned above), wherein the method comprises the step of applying to the locus of such vegetation a herbicidally effective amount of a composition comprising beflubutamid in combination with fomesafen. The application of the composition to the locus is typically conducted pre-emergence. In some embodiments, beflubutamid is applied in an amount of 30-400 g ai/ha, such as 45-320 g ai/ha, for example 60-250 g ai/ha, whereas fomesafen is applied in an amount of 16-700 g ai/ha, such as 20-550 g ai/ha, for example 30-420 g ai/ha. In some embodiments, the two active ingredients are applied in the above-mentioned relative ratios.

M.2 Beflubutamid and Oxyfluorfen:

In one variant of this aspect of the invention, beflubutamid is in combination with oxyfluorfen. It has been shown (cf. the results in Table 43) that the combination is particularly useful for the control of yellow nutsedge (CYPES), velvetleaf (ABUTH), redroot pigweed (AMARE) and johnsongrass (SORHA), in particular for control of yellow nutsedge (CYPES) and velvetleaf (ABUTH), such as for providing weed control in crops selected from soybean and sunflower. In some embodiments, the combination is applied pre-emergence, however it is envisaged that the combination may also be applied post-emergence.

In the above variants and embodiments and upon application thereof (see below), beflubutamid and oxyfluorfen are typically combined in a relative ratio of 1:0.04 to 1:12, such as 1:0.06 to 1:7, for example 1:0.12 to 1:4.5.

Hence, in interesting embodiments, the invention also provides a method of controlling undesired vegetation (for example the weed(s) mentioned above) in a crop (for example the crops mentioned above), wherein the method comprises the step of applying to the locus of such vegetation a herbicidally effective amount of a composition comprising beflubutamid in combination with oxyflurofen. The application of the composition to the locus is typically conducted pre-emergence. In some embodiments, beflubutamid is applied in an amount of 30-400 g ai/ha, such as 45-320 g ai/ha, for example 60-250 g ai/ha, whereas oxyfluorfen is applied in an amount of 16-400 g ai/ha, such as 20-320 g ai/ha, for example 30-350 g ai/ha. In some embodiments, the two active ingredients are applied in the above-mentioned relative ratios.

N. Combination with WSSA Group 14 Pyrimidinedione Herbicides In another selected aspect of the invention, beflubutamid is in combination with a second herbicide selected from pyrimidinedione herbicides being classified in WSSA Group 14.

In particular embodiments thereof, the WSSA Group 14 pyrimidinedione herbicide is selected from saflufenacil and bufafenacil, including isomers and/or $C_{1-8}$-alkyl esters and/or salts thereof. A particularly interesting example hereof is saflufenacil.

N.1 Beflubutamid and Saflufenacil:

In one variant of this aspect of the invention, beflubutamid is in combination with saflufenacil. It has been shown (cf. the results in Table 44) that the combination is particularly useful for the control of common purslane (POROL) and redroot pigweed (AMARE), such as for providing weed control in crops selected from soybean. In some embodiments, the combination is applied pre-emergence, however it is envisaged that the combination may also be applied post-emergence.

In the above variants and embodiments and upon application thereof (see below), beflubutamid and saflufenacil are typically combined in a relative ratio of 1:0.002 to 1:5, such as 0.003 to 1:3, for example 1:0.008 to 1:1.8.

Hence, in interesting embodiments, the invention also provides a method of controlling undesired vegetation (for example the weed(s) mentioned above) in a crop (for example the crops mentioned above), wherein the method comprises the step of applying to the locus of such vegetation a herbicidally effective amount of a composition comprising beflubutamid in combination with saflufenacil. The application of the composition to the locus is typically conducted pre-emergence. In some embodiments, beflubutamid is applied in an amount of 30-400 g ai/ha, such as 45-320 g ai/ha, for example 60-250 g ai/ha, whereas saflufenacil is applied in an amount of 1-170 g ai/ha, such as 1-130 g ai/ha, for example 2-100 g ai/ha. In some embodiments, the two active ingredients are applied in the above-mentioned relative ratios.

O. Combination with of WSSA Group 5 1,2,4-triazine Herbicides

In another selected aspect of the invention, beflubutamid is in combination with a second herbicide selected from 1,2,4-triazine herbicides being classified in WSSA Group 5. This herbicides combination is believed to be particularly useful for the control of velvetleaf (IPOHE).

In particular embodiments thereof, the WSSA Group 5 1,2,4-triazine herbicide is selected from metribuzin and metamitron, including isomers and/or $C_{1-8}$-alkyl esters and/or salts thereof. A particularly interesting example hereof is metribuzin.

O.1 Beflubutamid and Metribuzin:

In one variant of this aspect of the invention, beflubutamid is in combination with metribuzin. It has been shown (cf. the results in Table 33) that the combination is particularly useful for the control of volunteer canola, barnyardgrass (ECHCG), and Italian ryegrass (LOLMU), such as for providing weed control in crops selected from corn, wheat and soybean. In some embodiments, the combination is applied pre-emergence, and in other embodiments the combination is applied post-emergence.

The combination of beflubutamid with metribuzin further surprisingly exhibits improved crop safety compared to that obtained for the individual active ingredients in respect of crops selected from wheat.

In the above variants and embodiments and upon application thereof (see below), beflubutamid and metribuzin are typically combined in a relative ratio of 1:0.03 to 1:14, such as 1:0.05 to 1:8, for example 1:0.1 to 1:5.

Hence, in interesting embodiments, the invention also provides a method of controlling undesired vegetation (for example the weed(s) mentioned above) in a crop (for example the crops mentioned above), wherein the method comprises the step of applying to the locus of such vegetation a herbicidally effective amount of a composition comprising beflubutamid in combination with metribuzin. The application of the composition to the locus is typically conducted pre-emergence or post-emergence. In some embodiments, beflubutamid is applied in an amount of 30-400 g ai/ha, such as 45-320 g ai/ha, for example 60-250 g ai/ha, whereas metribuzin is applied in an amount of 12-440 g ai/ha, such as 18-350 g a/ha, for example 25-280 g ai/ha. In some embodiments, the two active ingredients are applied in the above-mentioned relative ratios.

W. Combination with Selected Herbicides

In another selected aspect of the invention, beflubutamid is in combination with a second herbicide selected from: metamifop, atrazine, fenoxaprop, 2,4-D (2,4-dichlorophenoxyacetic acid), florasulam, halosulfuron, prosulfocarb, diflufenican, dicamba, and bromoxynil, including isomers and/or $C_{1-8}$-alkyl esters and/or salts thereof, e.g. fenoxaprop-ethyl, fenoxaprop-P, fenoxaprop-P-ethyl, halosulfuron-methyl, etc.

W.1 Beflubutamid and Metamifop:

In another variant of this aspect of the invention, beflubutamid is in combination with metamifop. It has been shown (cf. the results in Table 37 and FIG. 4) that the combination is particularly useful for the control of barnyardgrass (ECHCG), such as for providing weed control in crops selected from corn and soybean. In some embodiments, the combination is applied post-emergence, however it is envisaged that the combination may also be applied pre-emergence.

In the above variants and embodiments and upon application thereof (see below), beflubutamid and metamifop are typically combined in a relative ratio of 1:0.04 to 1:3, such as 1:0.06 to 1:1.8, for example 1:0.12 to 1:1.

Hence, in interesting embodiments, the invention also provides a method of controlling undesired vegetation (for example the weed(s) mentioned above) in a crop (for example the crops mentioned above), wherein the method comprises the step of applying to the locus of such vegetation a herbicidally effective amount of a composition comprising beflubutamid in combination with metamifop. The application of the composition to the locus is typically conducted post-emergence. In some embodiments, beflubutamid is applied in an amount of 30-400 g ai/ha, such as 45-320 g ai/ha, for example 60-250 g ai/ha, whereas metamifop is applied in an amount of 16-100 g ai/ha, such as 20-80 g ai/ha, for example 30-60 g ai/ha. In some embodiments, the two active ingredients are applied in the above-mentioned relative ratios.

W.2. Beflubutamid and Atrazine:

In one variant of this aspect of the invention, beflubutamid is in combination with atrazine. It has been shown (cf. the results in Table 34) that the combination is particularly useful for the control of velvetleaf (IPOHE), such as for providing weed control in crops selected from corn and soybean. In some embodiments, the combination is applied pre-emergence, however it is envisaged that the combination may also be applied post-emergence.

In the above variants and embodiments and upon application thereof (see below), beflubutamid and atrazine are typically combined in a relative ratio of 1:0.09 to 1:100, such as 1:0.2 to 1:60, for example 1:0.3 to 1:40.

Hence, in interesting embodiments, the invention also provides a method of controlling undesired vegetation (for example the weed(s) mentioned above) in a crop (for example the crops mentioned above), wherein the method comprises the step of applying to the locus of such vegetation a herbicidally effective amount of a composition comprising beflubutamid in combination with atrazine. The application of the composition to the locus is typically conducted pre-emergence. In some embodiments, beflubutamid is applied in an amount of 30-400 g ai/ha, such as 45-320 g ai/ha, for example 60-250 g ai/ha, whereas atrazine is applied in an amount of 40-3400 g ai/ha, such as 60-2700 g ai/ha, for example 70-2200 g ai/ha. In some embodiments, the two active ingredients are applied in the above-mentioned relative ratios.

W.3 Beflubutamid and Fenoxaprop:

In another variant of this aspect of the invention, beflubutamid is in combination with fenoxaprop, in particular fenoxaprop-ethyl, fenoxaprop-P and fenoxaprop-P-ethyl (to which will be referred to in the following). It has been shown (cf. the results in Table 36) that the combination is particularly useful for the control of barnyardgrass (ECHCG), such as for providing weed control in crops selected from wheat and barley. In some embodiments, the combination is applied post-emergence, however it is envisaged that the combination may also be applied pre-emergence.

In the above variants and embodiments and upon application thereof (see below), beflubutamid and fenoxaprop-P-ethyl are typically combined in a relative ratio of 1:0.02 to 1:3.5, such s 1:0.03 to 1:2, for example 1:0.06 to 1:1.8.

Hence, in interesting embodiments, the invention also provides a method of controlling undesired vegetation (for example the weed(s) mentioned above) in a crop (for example the crops mentioned above), wherein the method comprises the step of applying to the locus of such vegetation a herbicidally effective amount of a composition comprising beflubutamid in combination with fenoxaprop-P-ethyl. The application of the composition to the locus is typically conducted post-emergence. In some embodiments, beflubutamid is applied in an amount of 30-400 g ai/ha, such as 45-320 g ai/ha, for example 60-250 g ai/ha, whereas fenoxaprop-P-ethyl is applied in an amount of 8-110 g ai/ha, such as 11-90 g ai/ha, for example 15-70 g ai/ha. In some embodiments, the two active ingredients are applied in the above-mentioned relative ratios.

W.4 Beflubutamid and 2,4-D:

In another variant of this aspect of the invention, beflubutamid is in combination with 2,4-D. It has been shown (cf. the results in Table 38) that the combination is particularly useful for the control of common purslane (POROL), common lambsquarters (CHEAL) and common waterhemp (AMATA), in particular for control of common purslane (POROL) and common lambsquarters (CHEAL), such as for providing weed control in crops selected from corn, wheat, barley and sunflower. In some embodiments, the combination is applied post-emergence, however it is envisaged that the combination may also be applied pre-emergence.

In the above variants and embodiments and upon application thereof (see below), beflubutamid and 2,4-D are typically combined in a relative ratio of 1:0.04 to 1:10, such as 1:0.06 to 1:6, for example 1:0.12 to 1:3.5.

Hence, in interesting embodiments, the invention also provides a method of controlling undesired vegetation (for example the weed(s) mentioned above) in a crop (for example the crops mentioned above), wherein the method comprises the step of applying to the locus of such vegetation a herbicidally effective amount of a composition comprising beflubutamid in combination with 2,4-D. The application of the composition to the locus is typically conducted post-emergence. In some embodiments, beflubutamid is applied in an amount of 30-400 g ai/ha, such as 45-320 g ai/ha, for example 60-250 g ai/ha, whereas 2,4-D is applied in an amount of 16-320 g ai/ha, such as 22-250 g ai/ha, for example 30-200 g ai/ha. In some embodiments, the two active ingredients are applied in the above-mentioned relative ratios.

W.5 Beflubutamid and Florasulam:

In another variant of this aspect of the invention, beflubutamid is in combination with florasulam. It has been shown (cf. the results in Table 18) that the combination is particularly useful for the control of beggerticks (BIDPI such as for providing weed control in crops selected from corn, wheat and barley. In some embodiments, the combination is applied post-emergence, however it is envisaged that the combination may also be applied pre-emergence.

In the above variants and embodiments and upon application thereof (see below), beflubutamid and florasulam are typically combined in a relative ratio of 1:0.001 to 1:0.3, such as 1:0.002 to 1:0.15, for example 1:0.008 to 1:0.01.

Hence, in interesting embodiments, the invention also provides a method of controlling undesired vegetation (for example the weed(s) mentioned above) in a crop (for example the crops mentioned above), wherein the method comprises the step of applying to the locus of such vegetation a herbicidally effective amount of a composition comprising beflubutamid in combination with florasulam. The application of the composition to the locus is typically conducted post-emergence. In some embodiments, beflubutamid is applied in an amount of 30-400 g ai/ha, such as 45-320 g ai/ha, for example 60-250 g ai/ha, whereas florasulam is applied in an amount of 0.5-10 g ai/ha, such as 0.8-8 g ai/ha, for example 1-5 g ai/ha. In some embodiments, the two active ingredients are applied in the above-mentioned relative ratios.

W.6 Beflubutamid and Halosulfuron-Methyl:

In another variant of this aspect of the invention, beflubutamid is in combination with halosulfuron, e.g. in the form of halosulfuron-methyl (as will be referred to in the following). It has been shown (cf. the results in Table 23) that the combination is particularly useful for the control of common lambsquarters (CHEAL), common chickweed (STEME), rice flatsedge (CYPIR) and barnyard grass (ECHCG), in particular for control of common chickweed (STEME), rice flatsedge (CYPIR) and barnyard grass (ECHCG), such as for providing weed control in crops selected from corn. In some embodiments, the combination is applied post-emergence, however it is envisaged that the combination may also be applied pre-emergence.

In the above variants and embodiments and upon application thereof (see below), beflubutamid and halosulfuron-methyl are typically combined in a relative ratio of 1:0.001 to 1:2, such as 1:0.003 to 1:1.2, for example 1:0.008 to 1:0.8.

Hence, in interesting embodiments, the invention also provides a method of controlling undesired vegetation (for example the weed(s) mentioned above) in a crop (for example the crops mentioned above), wherein the method comprises the step of applying to the locus of such vegetation a herbicidally effective amount of a composition comprising beflubutamid in combination with halosulfuron-methyl. The application of the composition to the locus is typically conducted post-emergence. In some embodiments, beflubutamid is applied in an amount of 30-400 g ai/ha, such as 45-320 g ai/ha, for example 60-250 g ai/ha, whereas halosulfuron-methyl is applied in an amount of 0.5-65 g ai/ha, such as 1-50 g ai/ha, for example 2-40 g ai/ha. In some embodiments, the two active ingredients are applied in the above-mentioned relative ratios.

W.7 Beflubutamid and Prosulfocarb:

In another variant of this aspect of the invention, beflubutamid is in combination with prosulfocarb. It has been shown (cf. the results in Table 40) that the combination is particularly useful for the control of annual bluegrass (POAAN), such as for providing weed control in crops selected from wheat and barley. In some embodiments, the combination is applied pre-emergence, and in other embodiments the combination is applied post-emergence.

In the above variants and embodiments and upon application thereof (see below), beflubutamid and prosulfocarb are typically combined in a relative ratio of 1:0.6 to 1:120, such as 1:1.2 to 1:70, for example 1:2 to 1:40.

Hence, in interesting embodiments, the invention also provides a method of controlling undesired vegetation (for example the weed(s) mentioned above) in a crop (for example the crops mentioned above), wherein the method comprises the step of applying to the locus of such vegetation a herbicidally effective amount of a composition comprising beflubutamid in combination with prosulfocarb. The application of the composition to the locus is conducted pre-emergence or post-emergence. In some embodiments, beflubutamid is applied in an amount of 30-400 g ai/ha, such as 45-320 g ai/ha, for example 60-250 g ai/ha, whereas prosulfocarb is applied in an amount of 270-3800 g ai/ha, such as 370-3000 g ai/ha, for example 500 2400 g ai/ha. In some embodiments, the two active ingredients are applied in the above-mentioned relative ratios.

W.8 Beflubutamid and Diflufenican:

In another of this aspect of the invention, beflubutamid or an optically enriched form thereof is in combination with diflufenican, another WSSA Group 12 herbicide. It has been shown (cf. the results in Table 46) that the combination is particularly useful for the control of barnyardgrass (ECHCG), volunteer canola (BRSNN), common lambsquarters (CHEAL) and common chickweed (STEME), in particular for control of common chickweed (STEME), such as for providing weed control in crops selected from wheat, barley and rice. In some embodiments, the combination is applied pre-emergence, and in other embodiments the combination is applied post-emergence.

In the above variants and embodiments and upon application thereof (see below), beflubutamid or an optically enriched form thereof and diflufenican are typically combined in a relative ratio of 1:0.04 to 1:10, such as 1:0.06 to 1:6, for example 1:0.12 to 1:3.5.

Hence, in interesting embodiments, the present invention also provides a method of controlling undesired vegetation (for example the weed(s) mentioned above) in a crop (for example the crops mentioned above), wherein the method comprises the step of applying to the locus of such vegetation a herbicidally effective amount of a composition comprising beflubutamid or an optically enriched form thereof in combination with diflufenican. The application of the composition to the locus is conducted pre-emergence or post-emergence. In some embodiments, beflubutamid is applied in an amount of 30-400 g ai/ha, such as 45-320 g ai/ha, for example 60-250 g ai/ha, whereas diflufenican is applied in an amount of 15-100 g ai/ha, such as 22-80 g ai/ha, for example 30-65 g ai/ha. In some embodiments, the two active ingredients are applied in the above-mentioned relative ratios.

W.9 Beflubutamid and Dicamba:

In one variant of this aspect of the invention, beflubutamid or an optically enriched form thereof is in combination with dicamba. It has been shown (cf. the results in Table 38) that the combination is particularly useful for the control of common purslane (POROL), common lambsquarters (CHEAL) and common waterhemp (AMATE), such as for providing weed control in crops selected from corn, wheat, barley and sunflower. In some embodiments, the combination is applied post-emergence, however it is envisaged that the combination may also be applied pre-emergence.

In the above variants and embodiments and upon application thereof (see below), beflubutamid or an optically enriched form thereof and dicamba are typically combined in a relative ratio of 1:0.005 to 1:14, such as 1:0.009 to 1:8, for example 1:0.02 to 1:5.

Hence, in interesting embodiments, the present invention also provides a method of controlling undesired vegetation (for example the weed(s) mentioned above) in a crop (for example the crops mentioned above), wherein the method comprises the step of applying to the locus of such vegetation a herbicidally effective amount of a composition comprising beflubutamid or an optically enriched form thereof in combination with dicamba. The application of the composition to the locus is typically conducted post-emergence. In some embodiments, beflubutamid is applied in an amount of 30-400 g ai/ha, such as 45-320 g ai/ha, for example 60-250 g ai/ha, whereas dicamba is applied in an amount of 2-440 g ai/ha, such as 3-350 g ai/ha, for example 5-280 g ai/ha. In some embodiments, the two active ingredients are applied in the above-mentioned relative ratios.

W.10 Beflubutamid and Bromoxynil:

In one variant of this aspect of the invention, beflubutamid or an optically enriched form thereof is in combination with bromoxynil. It has been shown (cf. the results in Table 49) that the combination is particularly useful for the control of Canada thistle (CIRAR), such as for providing weed control in crops selected from corn, wheat, barley and soybeans and sunflower. In some embodiments, the combination is applied pre-emergence, and in other embodiments the combination is applied post-emergence.

In the above variants and embodiments and upon application thereof (see below), beflubutamid or an optically enriched form thereof and bromoxynil are typically combined in a relative ratio of 1:0.04 to 1:10, such as 1:0.06 to 1:6, for example 1:0.12 to 1:3.5.

Hence, in interesting embodiments, the present invention also provides a method of controlling undesired vegetation (for example the weed(s) mentioned above) in a crop (for example the crops mentioned above), wherein the method comprises the step of applying to the locus of such vegetation a herbicidally effective amount of a composition comprising beflubutamid or an optically enriched form thereof in combination with bromoxynil. The application of the composition to the locus is conducted pre-emergence or post-emergence. In some embodiments, beflubutamid is applied in an amount of 30-400 g ai/ha, such as 45-320 g ai/ha, for example 60-250 g ai/ha, whereas bromoxynil is applied in an amount of 16-320 g ai/ha, such as 22-250 g ai/ha, for example 30-200 g ai/ha. In some embodiments, the two active ingredients are applied in the above-mentioned relative ratios.

It has been found that the use of a second herbicide may provide enhanced safety and efficacy in controlling undesirable vegetation compared to use of beflubutamid as the only active herbicidal ingredient. In a more preferred embodiment, the second herbicide employed enhances the selectivity of the actions in the crops to be treated.

Further Herbicidally Active Ingredients (Further Herbicides)

In addition to the first herbicide and the second herbicide, the herbicidal compositions described herein, may include one or more further herbicidally active ingredients (further herbicides), just as one or more further herbicides may be used in combination with the first herbicide and the second herbicide in the methods described herein.

Examples of such active ingredients which may be used as further herbicides are:

Acetyl-CoA carboxylase inhibitors (ACC), for example cyclohexenone oxime ethers, such as alloxydim, clethodim, cloproxydim, cycloxydim, sethoxydim, tralkoxydim, butroxydim, clefoxydim or tepraloxydim; phenoxyphenoxypropionic esters, such as clodinafop-propargyl, cyhalofop-butyl, diclofop-methyl, fenoxaprop, fenoxaprop-ethyl, fenoxaprop-P, fenoxaprop-P-ethyl, fenthiapropethyl, fluazifop-butyl, fluazifop-P-butyl, haloxyfop-ethoxyethyl, haloxyfop-methyl, haloxyfop-P-methyl, isoxapyrifop, propaquizafop, quizalofop-ethyl, quizalofop-P-ethyl or quizalofop-tefuryl; or arylaminopropionic acids, such as flamprop-methyl or flamprop-isopropyl; Acetolactate synthase inhibitors (ALS), for example imidazolinones, such as imazapyr, imazaquin, imazamethabenz-methyl (imazame), imazamox, imazapic or imazethapyr; pyrimidyl ethers, such as pyrithiobac-acid, pyrithiobac-sodium, bispyribac-sodium. KIH-6127 or pyribenzoxym; sulfonamides, such as florasulam, flumetsulam or metosulam; or sulfonylureas, such as amidosulfuron, azimsulfuron, bensulfuron-methyl, chlorimuron-ethyl, chlorsulfuron, cinosulfuron, cyclosulfamuron, ethametsulfuron-methyl, ethoxysulfuron, flazasulfuron, halosulfuron-methyl, imazosulfuron, metsulfuron-methyl, nicosulfuron, primisulfuron-methyl, prosulfuron, pyrazosulfuron-ethyl, rimsulfuron, sulfometuron-methyl, thifensulfuron-methyl, triasulfuron, tribenuron-methyl, triflusulfuron-methyl, tritosulfuron, sulfosulfuron, foramsulfuron or iodosulfuron; Amide herbicides include, but are not limited to allidochlor (CDAA), amicarbazone, benzadox, benzipram, benzoylprop-ethyl, bromobutide, cafenstrole, CDEA, chlorthiamid, cyprazole, dimethenamid, dimethenamid-P, diphenamid, epronaz, etnipromid, etobenzanid, fentrazamide, flucarbazone, flupoxam, fluthiamide, fomesafen, fosamin, halosafen, huangcaoling, isocarbamid, isoxaben, monalide, napropamide, napropamide-M, naptalam, pethoxamid, propyzamide, quinonamid, saflufenacil, tebutam, and tiafenacil and agriculturally acceptable salts and esters thereof; Anilide herbicides, include, but are not limited to, chloranocryl, cisanilide, clomeprop, cypromid, erlujixiancaoan, etobenzanid, fenasulam, flufenacet, flufenican, ipfencarbazone, mefenacet, mefluidide, metamifop, monalide, naproanilide, pentanochlor, picolinafen, propanil, and triafamone and agriculturally acceptable salts and esters thereof; Arylalanine herbicides include, but are not limited to benzoylprop, flamprop, and flamprop-M and agriculturally acceptable salts and esters thereof; Chloroacetanilide herbicides include but are not limited to acetochlor, alachlor, butachlor, butenachlor, delachlor, diethatyl, dimethachlor, ethachlor, etaprochlor, metazachlor, metolachlor, S-metolachlor, pretilachlor, propachlor, propisochlor, prynachlor, terbuchlor, thenylchlor, xylachlor sulfonanilide herbicides; benzofluor, cloransulam, diclosulam, florasulam, flumetsulam, metosulam, perfluidone, profluazol, and pyrimisulfan and agriculturally acceptable salts and esters thereof; Sulfonamide herbicides include, but are not limited to, asulam, carbasulam, fenasulam, oryzalin, penoxsulam, and pyroxsulam and agriculturally acceptable salts and esters thereof; Thioamide herbicides include, but are not limited to, bencarbazone, and chlorthiamid and agriculturally acceptable salts and esters thereof; Benzoic acid herbicides include, but are not limited to, cambendichlor, chloramben, dicamba, 2,3,6-TBA, tricamba, pyrimidinyloxybenzoic acid herbicides; bispyribac, and pyriminobac and agriculturally acceptable salts and esters thereof; Pyrimidinylthiobenzoic acid herbicides include, but are not limited to pyrithiobac and agriculturally acceptable salts and esters thereof; Phthalic acid herbicides include but are not limited to chlorthal and agriculturally acceptable salts and esters thereof; Picolinic acid herbicides include but are not limited to, aminopyralid, clopyralid, halauxifen, and picloram and agriculturally acceptable salts and esters thereof; Quinolinecarboxylic acid herbicides include but are not limited to, quinclorac, and quinmerac and agriculturally acceptable salts and esters thereof; Arsenical herbicides include but are not limited to, cacodylic acid, CMA, DSMA, hexaflurate, MAA, MAMA, MSMA, potassium arsenite, and sodium arsenite and agriculturally acceptable salts and esters thereof; Benzoylcyclohexanedione herbicides include are but are not limited to, fenquinotrione, ketospiradox, mesotrione, sulcotrione, tefuryltrione, and tembotrione; Benzofuranyl alkylsulfonate herbicides include but are not limited to benfuresate, and ethofumesate and agriculturally acceptable salts and esters thereof; Benzothiazole herbicides include but are not limited to benazolin, benzthiazuron, fenthiaprop, mefenacet, and methabenzthiazuron and agriculturally acceptable salts and esters thereof; Carbamate herbicides include but are not limited to, asulam, carboxazole, chlorprocarb, dichlormate, fenasulam, karbutilate, terbucarb and agriculturally acceptable salts and esters thereof; Carbanilate herbicides include but are not limited to, barban, BCPC, carbasulam, carbetamide, CEPC, chlorbufam, chlorpropham, CPPC, desmedipham, phenisopham, phenmedipham, phenmedipham-ethyl, propham, and swep and agriculturally acceptable salts and esters thereof; Carbonate herbicides include but are not limited to bromobonil, dinofenate, and iodobonil and agriculturally acceptable salts and esters thereof; Cyclohexene oxime herbicides include but are not limited to alloxydim, butroxydim, clethodim, cloproxydim, cycloxydim, profoxydim, sethoxydim, tepraloxydim, and tralkoxydim; Cyclopropylisoxazole herbicides include but are not limited to, isoxachlortole, and isoxaflutole and agriculturally acceptable salts and esters thereof; Dicarboximide herbicides include but are not limited to cinidon-ethyl, flumezin, flumiclorac, flumioxazin, and flumipropyn and agriculturally acceptable salts and esters thereof; Dinitroaniline herbicides include, but are not limited to, benfluralin, butralin, chlornidine, dinitramine, dipropalin, ethalfluralin, fluchloralin, isopropalin, methalpropalin, nitralin, oryzalin, pendimethalin, prodiamine, profluralin, and trifluralin and agriculturally acceptable salts and esters thereof; Dinitrophenol herbicides include but are not limited to dinofenate, dinoprop, dinosam, dinoseb, dinoterb, DNOC, etinofen, medinoterb and agriculturally acceptable salts and esters thereof; Diphenyl ether herbicides include but are not limited to ethoxyfen and agriculturally acceptable salts and esters thereof; Nitrophenyl ether herbicides include but are not limited to acifluorfen, aclonifen, bifenox, chlomethoxyfen, chlornitrofen, etnipromid, fluorodifen, fluoroglycofen, fluoronitrofen, fomesafen, fucaomi, furyloxyfen, halosafen, lactofen, nitrofen, nitrofluorfen, and oxyfluorfen; Dithiocarbamate herbicides include but are not limited to dazomet, and metam and agriculturally acceptable salts and esters thereof; Halogenated aliphatic herbicides include but are not limited to alorac, chloropon, dalapon, flupropanate, hexachloroacetone, methyl bromide, methyl iodide, monochloroacetic acid, SMA, and TCA and agriculturally acceptable salts and esters thereof; Imidazolinone herbicides include, but are not limited to imazamethabenz, imazamox, imazapic, imazapyr, imazaquin, imazethapyr and agriculturally acceptable salts and esters thereof; Inorganic herbicides include, but are not limited to ammonium sulfamate, borax, calcium chlorate, copper sulfate, ferrous sulfate, potassium azide, potassium cyanate, sodium azide, sodium chlorate, and sulfuric acid and agriculturally acceptable salts and esters thereof; Nitrile herbicides include but are not limited to bromobonil, bromoxynil, chloroxynil, dichlobenil, iodobonil, and ioxynil, pyraclonil and agriculturally acceptable salts and esters thereof; Organophosphorus herbicides include, but are not limited to amiprofos-methyl, amiprophos, anilofos, bensulide, bilanafos, butamifos, clacyfos, 2,4-DEP, DMPA, EBEP, fosamine, glufosinate, glufosinate-P, glyphosate, huangcaoling, piperophos, and shuangjiaancaolin and agriculturally acceptable salts and esters thereof; Oxadiazolone herbicides include but are not limited to dimefuron, methazole, oxadiargyl, oxadiazon and agriculturally acceptable salts and esters thereof; Oxazole herbicides include, but are not limited to carboxazole, fenoxasulfone, isouron, isoxaben, isoxachlortole, isoxaflutole, methiozolin, monisouron, pyroxasulfone, and topramezone and agriculturally acceptable salts and esters thereof; Phenoxy herbicides include, but are not limited to bromofenoxim, clomeprop, 2,4-DEB, difenopenten, disul, erbon, etnipromid, fenteracol, and trifopsime and agriculturally acceptable salts and esters thereof; Phenoxyacetic herbicides include, but are not limited to clacyfos, 4-CPA, 2,4-D, 3,4-DA, MCPA, MCPA-thioethyl, 2,4,5-T and agriculturally acceptable salts and esters thereof; Phenoxybutyric herbicides include, but are not limited to 4-CPB, 2,4-DB, 3,4-DB, MCPB, 2,4,5-TB and agriculturally acceptable salts and esters thereof; Phenoxypropionic herbicides include, but are not limited to cloprop, 4-CPP, dichlorprop, dichlorprop-P, 3,4-DP, fenoprop, mecoprop, mecoprop-P and agriculturally acceptable salts and esters thereof. Aryloxyphenoxypropionic herbicides include, but are not limited to chlorazifop, clodinafop, clofop, cyhalofop, diclofop, fenoxaprop, fenoxaprop-ethyl, fenoxaprop-P, fenoxaprop-P-ethyl, fenthiaprop, fluazifop, fluazifop-P, haloxyfop, haloxyfop-P, isoxapyrifop, kuicaoxi, metamifop, propaquizafop, quizalofop, quizalofop-P, and trifop and agriculturally acceptable salts and esters thereof; Phenylenediamine herbicides include, but are not limited to dinitramine, and prodiamine and agriculturally acceptable salts and esters thereof; Pyrazole herbicides include, but are not limited to azimsulfuron, difenzoquat, halosulfuron, metazachlor, metazosulfuron, pyrazosulfuron, pyroxasulfone and agriculturally acceptable salts and esters thereof; Benzoylpyrazole herbicides include, but are not limited to benzofenap, pyrasulfotole, pyrazolynate, pyrazoxyfen, and topramezone and agriculturally acceptable salts and esters thereof; Phenylpyrazole herbicides include, but are not limited to fluazolate, nipyraclofen, pinoxaden, and pyraflufen and agriculturally acceptable salts and esters thereof; Pyridazine herbicides include, but are not limited to credazine, cyclopyrimorate, pyridafol, and pyridate and agriculturally acceptable salts and esters thereof; Pyridazinone herbicides include, but are not limited to brompyrazon, chloridazon, dimidazon, flufenpyr, metflurazon, norflurazon, oxapyrazon, and pydanon and agriculturally acceptable salts and esters thereof; Pyridine herbicides include, but are not limited to aminopyralid, cliodinate, clopyralid, diflufenican, dithiopyr, flufenican, fluroxypyr, halauxifen, haloxydine, picloram, picolinafen, pyriclor, pyroxsulam, thiazopyr, and triclopyr and agriculturally acceptable salts and esters thereof; Pyrimidinediamine herbicides include, but are not limited to iprymidam, and tioclorim and agriculturally acceptable salts and esters thereof; Pyrimidinyloxybenzylamine herbicides include, but are not limited to pyribambenz-isopropyl, pyribambenz-propyl quaternary ammonium herbicides; cyperquat, diethamquat, difenzoquat, diquat, morfamquat, paraquat and agriculturally acceptable salts and esters thereof; Thiocarbamate herbicides include, but are not limited to butylate, cycloate, di-allate, EPTC, esprocarb, ethiolate, isopolinate, methiobencarb, molinate, orbencarb, pebulate, prosulfocarb, pyributicarb, sulfallate, thiobencarb, tiocarbazil, tri-allate, vernolate and agriculturally acceptable salts and esters thereof; Thiocarbonate herbicides include, but are not limited to dimexano, EXD, and proxan and agriculturally acceptable salts and esters thereof; Thiourea herbicides include, but are not limited to methiuron and agriculturally acceptable salts and esters thereof; Triazine herbicides include, but are not limited to dipropetryn, fucaojing, and trihydroxytriazine and agriculturally acceptable salts and esters thereof; Chlorotriazine herbicides include, but are not limited to atrazine, chlorazine, cyanazine, cyprazine, eglinazine, ipazine, mesoprazine, procyazine, proglinazine, propazine, sebuthylazine, simazine, terbuthylazine, and trietazine and agriculturally acceptable salts and esters thereof; Fluoroalkyltriazine herbicides include, but are not limited to indaziflam, and triaziflam and agriculturally acceptable salts and esters thereof; Methoxytriazine herbicides include, but are not limited to atraton, methometon, prometon, secbumeton, simeton, and terbumeton and agriculturally acceptable salts and esters thereof; Methylthiotriazine herbicides include, but are not limited to ametryn, aziprotryne, cyanatryn, desmetryn, dimethametryn, methoprotryne, prometryn, simetryn, and terbutryn and agriculturally acceptable salts and esters thereof; Triazinone herbicides include, but are not limited to ametridione, amibuzin, ethiozin, hexazinone, isomethiozin, metamitron, and metribuzin and agriculturally acceptable salts and esters thereof; Triazole herbicides include, but are not limited to amitrole, cafenstrole, epronaz, and flupoxam and agriculturally acceptable salts and esters thereof; Triazolone herbicides include, but are not limited to amicarbazone, bencarbazone, carfentrazone, carfentrazone ethyl, flucarbazone, ipfencarbazone, propoxycarbazone, sulfentrazone, and thiencarbazone and agriculturally acceptable salts and esters thereof; Triazolopyrimidine herbicides include, but are not limited to cloransulam, diclosulam, florasulam, flumetsulam, metosulam, penoxsulam, and pyroxsulam and agriculturally acceptable salts and esters thereof, Uracil herbicides include, but are not limited to benzfendizone, bromacil, butafenacil, flupropacil, isocil, lenacil, saflufenacil, terbacil, and tiafenacil and agriculturally acceptable salts and esters thereof; Urea herbicides include, but are not limited to benzthiazuron, cumyluron, cycluron, dichloralurea, diflufenzopyr, isonoruron, isouron, methabenzthiazuron, monisouron, and noruron and agriculturally acceptable salts and esters thereof; Phenylurea herbicides include, but are not limited to anisuron, buturon, chlorbromuron, chloreturon, chlorotoluron, chloroxuron, daimuron, difenoxuron, dimefuron, diuron, fenuron, fluometuron, fluothiuron, isoproturon, linuron, methiuron, methyldymron, metobenzuron, metobromuron, metoxuron, monolinuron, monuron, neburon, parafluron, phenobenzuron, siduron, tetrafluron, and thidiazuron and agriculturally acceptable salts and esters thereof; Sulfonylurea herbicides include, but are not limited to amidosulfuron, azimsulfuron, bensulfuron, chlorimuron, cyclosulfamuron, ethoxysulfuron, flazasulfuron, flucetosulfuron, flupyrsulfuron, foramsulfuron, halosulfuron, imazosulfuron, mesosulfuron, metazosulfuron, methiopyrisulfuron, monosulfuron, nicosulfuron, orthosulfamuron, oxasulfuron, primisulfuron, propyrisulfuron, pyrazosulfuron, rimsulfuron, sulfometuron, sulfosulfuron, trifloxysulfuron, and zuomihuanglong and agriculturally acceptable salts and esters thereof; Triazinylsulfonylurea herbicides include, but are not limited to chlorsulfuron, cinosulfuron, ethametsulfuron, iodosulfuron, iofensulfuron, and metsulfuron, prosulfuron, thifensulfuron, triasulfuron, tribenuron, triflusulfuron, tritosulfuron and agriculturally acceptable salts and esters thereof; Thiadiazolylurea herbicides include, but are not limited to buthiuron, ethidimuron, tebuthiuron, thiazafluron, and thidiazuron and agriculturally acceptable salts and esters thereof; Protoporphyrinogen Oxidase (PPO) inhibitors are selected from carfentrazone, carfentrazone-ethyl, sulfentrazone, fluthiacet-methyl, saflufenacil, diphenyl ethers, oxadiazoles, cyclic imides and pyrazoles. Examples of these PPO classes include, without limitation, acifluorfen, acifluorfen-sodium, azafenidin, bifenox, butafenacil, chlomethoxyfen, chlornitrofen, ethoxyfen-ethyl, fluorodifen, fluoroglycofen-ethyl, fluoronitrofen, fluthiacet-methyl, fomesafen, furyloxyfen, halosafen, lactofen, nitrofen, nitrofluorfen, oxyfluorfen, flumiclorac-pentyl, flumioxazin, profluazol, pyrazogyl, oxadiargyl, oxadiazon, pentoxazone, fluazolate, pyraflufen-ethyl, benzfendizone, butafenacil, cinidon-ethyl, flumipropyn, flupropacil, fluthiacet-methyl, thidiazimin, azafenidin, carfentrazone, carfentrazone-ethyl, sulfentrazone, saflufenacil, flufenpyr-ethyl, ET-751, JV 485, nipyraclofen, or mixtures of two or more thereof. Preferably the PPO inhibitors are selected from carfentrazone, sulfentrazone, fluthiacet-methyl, saflufenacil, and mixtures of two or more thereof; and other herbicides including, but not limited to acrolein, allyl alcohol, aminocyclopyrachlor, azafenidin, bentazone, bentranil, benzobicyclon, bicyclopyrone, buthidazole, calcium cyanamide, chlorfenac, chlorfenprop, chlorflurazole, chlorflurenol, cinmethylin, clomazone, CPMF, cresol, cyanamide, ortho-dichlorobenzene, dimepiperate, dithioether, endothal, fluoromidine, fluridone, flurochloridone, flurtamone, funaihecaoling, glufosinate, herbimycin, huancaiwo, indanofan, methoxyphenone, methyl isothiocyanate, OCH, oxaziclomefone, pelargonic acid, pentachlorophenol, pentoxazone, phenylmercury acetate, prosulfalin, pyribenzoxim, pyriftalid, quinoclamine, rhodethanil, saflufenacil, sulglycapin, tavron, thidiazimin, tridiphane, trimeturon, tripropindan, tritac, and agriculturally acceptable salts and esters thereof.

Herbicidal Compositions

The compositions of the present disclosure can be in any conventional agriculturally useful form, for example, in the form of a twin pack, or in a ready-to-use formulation, or in the form of a tank mix. Additionally, the active compounds can be supplied (either separately or pre-mixed) in any appropriate formulation type, for example an emulsifiable concentrate (EC), a suspension concentrate (SC), a suspoemulsion (SE), a capsule suspension (CS), a water dispersible granule (WG), an emulsifiable granule (EG), a water in oil emulsion (EO), an oil in water emulsion (EW), a microemulsion (ME), an oil dispersion (OD), an oil miscible flowable (OF), an oil miscible liquid (OL), a soluble concentrate (SL), an ultra-low volume suspension (SU), an ultra-low volume liquid (UL), a dispersible concentrate (DC), or a wettable powder (WP). Moreover, the formulations may include or be used in combination with any agriculturally acceptable adjuvant. In a preferred embodiment, the compositions of the present disclosure are supplied as an emulsifiable concentrate (EC), a suspension concentrate (SC) or a capsule suspension (CS).

The herbicidal compositions of this invention may (and in particular with respect to the before-mentioned formulation types) further comprise one or more formulation agents, for example antimicrobial agents, surfactants, viscosity enhancing agents (like thickeners), antifoam agents, antifreeze agents, co-solvents, adjuvants and/or carriers. In some embodiments, herbicidally active ingredients (the first herbicide, the second herbicide and any further herbicides) are present in a total amount in the range of 0.01% to 95% by weight. In some embodiments, agriculturally acceptable carriers constitute about 4% to about 98.5% by weight. Surfactants, viscosity enhancing agents, and solvents respectively can constitute in the range of 1% to 15% of the final formulation by weight. In one preferred embodiment, the herbicidal compositions of this invention are formulated as an emulsifiable concentrate (EC), a suspension concentrate (SC) or a capsule suspension (CS).

In yet another aspect of this invention, the herbicidal compositions of this invention comprise: (i) first herbicide beflubutamid, or an optically enriched form thereof; (ii) a second herbicide as further specified herein; (iii) optionally a further herbicide; and (iv) at least one inactive component selected from at least one antimicrobial, at least one surfactant, at least one thickener, at least one antifoam, at least one antifreeze, at least one solvent, and at least one co-solvent.

One aspect of the invention is directed to a herbicidal composition comprising: (i) a first herbicide beflubutamid, or an optically enriched form thereof; (ii) a second herbicide as further specified herein; (iii) optionally a further herbicide; and (iv) at least one formulation component selected from formulation agents for EC formulations; formulation agents for SC formulations; and formulation agents for CS formulations.

In yet another aspect of this invention, a herbicidal composition is described for example in a SC form that may contain a surfactant from a very large variety of surfactants known in the art which can also be commercially available.

Surfactants generally used in the herbicidal compositions may belong to different classes such as cationic surfactants, anionic surfactants, non-ionic surfactants, ionic surfactants, and amphoteric surfactants. According to the invention, the surfactant can be any surfactant or combination of two or more surfactants useful to dissolve the herbicide compound, for example, in its acid form to produce a microemulsion-forming-concentrate.

Examples of some preferred surfactants include cationic, non-ionic, and anionic surfactants. Of these, some even more specific types of preferred surfactants include non-ionic linear or branched alcohol ethoxylate surfactants, anionic phosphoric acid ester surfactants (sometimes referred to as "phosphate ester" surfactants), and cationic ethoxylated tallow amine surfactants.

Non-ionic surfactants suitable for this invention include ethoxylated linear alcohol, ethoxylated alkyl phenol, alkyl EO/PO copolymer, polyalkylene glycol monobutyl ether ethoxylated fatty acids/oils, sorbitan laurate, polysorbate, sorbitan oleate, ethoxylated fatty acid alcohols, or alkyl phenols.

In another embodiment of this invention, the composition of this invention may contain a thickener. Suitable thickeners are rice, starch, gum arabic, gum tragacanth, guar flour, British gum, starch ethers and starch esters, gum resins, galactomannans, magnesium aluminum silicate, xanthan gum, carrageenan, cellulose derivatives, methyl cellulose, alginates and combinations thereof. Other known commercial products may include Lattice NTC 50, Lattice NTC 60, methocel, clay, and veegum silica.

In another embodiment, the compositions of this invention may contain an antifreeze agent such as ethylene glycol, propylene glycol, urea, calcium chloride sodium nitrate, magensiul chloride and ammonium sulfate. Other inactive agents may include an antimicrobial agents such as Proxel GXL, Bronopol, BHT, BHA, Dowcide A Kathon.

Solvents may include aromatic and linear solvents. Aromatic solvents include aromatic 100, aromatic 150, aromatice 150 ND, aromatic 200 ND, isopar M, paraffinic oil, Sunspray 6 or 11 N, vegetable oil, methyl ester of fatty acid, Dimethyl caprylamide. Antifoam agents such as Xiameter AFE-100, Dow Corning AFs, Dow Corning 1520, 1530, or 1540 may also be used in the presently claimed formulations.

At least another embodiment is directed to compositions containing beflubutamid and a second herbicide and optionally further herbicides in amounts ranging from about 30 to about 50% w/w, preferably about 35 to about 45% w/w, and more preferably about 40% w/w. In another embodiment, the compositions of this invention contain an antifreeze agent in amounts of ranging from about 1 to about 15% w/w, preferably about 3 to about 8% w/w and more preferably about 5 to about 7% w/w. In another embodiment, the amounts of the surfactant within the compositions of this invention ranging from about 1 to about 10% w/w, preferably about 3 to about 8% w/w, and more preferably about 5 to about 7% w/w. In one embodiment, the antifreeze agent is propylene glycol in amount ranging from about 3 to about 8% w/w, and the surfactant is Tergiot in amount of about 6% w/w.

In a more preferred embodiment, the composition is in the form of an SC comprising at least one a surfactant, a thicker and a solvent and optionally an antifoam agent. In yet another embodiment, the formulation is a CS formulation comprising a thickener, Reax or lignin derivatives, and a solvent. In yet another embodiment, the formulation is an EC formulation comprising a solvent, a surfactant, castor oil ethoxylated or nonyl phenol and DDBS or equivalents thereof.

In another embodiment of this invention, the compositions of this invention are prepared by a process following the steps of combining the herbicidal active ingredient in effective amounts with suitable surface-active agent, emulsifier desired amounts, viscosity enhancing agents, and suitable solvent.

In another embodiment, the mixture further undergoes a milling process until suitable particle sizes ranging from about 1 to about 250 microns are obtained. In yet another embodiment, beflubutamid and the second herbicide may have particle sizes of less than 250, less than 100 or preferably less than 50 microns. In a preferred embodiment, the mixture is milled until 90% of the particle size (D90) is less than about 50 microns.

Formulation agents for an EC formulation may include one or more of those selected from ethylene oxide-propylene oxide block copolymers (e.g. Pluronic®) or nonylphenol ethoxylates (e.g. Tergitol®), Dextrol™ phosphate ester surfactants, ethoxylated polyarylphenol phosphate ester surfactants (e.g. Soprophor® FLK), caster oil ethoxylated or nonyl phenol, DDBS or equivilant, and solvents. Formulation agents for an SC formulation may include one or more selected from nonylphenol ethoxylates, ethylene oxide-propylene oxide block copolymers, phosphate ester surfactants, ethoxylated polyarylphenol phosphate ester surfactants, glycol, glycerine, water, antifoaming agents, clay and thickeners. Formulation agents for a CS formulation may include one or more selected from solvents, polymeric materials, Reax or lignin derivatives, salts and thickeners such as xanthan. Generally, glycols may also be used in CS, EW, SE or SS type formulations as an antifreeze agent.

Methods for Controlling Undesired Vegetation in a Crop

Another aspect of the invention is directed to a method of controlling undesired vegetation in a crop comprising applying to the locus of such vegetation a herbicidally effective amount of a composition comprising a first herbicide beflubutamid, or an optically enriched form thereof, and a second herbicide, as further specified herein. The crop may be selected from broadleaf crops and grass crops, and the undesired vegetation is selected from grass weeds and broadleaf weeds.

It should be understood that each of the combinations specified under the heading "Selected aspects of the invention" may be applicable in the methods described here and in the following, and that it is envisages and even demonstrated in the Examples section that the herbicide combinations exhibit an enhanced herbicidal effect against one or more weeds, and therefore are particularly useful for controlling undesired vegetation (i.e. weed(s)) in a crop. Particularly relevant crops are corn, wheat, barley, soybean, rice and sunflower.

Enhanced effect has been described as "the cooperative action of two components (e.g., component (a) and component (b)) in a mixture, such that the total effect is greater or more prolonged than the sum of the effects of the two (or more) taken independently" (see P. M. L. Tames, Neth. J. Plant Pathology 1964, 70, 73-80). Mixtures containing beflubutamid with other herbicidal agents (second herbicides) are found to exhibit enhanced effects against certain important weeds.

The presence of an enhanced effect between two active ingredients is established with the aid of the Colby equation (see S. R. Colby, "Calculating Synergistic and Antagonistic Responses of Herbicide Combinations, Weeds, 1967, 15, 20-22):

$$p = A + B - (A \times B)/100$$

Using the method of Colby, the presence of an enhanced effect interaction between two active ingredients is established by first calculating the predicted activity, p, of the mixture based on activities of the two components applied alone. If p is lower than the experimentally established effect, an enhanced effect has occurred. If p is equal or higher than the experimentally established effect, the interaction between the two components is characterized to be only additive or antagonism. In the equation above, A is the observed result of one component applied alone at rate x. The B term is the observed result of the second component applied at rate y. The equation estimates p, the observed result of the mixture of A at rate x with B at rate y if their effects are strictly additive and no interaction has occurred. To use the Colby equation the active ingredients of the mixture are applied in the test separately as well as in combination.

The formula can also be used to determine improved crop safety (less injury) by comparing the observed crop injury to the injury predicted by the equation. If the observed injury is less than predicted, the combination provides improved crop safety.

In some embodiments, the compositions and methods disclosed herein exhibit an enhanced effect as defined by the Colby equation. In some embodiments, the joint action of beflubutamid and a second herbicide results in enhanced activity against undesired vegetation (via an enhanced effect), even at application rates below those typically used for the pesticide to have a herbicidal effect on its own. In some embodiments, the compositions and methods disclosed herein can, based on the individual components, be used at lower application rates to achieve an herbicidal effect comparable to the effect produced by the individual components at normal application rates. In some embodiments, the compositions and methods disclosed herein provide an accelerated action on undesired vegetation (i.e., they effect damaging of undesired vegetation more quickly compared with application of the individual herbicides).

In at least one embodiment, the enhanced effects of the presently described combinations are observed in such species including annual bluegrass, Benghal dayflower, black nightshade, blackgrass, cheat, common chickweed, common cocklebur, common lambsquarters, common ragweed, hairy beggarticks, Italian ryegrass, ivyleaf morningglory, jimsonweed, johnsongrass, littleseed canarygrass, Pennsylvania smartweed, pitted morningglory, purple nutsedge, quackgrass, shepherd's purse, velvetleaf, wild buckwheat, wild mustard, and wild oat.

In another embodiment, methods of controlling undesired vegetation in a crop are described by applying to the locus of such vegetation an herbicidally effective amount of a composition containing a first herbicide beflubutamid and a second herbicide that is different from the first herbicide, wherein the crop is selected from wheat, potato, soybean, corn, rice, sorghum, oilseed rape, barley, rye, cowpea, oat, sunflower, and canola. In a more preferred embodiment, the crop is wheat, sunflower and canola.

In at least one aspect of this invention, the present compositions comprising beflubutamid and the second herbicide may be applied pre-emergently or post-emergently. The amount constituting an effective amount is variable and generally depends on a number of factors such as the type of soil, the expected pattern of rainfall or irrigation, the plant species to be controlled and the susceptibility of the particular crop involved. However, the effective amounts are typically between about 1 and about 4000 grams of the herbicide active ingredient may need to be applied per hectare. Such compounds are generally applied at a rate between 20 to about 2000 grams active ingredient/hectare (ai/ha). In more preferred embodiments, the amounts are applied at a rate of between about 125 and 1500 grams ai/ha.

In one aspect of this invention, the compositions of this invention selectively protect crops that are a member of any of the following crop groups including, bananas, beans, beets, cassava, cereals, citrus, cocoas, coconuts, coffee, corn, cotton, fiber crops, flowers, forge corps, forestry, groundnuts, peanuts, hops, horticultures, non-land crops, oil palm, oilseed rape, peas, pomes, potato, rice, stonefruit, spices, sugar cane, sunflower, tea, tobacco, tomatoes, tree nuts, turf, vegetable crops, vines, or grapes. In at least one embodiment, the crops are potato, soybean, corn, rice, sorghum, oil seed rape, barley, rye, cowpea or canola.

More specifically, such crops include, but are not limited to, bananas, plantains, beets including beets used for fodder, sugar beets, cassava, barley, barley-spring, barley-winter, oats, oats+triticale-winter, oats-spring, oats-winter, rye, rye-winter, stubble, triticale, triticale+rye, wheat, wheat/barley, wheat-durum, wheat-spring, wheat-winter, citrus, grapefruit, lemons/limes, oranges, cocoa, coconuts, coffee, corn including fodder corn, grain corn and sweet corn, corn+sorghum-spring, cotton, flax, carnation, chrysanthemum, flowers, gladioli, ornamentals: nursery, roses, alfalfa, brassicas: fodder or forage crops including clover, grass, pasture, rangeland, forestry, fallow land, idle crop land, land reclamation, summer fallow, groundnuts, peanuts, hops, horticulture, industrial markets, aquatic weed, oil palm, canola, rapeseed, rapeseed-spring, rapeseed-winter, linseed, lupin, mustard, oil seeds, safflower seed, sesame seed, olives, berries, blackberries, cranberries, currants, durians, guavas, kiwifruit, lychees, mangoes, papayas, persimmon, pineapple, rambutans, strawberries, tropical fruits, beans, chickpeas, lentils, mung beans, peas, pulses/gram, apples, apricots, avocados, cherries, fruit, peaches, nectarines, pears, plums, pome fruit, pome/stone fruit, tree crops: waxapples, potatoes, potatoes: seed, potatoes: sweet, rice, rice: paddy, rice: upland, rubber, millet, sm. grain: other, sorghum, soybean, cardamom, cloves, ginsing, pepper: black, spices, sugar cane, sunflower, tea, tobacco, tomatoes, field tomatoes, green tomatoes, red tomatoes, almonds, *betel* nuts, cashews, hazelnuts, macadamia nuts, pecans, pistachios, walnuts, turf/lawns, agave, asparagus, brassicas: vegetable, broccoli, cabbage, Chinese cabbage, carrots, chicory, cruciferae, cucumbers, cucurbits, eggplant, garlic, herbs, lettuce, melons, onions, onions/garlic, peppers/chillies, field peppers, Japanese radish, squash, vegetable crops, field vegetables, other vegetables, watermelons, and grapes.

Cucurbits include such crops as Melons: *Benincasa* spp., *Citrullus* spp., *Cucumis* spp., *Momordica* spp.; Watermelon: *Citrullus lanatus*; Pumpkin: *Cucurbita pepo*; Squash: *Cucurbita argyrosperma, C. ficifolia, C. maxima, C. moschata*; and Cucumber: *Cucumis sativus*. In one embodiment, the crop includes wheat varieties such as Bloc, Kord, Wyalkatchem and Mace.

In one embodiment, the crop is selected from wheat, potato, soybean, corn, rice, *sorghum*, oil seed rape, barley, rye, cow pea, oat and canola. In one embodiment of the method the crop is wheat or corn. In a preferred embodiment, the crop is wheat, corn, rice or soybean.

In another aspect of this invention, the presently claimed compositions are selective against weeds including but are not limited to, fleabane, sowthistle, grass weeds, broadleaf weeds, barnyardgrass (*Echinochloa crus-galli*), jimsonweed (*Datura stramonium*), velvetleaf (*Abutilon theophrasti*), common cockelbur (*Xanthium strumarium*) and hairy beggartickss (*Bidens pilosa*), Italian ryegrass (*Lolium perenne. multiflorum*), annual bluegrass (*Poa annua*), common lambsquarters (*Chenopodium album*), littleseed canarygrass (*Phalaris minor*), common chickweed (*Stellaria media*) corn poppy (*Papaver rhoeas*), Pennsylvania smartweed (*Polygonum pennsylvanicum*), Palmer amaranth (*Amaranthus palmeri*), velvetleaf (*Abutilon theophrasti*), green foxtail (*Setaria viridis*), morningglory (*Ipomoea* spp.), yellow nutsedge (*Cyperus esculentus*), purple nutsedge (*Cyperus rotundus*) and benghal dayflower (*Commelina benghalensis*), *Atriplex prostrate, Capsella bursa-pastoris, Desuraina sophia, Galium aparine, Lamium purpurum, Matricaria recutita, solanum nigrum, Stellaria media, Viola arvensis*.

Yet another aspect of the invention is directed to a method of controlling undesired vegetation in a crop comprising applying to the locus of such vegetation a herbicidally effective amount of a composition comprising a first herbicide beflubutamid and a second herbicide, wherein the crop may be selected from bananas, beans, beets, cassava, cereals, citrus, cocoas, coconuts, coffee, corn, fiber crops, flowers, forestry, forage crops, grapes, groundnuts, hops, horticultures, non-land crops, oil palm, oilseed rape, peas, peanuts, pomes, potato, rice, spices, stonefruit, sugarcane, sunflower, tea, tobacco, tree nuts, turf, vegetable crops, vines, wheat, and the undesired vegetation may be selected from annual bluegrass, Benghal dayflower, blackgrass, black nightshade, broadleaf signalgrass, Canada thistle, cheat, common cocklebur, common ragweed, corn poppies, field violet, giant foxtail, goosegrass, green foxtail, guinea grass, hairy beggarticks, herbicide-resistant blackgrass, horseweed, Italian ryegrass, jimsonweed, johnsongrass (*Sorghum halepense*), large crabgrass, littleseed canarygrass, morningglory spp., Pennsylvania smartweed, pitted morningglory, prickly *sida*, quackgrass, redroot pigweed, shattercane, shepherd's-purse, silky windgrass, sunflower (as weed in potato), wild buckwheat (*Polygonum convolvulus*), wild mustard (*Sinapis arvensis*), wild oat (*Avena fatua*), wild pointsettia, yellow foxtail, and yellow nutsedge. In one embodiment, the crop is selected from beets, cereals, corn, peanuts, oil palm, oilseed rape, peas, potato, rice, sugarcane, sunflower, tobacco, vegetable crops, and wheat. In a preferred embodiment, the crop is wheat.

In yet another preferred embodiment, new methods of use of combinations of beflubutamid and the second herbicide are described on such crops as bananas, beans, beets, Cassava, cereals, citrus, cocoas, coconuts, coffee, fiber crops, flowers, forestry, forge corps, grapes, groundnuts, hops, horticultures, non-land crops, oil palm, oilseed rape, peas, pomes, potato, spices, stonefruit, sugar cane, Sunflower, tea, tobacco, tree nuts, turf, vegetable crops, vines, wheat. In yet another embodiment, the preferred crops are beets, cereals, corn, groundnuts, peanuts, oil palm, oilseed rape, peas, potato, rice, sugar cane, sunflower, tobacco, vegetable crops, or wheat.

In yet another preferred embodiment, methods of controlling undesirable plants and weeds are described using a combination of beflubutamid and a second herbicide against annual blue grass, Benghal dayflower, black grass, black night shade, broadleaf signal grass, Canada thistle, cheat, common cocklebur, common ragweed, corn poppies, field violet, giant foxtail, goose grass, green fox tail, guinea grass, hairy beggarticks, herbicide-resistant black grass, horseweed, Italian rye grass, jimsonweed, johnsongrass, large crabgrass, little seed canary grass, morning glory, Pennsylvania smartweed, pitted morningglory, prickly *sida*, quack grass, redroot pigweed, shatter cane, shepherd's purse, silky windgrass, sunflower (as weed in potato), wild buckwheat, wild mustard, wild oat, wild pointsettia, yellow foxtail, and yellow nutsedge.

The following examples serve only to illustrate the invention and should not be interpreted as limiting the scope of the invention in any way, since further modifications encompassed by the disclosed invention will be apparent to those skilled in the art. All such modifications are deemed to be within the scope of the invention as defined in the present specification and claims.

EXAMPLES

Test compositions containing the test compounds were diluted with water to provide the appropriate test rate concentrations.

For pre-emergence testing, four disposable fiber flats (6 inch by 10 inch) for each rate of application of each herbicide solution were filled with top soil, to which seeds of each species were planted in furrows made by a template pressed on the top of the soil. The furrows were covered with soil after planting the seed and were watered well before application of the test compounds.

Fiber flats designated for treatment were placed in a spray chamber having a static platform and a movable sprayer and the height of the spray nozzle was 10.5 inches above the soil level. Once the sprayer was calibrated using water for spray volume of 30 gallons per acre, flats were sprayed with sprayer at a speed to receive a coverage equivalent of 30 gallons per acre. The application rates are those shown in the Tables below for the individual herbicidal solutions and the herbicide compositions of this invention. The pre-emergence flats were immediately placed in the greenhouse and watered lightly after treatment. Thereafter they were regularly watered and fertilized for the duration of the test.

For post-emergence testing, seeds of each species for each rate of application of each herbicide solution were planted in 7.5 cm×7.5 cm plastic pots filled with potting soil. The seeds were germinated and the resulting plants were allowed to grow in a greenhouse until they reached a growth stage, such as height, suitable for testing. Treatments were applied using compressed air in a track spray chamber at 30 gallons/acre (280 L/ha) using a TeeJet 8001E nozzle at 40 psi (2.76 bars). Pots of post-emergent treated plants were returned to the greenhouse and not watered for 24 hours after treatment. Thereafter they were regularly watered and fertilized for the duration of the test.

The control of weeds was evaluated in each experimental test at 21 for wheat and 28 days after treatment (DAT) for all species. Data were analyzed using Minitab software at 95% confidence interval. The results, shown as an average of the replications, were compared with results observed in untreated control flats in the same tests. Percent control was determined by a method similar to the 0 to 100 rating system disclosed in "Research Methods in Weed Science," 2nd ed., B. Truelove, Ed.; Southern Weed Science Society; Auburn University, Auburn, Ala., 1977. The rating system is as follows in Table 1.

TABLE 1

Weed Control Rating System

| Rating Percent Control | Description of Main Categories | Weed Control Description |
| --- | --- | --- |
| 0 | No Effect | No weed control |
| 10 |  | Very poor weed control |
| 20 | Slight Effect | Poor weed control |
| 30 |  | Poor to deficient weed control |
| 40 |  | Deficient weed control |
| 50 | Moderate Effect | Deficient to moderate weed control |
| 60 |  | Moderate weed control |
| 70 |  | Control somewhat less than satisfactory |
| 80 | Severe | Satisfactory to good weed control |
| 90 |  | Very good to excellent weed control |
| 100 | Complete Effect | Complete weed destruction |

Test treatments abbreviations are summarized in Table 2.

TABLE 2

Treatment Abbreviations

| | |
| --- | --- |
| NTC | Nontreated check |
| BFL | Beflubutamid* |
| PTX | Pethoxamid |
| DCI | 2-(2,4-dichlorophenyl)methyl-4,4-dimethyl-3-isoxazolidinone, CAS no. 81777-95-9 |
| FPT | 4-(4-Fluorophenyl)-6-(2-hydroxy-6-oxo-1-cyclohexen-1-yl)carbonyl)-2-methyl-1,2,4-triazine-3,5(2H,4H)-dione, CAS no. 1353870-34-4 |

TABLE 2-continued

Treatment Abbreviations

PYX  Pyroxasulfone
CLZ  Clomazone
GLY  Glyphosate

*BFL refers to racemic beflubutamid, (−)-BFL refers to beflubutamid optically enriched with respect to the (−)-enantiomer ((S)-isomer), and (+)-BFL refers to beflubutamid optically enriched with respect to the (+)-enantiomer ((R)-isomer).

Crop and weed species codes used in the testing are summarized in Tables 3 and 4.

TABLE 3

Crop and Weed Abbreviations

| Species (variety) | Code | Species (variety) | Code | Species (variety) | Code |
|---|---|---|---|---|---|
| Barley | B | Wheat | W | Rice | R |
| Corn | C | Wheat (Jagger) | W1 | Rice (Jupiter) | R1 |
| Oat | O | Oilseed Rape | OSR | Rice (Koshihikari) | R2 |
| Canola | CN | Soybean | GLYMX | | |

TABLE 4

Weed Abbreviations

| | |
|---|---|
| Annual bluegrass | POOAN |
| Barnyardgrass | ECHCG |
| Cheat grass | BROSE |
| Chinese sprangletop | LEFCH |
| Goosegrass | ELEIN |
| Green foxtail | SETVI |
| Italian ryegrass | LOLMU |
| Johnsongrass | SORHA |
| Large crabgrass | DIGSA |
| Jimsonweed | DATST |
| Redrice | ORYSA |
| Shattercane | SOBIA |
| Silky windgrass | APESV |
| Raphanus sativus L. | RAPSN |
| Common purslane | POROL |
| Field bindweed | CONAR |
| Giant foxtail | SETFA |
| Kochia | KCHSC |
| Tall morningglory | BHPBU |
| Velvetleaf | ABUTH |
| Yellow nutsedge | CYPES |
| Common ragweed | AMBEL |
| Rice flatsedge | CYPIR |

TABLE 4-continued

Weed Abbreviations

| | |
|---|---|
| Hemp sesbania | SEHE8 |
| Wild oat | AVEFA |
| Common chickweed | STEME |
| Yellow foxtail | SETLU |
| Palmer amaranth | AMAPA |
| Glyphosate resistant Palmer amaranth strain | AMAPA1 |
| Marestail (horsetail) | ERICA |
| Glyphosate resistant Marestail strain | ERICA1 |
| Glyphosate resistant Marestail strain | ERICA2 |
| Blackgrass | ALOMY |
| Herbicide resistant Blackgrass strain | HR1 |
| Herbicide resistant Blackgrass strain | HR2 |
| Herbicide resistant Blackgrass strain | HR3 |
| Common lambsquarters | CHEAL |
| Littleseed canarygrass | PHAMI |
| Common cocklebur | XANST |
| Canada thistle | CIRAR |

The results of herbicidal testing are summarized in Tables 5 to 49 below. In the tables, the symbol * denotes weed control enhanced effect as defined by Colby's formula, and the symbol #denotes decreased injury on crop species compared to that expected.

Table 5 summarizes the percentage of crop injury and weed control when BFL (racemic) was applied alone or as tank-mix with PYX or PTX in pre-emergent tests, with ratings made 28 DAT.

Among other tests, for common chickweed, 6% control was observed with BFL at 187.5 g, 67% control with PYX at 90 g, and 99% control for the combination.

For jimsonweed, 30% control was observed with BFL at 187.5 g, 72% control with PYX at 90 g, and 96% control for the combination; 4% control was observed with BFL at 62.5 g, 4% control with PTX at 90 g, and 96% control for the combination.

For hemp sesbania, 28% control was observed with BFL at 187.5 g, 67% control with PYX at 90 g, and 83% control for the combination. Crop injury was generally less than expected when the combinations were used.

Table 6 summarizes the percentage of crop injury and weed control at 28 DAT when BFL (racemic) was applied alone or as a tank-mix with PTX in post-emergent tests.

Table 7 summarizes the percentage of weed control at 28 DAT when BFL (racemic) was applied alone or as a tank-mix with FPT in pre-emergent tests.

Tables 8 and 9 summarize crop safety and weed efficacy when BFL (racemic) and DCI were each applied alone or together as a tank-mix in pre-emergent tests, with ratings made 28 DAT.

TABLE 5

| Treatment | Rate g ai/ha | B | C | R | W | ECH-CG | BRO-SE | STE-ME | CHE-AL | SET-VI | LOL-MU | DAT-ST | KCH-SC | AP-SEV | AVE-FA | ABU-TH | SEH-E8 |
|---|---|---|---|---|---|---|---|---|---|---|---|---|---|---|---|---|---|
| NTC | — | 0 | 0 | 0 | 0 | 0 | 0 | 0 | 0 | 0 | 0 | 0 | 0 | 0 | 0 | 0 | 0 |
| BFL | 62.5 | 2 | 2 | 0 | 0 | 18 | 7 | 2 | 25 | 89 | 3 | 4 | 0 | 2 | 13 | 3 | 0 |
| BFL | 93.75 | 6 | 5 | 3 | 5 | 64 | 6 | 3 | 33 | 99 | 47 | 7 | 25 | 3 | 8 | 12 | 2 |
| BFL | 125 | 2 | 2 | 1 | 2 | 70 | 15 | 2 | 52 | 87 | 9 | 8 | 5 | 7 | 25 | 17 | 7 |
| BFL | 187.5 | 4 | 3 | 1 | 2 | 92 | 22 | 6 | 70 | 95 | 23 | 30 | 15 | 18 | 27 | 25 | 28 |
| PYX | 45 | 38 | 3 | 96 | 19 | 100 | 100 | 81 | 94 | 96 | 99 | 52 | 11 | 100 | 83 | 68 | 50 |
| PYX | 90 | 55 | 0 | 86 | 23 | 100 | 100 | 75 | 99 | 98 | 100 | 72 | 63 | 100 | 96 | 93 | 67 |
| PTX | 445 | 12 | 39 | 85 | 27 | 100 | 72 | 2 | 84 | 97 | 97 | 4 | 0 | 97 | 70 | 18 | 22 |
| PTX | 890 | 23 | 35 | 80 | 34 | 100 | 80 | 15 | 95 | 99 | 95 | 40 | 5 | 100 | 62 | 7 | 58 |
| BFL + PYX | 62.5 + 45 | 13# | 1 | 72 | 7# | 100 | 100 | 93* | 97 | 99 | 99 | 83* | 41* | 100 | 93* | 75 | 52 |
| BFL + PYX | 93.7 + 45 | 9# | 1 | 65 | 3# | 100 | 100 | 91* | 100 | 99 | 98 | 83* | 47* | 100 | 74 | 72 | 38 |
| BFL + PYX | 125 + 45 | 19# | 2 | 65 | 9# | 98 | 99 | 92* | 97 | 97 | 97 | 78* | 60* | 100 | 90 | 78 | 47 |

TABLE 5-continued

| Treatment | Rate g ai/ha | B | C | R | W | ECH-CG | BRO-SE | STE-ME | CHE-AL | SET-VI | LOL-MU | DAT-ST | KCH-SC | AP-SEV | AVE-FA | ABU-TH | SEH-E8 |
|---|---|---|---|---|---|---|---|---|---|---|---|---|---|---|---|---|---|
| BFL + PYX | 187.5 + 45 | 30# | 2 | 82 | 12# | 100 | 100 | 88* | 99 | 99 | 100 | 85* | 18* | 100 | 92 | 91 | 42 |
| BFL + PYX | 62.5 + 90 | 37# | 2 | 75 | 6# | 100 | 100 | 91* | 100 | 99 | 100 | 93* | 81* | 100 | 93 | 100 | 87 |
| BFL + PYX | 93.7 + 90 | 48# | 0 | 77 | 17# | 100 | 100 | 93* | 100 | 99 | 97 | 95 | 92* | 99 | 91 | 93 | 81 |
| BFL + PYX | 125 + 90 | 48# | 6 | 79 | 24 | 99 | 100 | 95* | 100 | 99 | 97 | 98* | 96* | 100 | 95 | 95 | 59 |
| BFL + PYX | 187.5 + 90 | 51# | 3 | 88 | 7# | 100 | 99 | 99* | 100 | 99 | 99 | 96* | 78* | 100 | 97 | 87 | 83 |
| BFL + PTX | 62.5 + 445 | 15 | 23# | 12# | 9# | 100 | 79* | 13* | 100* | 99 | 98 | 47* | 13* | 99 | 45 | 3 | 25 |
| BFL + PTX | 93.7 + 445 | 20 | 43 | 55# | 17# | 100 | 71 | 50* | 99* | 100 | 93 | 50* | 10* | 100 | 38 | 18 | 24 |
| BFL + PTX | 125 + 445 | 23 | 37 | 25# | 11# | 100 | 79 | 57* | 95 | 99 | 96 | 55* | 10* | 99 | 84* | 17 | 35 |
| BFL + PTX | 187.5 + 445 | 14 | 15# | 32# | 10# | 90 | 69 | 79* | 99 | 100 | 96 | 63* | 2* | 100 | 43 | 25 | 40 |
| BFL + PTX | 62.5 + 890 | 26 | 36 | 85 | 14# | 100 | 90* | 90* | 100 | 96 | 93 | 70* | 10* | 100 | 70 | 17 | 42 |
| BFL + PTX | 93.7 + 890 | 20# | 48 | 71 | 27# | 100 | 95* | 37* | 99 | 100 | 90 | 50* | 7 | 100 | 60 | 32 | 36 |
| BFL + PTX | 125 + 890 | 40 | 63 | 42# | 17# | 100 | 96* | 87* | 99 | 100 | 97 | 66* | 3 | 100 | 79* | 20 | 46 |
| BFL + PTX | 187.5 + 890 | 15# | 45 | 94 | 17# | 100 | 95* | 80* | 99 | 100 | 94 | 69* | 5 | 99 | 88* | 47 | 65 |

TABLE 6

| | | R1 | R2 | W1 | POAAN | ECHCG | AMBEL | BROSE | LEFCH | ELEIN | SETVI |
|---|---|---|---|---|---|---|---|---|---|---|---|
| | | | | | | Height at Application (cm) | | | | | |
| Treatment | Rate g ai/ha | 10 | 10-12 | 18 | 3 | 10 | 8 | 8 | 0.5-1 | 2-2.5 | 5 |
| NTC | — | 0 | 0 | 0 | 0 | 0 | 0 | 0 | 0 | 0 | 0 |
| BFL | 94 | 4 | 11 | 10 | 0 | 0 | 8 | 0 | 83 | 0 | 12 |
| BFL | 125 | 7 | 13 | 8 | 18 | 17 | 11 | 4 | 77 | 2 | 17 |
| BFL | 188 | 5 | 15 | 14 | 14 | 30 | 7 | 11 | 78 | 19 | 17 |
| PTX | 445 | 2 | 16 | 6 | 6 | 73 | 17 | 0 | 2 | 88 | 6 |
| BFL + PTX | 94 + 445 | 4 | 21 | 4# | 35* | 78 | 28 | 0 | 93* | 89 | 55* |
| BFL + PTX | 125 + 445 | 11 | 15# | 6# | 70* | 96* | 27 | 4 | 99* | 95* | 72* |
| BFL + PTX | 188 + 445 | 9 | 23# | 9# | 65* | 96* | 32* | 18* | 87* | 91 | 75* |

| | LOLMU | SORHA | DIGSA | PHAMI | ERICA | ORYSA | CYPIR | SOBIA | AVEFA |
|---|---|---|---|---|---|---|---|---|---|
| | | | | | Height at Application (cm) | | | | |
| Treatment | 8 | 6 | 4-5 | 9 | 4-5 rosette | 18 | 2-3 | 7 | 10-12 |
| NTC | 0 | 0 | 0 | 0 | 0 | 0 | 0 | 0 | 0 |
| BFL | 0 | 0 | 0 | 0 | 9 | 14 | 0 | 0 | 8 |
| BFL | 2 | 4 | 6 | 0 | 8 | 12 | 0 | 4 | 10 |
| BFL | 15 | 29 | 5 | 0 | 10 | 24 | 21 | 5 | 12 |
| PTX | 82 | 11 | 8 | 0 | 0 | 33 | 100 | 0 | 12 |
| BFL + PTX | 62 | 23* | 10 | 0 | 4 | 37 | 99 | 2 | 6 |
| BFL + PTX | 40 | 20* | 25* | 0 | 12 | 27 | 100 | 2 | 12 |
| BFL + PTX | 45 | 27 | 75* | 45* | 13 | 22 | 100 | 8 | 16 |

TABLE 7

| Treatment | Rate g ai/ha | ECHCG | STEME | POROL | CONAR | SETFA | ELEIN | SETVI |
|---|---|---|---|---|---|---|---|---|
| NTC | — | 0 | 0 | 0 | 0 | 0 | 0 | 0 |
| BFL | 94 | 52 | 12 | 100 | 17 | 97 | 82 | 98 |
| BFL | 125 | 78 | 40 | 100 | 13 | 100 | 93 | 99 |
| BFL | 188 | 93 | 82 | 100 | 24 | 98 | 100 | 100 |
| FPT | 19 | 27 | 17 | 99 | 33 | 10 | 60 | 8 |
| FPT | 25 | 30 | 12 | 100 | 30 | 23 | 58 | 7 |
| BFL + FPT | 94 + 19 | 79* | 33* | 100 | 47 | 100 | 91 | 45 |
| BFL + FPT | 94 + 25 | 86* | 55* | 100 | 37 | 100 | 95 | 98 |
| BFL + FPT | 125 + 19 | 85 | 48 | 100 | 45 | 100 | 96 | 100 |
| BFL + FPT | 125 + 25 | 93* | 68* | 100 | 58* | 100 | 99 | 100 |

TABLE 7-continued

| | | | | | | | | |
|---|---|---|---|---|---|---|---|---|
| BFL + FPT | 188 + 19 | 92 | 77 | 100 | 67* | 100 | 100 | 100 |
| BFL + FPT | 188 + 25 | 99 | 90* | 100 | 50 | 100 | 100 | 100 |

| Treatment | LOLMU | KCHSC | DIGSA | BHPBU | ABUTH | AVEFA | CYPES |
|---|---|---|---|---|---|---|---|
| NTC | 0 | 0 | 0 | 0 | 0 | 0 | 0 |
| BFL | 2 | 25 | 99 | 7 | 3 | 23 | 0 |
| BFL | 8 | 27 | 100 | 13 | 0 | 10 | 4 |
| BFL | 10 | 22 | 100 | 10 | 1 | 20 | 0 |
| FPT | 5 | 89 | 50 | 15 | 99 | 7 | 81 |
| FPT | 3 | 87 | 81 | 0 | 100 | 14 | 85 |
| BFL + FPT | 2 | 77 | 100 | 3 | 100 | 36* | 85 |
| BFL + FPT | 7 | 88 | 100 | 38* | 100 | 37 | 88 |
| BFL + FPT | 7 | 79 | 100 | 42* | 97 | 42* | 81 |
| BFL + FPT | 9 | 78 | 100 | 40* | 100 | 45* | 89 |
| BFL + FPT | 31* | 72 | 100 | 43* | 90 | 29 | 86* |
| BFL + FPT | 20* | 95* | 100 | 49* | 100 | 17 | 89 |

TABLE 8

| Treatment | Rate g ai/ha | B | C | R | W | POOAN | ECHCG | BROSE | LEFCH | ELEIN |
|---|---|---|---|---|---|---|---|---|---|---|
| NTC | — | 0 | 0 | 0 | 0 | 0 | 0 | 0 | 0 | 0 |
| BFL | 94 | 1 | 0 | 2 | 0 | 0 | 68 | 3 | 91 | 89 |
| BFL | 125 | 1 | 0 | 2 | 0 | 3 | 81 | 9 | 81 | 84 |
| BFL | 188 | 3 | 5 | 3 | 2 | 18 | 96 | 4 | 99 | 87 |
| DCI | 125 | 1 | 1 | 3 | 2 | 7 | 93 | 27 | 99 | 100 |
| DCI | 250 | 1 | 2 | 15 | 3 | 13 | 91 | 42 | 99 | 100 |
| BFL + DCI | 94 + 125 | 1 | 1 | 3 | 1 | 9 | 99 | 18 | 100 | 100 |
| BFL + DCI | 125 + 125 | 3 | 9 | 3 | 1 | 57* | 100 | 40 | 96 | 100 |
| BFL + DCI | 188 + 125 | 1 | 8 | 4 | 3 | 53* | 100 | 18 | 100 | 100 |
| BFL + DCI | 94 + 250 | 4 | 12 | 21 | 15 | 7 | 100 | 57* | 100 | 100 |
| BFL + DCI | 125 + 250 | 2 | 5 | 15 | 8 | 38* | 100 | 64* | 99 | 100 |
| BFL + DCI | 188 + 250 | 7 | 22 | 37 | 24 | 57* | 100 | 53* | 100 | 100 |

| Treatment | SETVI | LOLMU | SORHA | DIGSA | PHAMI | ORYSA | SOBIA | APESV | AVEFA |
|---|---|---|---|---|---|---|---|---|---|
| NTC | 0 | 0 | 0 | 0 | 0 | 0 | 0 | 0 | 7 |
| BFL | 95 | 4 | 12 | 99 | 89 | 13 | 23 | 3 | 10 |
| BFL | 97 | 7 | 10 | 99 | 71 | 1 | 3 | 13 | 13 |
| BFL | 99 | 18 | 33 | 99 | 86 | 6 | 21 | 54 | 14 |
| DCI | 100 | 83 | 47 | 83 | 83 | 28 | 10 | 35 | 81 |
| DCI | 100 | 94 | 90 | 99 | 77 | 50 | 25 | 12 | 78 |
| BFL + DCI | 100 | 92* | 57 | 100 | 100 | 11 | 22 | 17 | 65 |
| BFL + DCI | 100 | 78 | 72* | 100 | 68 | 19 | 38* | 68 | 54 |
| BFL + DCI | 100 | 89 | 65 | 100 | 100 | 14 | 58* | 52 | 30 |
| BFL + DCI | 100 | 95 | 93 | 100 | 99 | 50 | 48+ | 6 | 90+ |
| BFL + DCI | 100 | 100* | 94 | 99 | 99 | 58 | 53+ | 25 | 95+ |
| BFL + DCI | 100 | 99 | 89 | 100 | 100 | 48 | 64+ | 37 | 98+ |

TABLE 9

| Treatment | Rate g ai/ha | ALOMY | BROSE | CHEAL | SETVI | LOLMU | PHAMI | AMAPA | AVEFA | SETLU |
|---|---|---|---|---|---|---|---|---|---|---|
| NTC | — | 0 | 0 | 0 | 0 | 0 | 0 | 0 | 0 | 0 |
| BFL | 94 | 2 | 3 | 18 | 95 | 4 | 4 | 12 | 1 | 80 |
| BFL | 125 | 7 | 3 | 42 | 100 | 1 | 7 | 69 | 3 | 95 |
| BFL | 188 | 21 | 8 | 51 | 100 | 5 | 15 | 77 | 12 | 95 |
| DCI | 125 | 42 | 37 | 24 | 97 | 93 | 34 | 30 | 37 | 13 |
| DCI | 250 | 90 | 66 | 86 | 100 | 95 | 43 | 95 | 90 | 80 |
| BFL + DCI | 94 + 125 | 59 | 24 | 85* | 100* | 66 | 36 | 77 | 45 | 96* |
| BFL + DCI | 125 + 125 | 52 | 47 | 96* | 100* | 95* | 63 | 96* | 62 | 99* |
| BFL + DCI | 188 + 125 | 78 | 46 | 97* | 100* | 91* | 48 | 95* | 54 | 98* |
| BFL + DCI | 94 + 250 | 88* | 49 | 93* | 100* | 98* | 65 | 96* | 83 | 100* |
| BFL + DCI | 125 + 250 | 91* | 69 | 99* | 100* | 96* | 75 | 98* | 72 | 100* |
| BFL + DCI | 188 + 250 | 97* | 60 | 100* | 100* | 97* | 95 | 100* | 91 | 100* |

Among other tests, for lambsquarters (CHEAL), BFL at 125 g/ha gave 42% control, DCI at 125 g/ha gave 24% control, and 96% control for the combination. For Palmer amaranth (AMAPA), BFL at 125 g/ha gave 69% control, DCI at 125 g/ha gave 30% control, and 96% control for the combination.

Tables 10 and 11 summarize the percentage of crop injury and weed control at 28 DAT when BFL (racemic) was applied alone or as a tank-mix with other herbicides in pre-emergent tests.

Table 12 summarizes the percentage of crop injury and weed control at 28 DAT when BFL (racemic) was applied alone or as a tank-mix with PYX or PTX in post-emergent tests.

Among other tests, for red rice, 69% control was observed with BFL at 187.5 g, 39% control with PYX at 90 g, and 75% control for the 0 combination. For green foxtail, 54% control was observed with BFL at 187.5 g, 66% control with PYX at 90 g, and 97% control for the combination; 54% control was observed with BFL at 187.5 g, 4% control with PTX at 890 g, and 97% control for the combination. For wild oats, 15% control was observed with BFL at 187.5 g, 48% control with PYX at 90 g, and 72% control for the combination. For common chickweed, 16% control was observed with BFL at 187.5 g, 22% control with PYX at 45 g, and 93% control for the combination. Beflubutamid showed significant crop injury on canola in this test, as did the combinations with other herbicides. Corn injury was less than expected when the combinations were used.

TABLE 11

| Treatment | Rate g ai/ha | ALOMY | STEME | LOLMU | DATST | DIGSA |
|---|---|---|---|---|---|---|
| NTC | — | 0 | 0 | 0 | 0 | 0 |
| BFL | 125 | 14 | 12 | 2 | 8 | 94 |
| BFL | 250 | 69 | 17 | 24 | 54 | 100 |
| FPT | 25 | 44 | 9 | 6 | 90 | 79 |
| FPT | 50 | 40 | 42 | 40 | 100 | 96 |
| DCI | 125 | 86 | 100 | 96 | 88 | 100 |
| DCI | 250 | 99 | 100 | 99 | 97 | 100 |
| PYX | 45 | 99 | 100 | 100 | 35 | 100 |
| PYX | 90 | 99 | 100 | 99 | 74 | 100 |
| PTX | 445 | 79 | 92 | 97 | 7 | 100 |
| PTX | 890 | 92 | 98 | 99 | 24 | 100 |
| BFL + FPT | 125 + 25 | 81* | 48* | 34 | 82 | 100 |
| BFL + FPT | 250 + 25 | 76 | 54* | 42 | 100 | 100 |
| BFL + FPT | 125 + 50 | 69* | 69* | 28 | 100 | 100 |
| BFL + FPT | 250 + 50 | 86 | 88* | 50 | 100 | 100 |
| BFL + DCI | 125 + 125 | 95* | 100 | 93 | 72 | 100 |
| BFL + DCI | 250 + 125 | 98 | 100 | 98 | 99 | 100 |
| BFL + DCI | 125 + 250 | 99 | 100 | 99 | 98 | 100 |
| BFL + DCI | 250 + 250 | 99 | 100 | 100 | 100 | 100 |
| BFL + PYX | 125 + 45 | 99 | 100 | 99 | 88 | 100 |
| BFL + PYX | 250 + 45 | 99 | 100 | 100 | 97* | 100 |
| BFL + PYX | 125 + 90 | 100 | 100 | 100 | 96* | 100 |
| BFL + PYX | 250 + 90 | 99 | 100 | 100 | 100* | 100 |
| BFL + PTX | 125 + 445 | 94* | 98* | 96 | 50* | 100 |
| BFL + PTX | 250 + 445 | 91 | 99* | 97 | 46 | 100 |
| BFL + PTX | 125 + 890 | 84 | 99 | 99 | 58* | 100 |
| BFL + PTX | 250 + 890 | 89 | 100 | 99 | 85* | 100 |

TABLE 10

| Treatment | Rate g ai/ha | B | O | OSR | W | ALOMY HR1 | HR2 | HR3 | LOLMU | AVEFA |
|---|---|---|---|---|---|---|---|---|---|---|
| NTC | — | 0 | 0 | 0 | 0 | 0 | 0 | 0 | 0 | 0 |
| BFL | 125 | 2 | 0 | 19 | 3 | 6 | 7 | 7 | 3 | 9 |
| BFL | 250 | 3 | 2 | 21 | 4 | 15 | 33 | 32 | 16 | 28 |
| FPT | 50 | 1 | 1 | 80 | 4 | 8 | 14 | 3 | 0 | 0 |
| DCI | 250 | 0 | 35 | 7 | 2 | 99 | 99 | 45 | 96 | 87 |
| PYX | 90 | 72 | 94 | 58 | 22 | 100 | 100 | 100 | 100 | 100 |
| PTX | 890 | 19 | 40 | 3 | 16 | 53 | 67 | 62 | 96 | 95 |
| CLZ | 240 | 27 | 27 | 40 | 91 | 22 | 78 | 7 | 69 | 100 |
| BFL + FPT | 125 + 25 | 2 | 3 | 47 | 2 | 1 | 2 | 1 | 0 | 5 |
| BFL + FPT | 250 + 25 | 3 | 0 | 72 | 2 | 8 | 7 | 12 | 5 | 37 |
| BFL + FPT | 125 + 50 | 3 | 2 | 100* | 1 | 12 | 17 | 15* | 4 | 15* |
| BFL + FPT | 250 + 50 | 2 | 0 | 92* | 6 | 30* | 40 | 47* | 37* | 40* |
| BFL + DCI | 125 + 125 | 7 | 3 | 45 | 3 | 95 | 100 | 45 | 58 | 43 |
| BFL + DCI | 250 + 125 | 13 | 2 | 47 | 5 | 84 | 97 | 57 | 87 | 69 |
| BFL + DCI | 125 + 250 | 0 | 14 | 52* | 1 | 95 | 99 | 72* | 93 | 79 |
| BFL + DCI | 250 + 250 | 5 | 16 | 47* | 3 | 97 | 99 | 76* | 95 | 83 |
| BFL + PYX | 125 + 45 | 32 | 61 | 17 | 4 | 100 | 99 | 100 | 100 | 99 |
| BFL + PYX | 250 + 45 | 24 | 42 | 58 | 0 | 100 | 100 | 100 | 100 | 99 |
| BFL + PYX | 125 + 90 | 50 | 78 | 58 | 1 | 100 | 100 | 100 | 100 | 100 |
| BFL + PYX | 250 + 90 | 53 | 86 | 84 | 7 | 100 | 100 | 100 | 100 | 100 |
| BFL + PTX | 125 + 445 | 15 | 20 | 3 | 9 | 28 | 42 | 55 | 85 | 75 |
| BFL + PTX | 250 + 445 | 4 | 28 | 20 | 37 | 43 | 86 | 84 | 100 | 100 |
| BFL + PTX | 125 + 890 | 56 | 67 | 27 | — | 66* | 91* | 81* | 100 | 99 |
| BFL + PTX | 250 + 890 | 28 | 37 | 25 | 7 | 82* | 83* | 97* | 100 | 98 |
| BFL + CLZ | 125 + 120 | 6 | 17 | 15 | 80 | 11 | 34 | 4 | 72 | 83 |
| BFL + CLZ | 250 + 120 | 3 | 7 | 32 | 86 | 9 | 45 | 7 | 63 | 96 |
| BFL + CLZ | 125 + 240 | 33 | 33 | 33 | 95 | 22 | 63 | 13 | 78* | 100 |
| BFL + CLZ | 250 + 240 | 40 | 32 | 57 | 90 | 27 | 54 | 27 | 92* | 100 |

TABLE 12

| Height at Application (cm) | | CN | R | ECHCG | STEME | LOLMU | RAPSN | ABUTH | AVEFA | POAAN | CHEAL |
|---|---|---|---|---|---|---|---|---|---|---|---|
| Treatment | Rate g ai/ha | 6 | 6 | 6-7 | 3-4 | 7-8 | 4-5 | 5-7 | 9-10 | 4 | 2 |
| NTC | — | 0 | 0 | 0 | 0 | 0 | 0 | 0 | 0 | 0 | 0 |
| BFL | 62.5 | 49 | 0 | 0 | 5 | 0 | 61 | 66 | 4 | 0 | 85 |
| BFL | 93.75 | 76 | 0 | 7 | 17 | 0 | 98 | 69 | 10 | 4 | 99 |
| BFL | 125 | 79 | 11 | 6 | 11 | 0 | 90 | 71 | 10 | 5 | 100 |
| BFL | 187.5 | 88 | 10 | 6 | 16 | 3 | 98 | 69 | 15 | 5 | 100 |
| PYX | 45 | 4 | 30 | 76 | 22 | 19 | 6 | 80 | 30 | 17 | 0 |
| PYX | 90 | 3 | 36 | 94 | 41 | 84 | 30 | 78 | 48 | 75 | 10 |
| PTX | 445 | 0 | 4 | 69 | 14 | 5 | 5 | 0 | 28 | 0 | 0 |
| PTX | 890 | 6 | 54 | 86 | 12 | 56 | 13 | 5 | 52 | 6 | 0 |
| BFL + PYX | 62.5 + 45 | 66* | 29# | 86* | 78* | 56* | 91* | 90 | 34 | 5 | 82 |
| BFL + PYX | 93.7 + 45 | 90* | 11# | 93* | 80* | 41* | 92 | 90 | 41 | 20 | 94 |
| BFL + PYX | 125 + 45 | 97* | 30# | 96* | 94* | 55* | 95 | 85 | 44* | 15 | 95 |
| BFL + PYX | 187.5 + 45 | 88* | 25# | 92* | 93* | 76* | 99 | 82 | 66* | 20 | 100 |
| BFL + PYX | 62.5 + 90 | 82* | 26# | 97 | 95* | 90* | 98* | 89 | 65* | 56 | 93 |
| BFL + PYX | 93.7 + 90 | 89* | 21# | 98 | 99* | 93* | 98 | 90 | 74* | 83* | 100 |
| BFL + PYX | 125 + 90 | 96* | 25# | 97 | 95* | 94* | 99* | 86 | 60* | 97* | 97 |
| BFL + PYX | 187.5 + 90 | 99* | 28# | 97 | 97* | 89 | 99 | 89 | 72* | 81 | 99 |
| BFL + PTX | 62.5 + 445 | 94* | 0# | 92* | 9 | 5 | 74* | 84* | 24 | 3 | 94 |
| BFL + PTX | 93.7 + 445 | 80 | 1# | 88* | 24 | 11 | 89 | 79* | 43* | 5 | 98 |
| BFL + PTX | 125 + 445 | 98* | 0# | 91* | 4 | 9 | 92 | 77* | 35 | 7 | 94 |
| BFL + PTX | 187.5 + 445 | 96* | 10# | 96* | 12 | 10 | 95 | 78* | 28 | 7 | 97 |
| BFL + PTX | 62.5 + 890 | 78* | 14# | 94* | 18 | 20 | 85* | 73* | 46 | 6 | 96 |
| BFL + PTX | 93.7 + 890 | 75 | 8# | 96* | 29 | 16 | 75 | 86* | 48 | 10 | 97 |
| BFL + PTX | 125 + 890 | 98* | 14# | 97* | 84 | 64* | 86 | 79* | 62* | 27 | 95 |
| BFL + PTX | 187.5 + 890 | 96* | 34# | 96* | 29 | 71* | 84 | 85* | 50 | 40 | 100 |

| Height at Application (cm) | | SETVI | SEBEX | DATST | KCHSC | DIGSA | ORYSA | AMARE | SOBIA | APESV | BROSE |
|---|---|---|---|---|---|---|---|---|---|---|---|
| Treatment | Rate g ai/ha | 3 | 4 | 4 | 5 | 4-5 | 9 | 5 | 5 | <1 | 7 |
| NTC | — | 0 | 0 | 0 | 0 | 0 | 0 | 0 | 0 | 0 | 0 |
| BFL | 62.5 | 22 | 98 | 79 | 41 | 0 | 0 | 52 | 0 | 0 | 0 |
| BFL | 93.75 | 21 | 95 | 60 | 44 | 13 | 0 | 59 | 0 | 3 | 0 |
| BFL | 125 | 26 | 97 | 88 | 46 | 8 | 6 | 60 | 0 | 5 | 0 |
| BFL | 187.5 | 54 | 98 | 98 | 45 | 5 | 9 | 60 | 1 | 2 | 0 |
| PYX | 45 | 0 | 0 | 41 | 0 | 34 | 27 | 39 | 22 | 98 | 11 |
| PYX | 90 | 66 | 65 | 54 | 46 | 52 | 39 | 35 | 60 | 99 | 74 |
| PTX | 445 | 2 | 0 | 12 | 0 | 0 | 4 | 8 | 15 | 98 | 1 |
| PTX | 890 | 4 | 3 | 21 | 0 | 10 | 28 | 12 | 24 | 97 | 10 |
| BFL + PYX | 62.5 + 45 | 71* | 72 | 89 | 44 | 45 | 52* | 56 | 20 | 99 | 7 |
| BFL + PYX | 93.7 + 45 | 93* | 87 | 99* | 45 | 25 | 54* | 54 | 21 | 99 | 6 |
| BFL + PYX | 125 + 45 | 89* | 96 | 98* | 44 | 39 | 59* | 65 | 44* | 77 | 8 |
| BFL + PYX | 187.5 + 45 | 92* | 98 | 100 | 36 | 37 | 45* | 54 | 44* | 100 | 4 |
| BFL + PYX | 62.5 + 90 | 94* | 87 | 100* | 36 | 45 | 61* | 72 | 86* | 99 | 35 |
| BFL + PYX | 93.7 + 90 | 97* | 98 | 98* | 42 | 74* | 78* | 92* | 85* | 100 | 51 |
| BFL + PYX | 125 + 90 | 94* | 97 | 99 | 45 | 55 | 69* | 93* | 90* | 100 | 49 |
| BFL + PYX | 187.5 + 90 | 97* | 99 | 100 | 50 | 85* | 75* | 80* | 91* | 100 | 68 |
| BFL + PTX | 62.5 + 445 | 59 | 83 | 92 | 34 | 25 | 0 | 30 | 13 | 99 | 1 |
| BFL + PTX | 93.7 + 445 | 64 | 97 | 95 | 41 | 17 | 0 | 40 | 7 | 76 | 2 |
| BFL + PTX | 125 + 445 | 60 | 94 | 97 | 41 | 11 | 1 | 67 | 27 | 99 | 5 |
| BFL + PTX | 187.5 + 445 | 91 | 96 | 100 | 54 | 32 | 0 | 68 | 29 | 99 | 8 |
| BFL + PTX | 62.5 + 890 | 65 | 86 | 95 | 40 | 37 | 8 | 60 | 52 | 96 | 8 |
| BFL + PTX | 93.7 + 890 | 93 | 96 | 95 | 45 | 41 | 10 | 54 | 40 | 99 | 8 |
| BFL + PTX | 125 + 890 | 93 | 96 | 100 | 39 | 35 | 30 | 71 | 45 | 100 | 11 |
| BFL + PTX | 187.5 + 890 | 97 | 96 | 92 | 45 | 41 | 27 | 64 | 52 | 100 | 9 |

Table 13 summarizes the percentage of crop injury and weed control at 28 DAT when BFL (racemic) was applied alone or as a tank-mix with other herbicides in post-emergent tests.

TABLE 13

| Treatment | Rate g ai/ha | R | W | ECHCG | STEME | SETVI | DIGSA | AMAPA |
|---|---|---|---|---|---|---|---|---|
| NTC | — | 0 | 0 | 0 | 0 | 0 | 0 | 0 |
| BFL | 125 | 2 | 3 | 34 | 21 | 38 | 26 | 39 |
| BFL | 250 | 4 | 6 | 70 | 49 | 80 | 79 | 80 |
| FPT | 25 | 33 | 3 | 86 | 18 | 15 | 97 | 100 |
| FPT | 50 | 32 | 5 | 86 | 45 | 32 | 98 | 100 |
| DCI | 125 | 3 | 4 | 19 | 91 | 24 | 29 | 12 |
| DCI | 250 | 8 | 7 | 62 | 96 | 26 | 59 | 45 |
| PYX | 45 | 18 | 15 | 70 | 38 | 62 | 87 | 74 |

TABLE 13-continued

| Treatment | Rate g ai/ha | R | W | ECHCG | STEME | SETVI | DIGSA | AMAPA |
|---|---|---|---|---|---|---|---|---|
| PYX | 90 | 61 | 28 | 92 | 88 | 85 | 94 | 97 |
| PTX | 445 | 4 | 5 | 90 | 30 | 52 | 59 | 70 |
| PTX | 890 | 23 | 10 | 85 | 19 | 79 | 81 | 82 |
| BFL + FPT | 125 + 25 | 74 | 3 | 92 | 32 | 87* | 100 | 100 |
| BFL + FPT | 250 + 25 | 81 | 7 | 96 | 92* | 88* | 100 | 100 |
| BFL + FPT | 125 + 50 | 76 | 3 | 97* | 79* | 82* | 100 | 100 |
| BFL + FPT | 250 + 50 | 75 | 2 | 96 | 72 | 93* | 100 | 100 |
| BFL + DCI | 125 + 125 | 9 | 9 | 80* | 92 | 66* | 98* | 49 |
| BFL + DCI | 250 + 125 | 10 | 7 | 86* | 94 | 90* | 93* | 86 |
| BFL + DCI | 125 + 250 | 10 | 13 | 86* | 97 | 74* | 96* | 82* |
| BFL + DCI | 250 + 250 | 26 | 16 | 92 | 98 | 90 | 98* | 74 |
| BFL + PYX | 125 + 45 | 35 | 3# | 98* | 47 | 97* | 98* | 90* |
| BFL + PYX | 250 + 45 | 29 | 6# | 98* | 74* | 96 | 99 | 97 |
| BFL + PYX | 125 + 90 | 69 | 9# | 100* | 99* | 98* | 100 | 99 |
| BFL + PYX | 250 + 90 | 70 | 4# | 99 | 95 | 99 | 100 | 95 |
| BFL + PTX | 125 + 445 | 5 | 3 | 99* | 49 | 84* | 100* | 91* |
| BFL + PTX | 250 + 445 | 24 | 6 | 99 | 50 | 96* | 100* | 80 |
| BFL + PTX | 125 + 890 | 42 | 7 | 97* | 45* | 94* | 98* | 93 |
| BFL + PTX | 250 + 890 | 58 | 6 | 100 | 69* | 100 | 98 | 91 |

Table 14 summarizes the percentage of crop injury and weed control at 28 DAT when BFL (racemic) was applied alone or as a tank-mix with DCI in post-emergent tests.

combination. BFL at 188 g/ha gave 5% control, DCI at 250 g/ha gave 61% control, and 89% control for the combination.

TABLE 14

| | | Height at Application (cm) | | | | | | | | | |
|---|---|---|---|---|---|---|---|---|---|---|---|
| Treatment | Rate g ai/ha | B 14 | R1 5 | R2 6-7 | POAAN 1-2 | ECHCG 8-9 | BROSE 7 | LEFCH ≤0.5 | XANST 2-4 | AMBEL 3-4 | ELEIN 1-2 | SETVI 4-5 |
| NTC | — | 0 | 0 | 0 | 0 | 0 | 0 | 0 | 0 | 0 | 0 | 0 |
| BFL | 94 | 1 | 0 | 0 | 0 | 2 | 0 | 1 | 5 | 5 | 0 | 22 |
| BFL | 125 | 1 | 0 | 0 | 0 | 6 | 0 | 26 | 6 | 6 | 2 | 20 |
| BFL | 188 | 1 | 2 | 10 | 2 | 74 | 6 | 56 | 34 | 12 | 13 | 49 |
| DCI | 125 | 10 | 15 | 13 | 0 | 74 | 0 | 89 | 89 | 73 | 5 | 6 |
| DCI | 250 | 14 | 18 | 18 | 0 | 69 | 0 | 79 | 94 | 77 | 24 | 5 |
| BFL + DCI | 94 + 125 | 7 | 16 | 21 | 0 | 76 | 3 | 91 | 98* | 82* | 9 | 45* |
| BFL + DCI | 125 + 125 | 7 | 25* | 29* | 0 | 91* | 6 | 89 | 100* | 86* | 13* | 62* |
| BFL + DCI | 188 + 125 | 8 | 21 | 34* | 0 | 89 | 7 | 99 | 100* | 88* | 16 | 62* |
| BFL + DCI | 94 + 250 | 7 | 18 | 41* | 0 | 80* | 1 | 97* | 100* | 93* | 38* | 70* |
| BFL + DCI | 125 + 250 | 11 | 26 | 45* | 7* | 87* | 2 | 99* | 99* | 86* | 41* | 80* |
| BFL + DCI | 188 + 250 | 10 | 30* | 36 | 0 | 79 | 4 | 100* | 100* | 87* | 52* | 78* |

| | | Height at Application (cm) | | | | | | | | |
|---|---|---|---|---|---|---|---|---|---|---|
| Treatment | Rate g ai/ha | LOLMU 5-6 | SORHA 8 | DIGSA 3-5 | PHAMI 7-8 | ERICA 1 (3-5 rosette) | ORYSA 8 | CYPIR 1-2 | SOBIA 8 | APSEV 1-1.5 | AVEFA 11 |
| NTC | — | 0 | 0 | 0 | 0 | 0 | 0 | 0 | 0 | 0 | 0 |
| BFL | 94 | 0 | 0 | 8 | 0 | 1 | 46 | 0 | 0 | 0 | 0 |
| BFL | 125 | 0 | 22 | 10 | 0 | 3 | 44 | 0 | 0 | 0 | 0 |
| BFL | 188 | 0 | 22 | 19 | 1 | 13 | 28 | 4 | 0 | 5 | 5 |
| DCI | 125 | 0 | 4 | 17 | 4 | 0 | 26 | 0 | 1 | 5 | 60 |
| DCI | 250 | 9 | 32 | 22 | 2 | 0 | 42 | 0 | 4 | 0 | 61 |
| BFL + DCI | 94 + 125 | 42* | 16 | 66* | 11 | 6* | 29 | 1 | 0 | 0 | 60 |
| BFL + DCI | 125 + 125 | 89* | 20 | 75* | 58* | 10* | 19 | 11* | 0 | 0 | 68 |
| BFL + DCI | 188 + 125 | 88* | 35* | 85* | 68* | 13 | 44 | 16* | 8 | 0 | 76 |
| BFL + DCI | 94 + 250 | 91* | 42* | 66* | 39* | 42* | 51 | 14* | 0 | 5 | 60 |
| BFL + DCI | 125 + 250 | 91* | 62* | 74* | 61* | 55* | 60 | 12* | 0 | 8 | 92 |
| BFL + DCI | 188 + 250 | 55* | 48 | 74* | 52* | 49* | 61 | 16* | 7 | 4 | 89* |

Among other tests, for Italian ryegrass (LOLMU), BFL at 188 g/ha gave 0% control, DCI at 125 g/ha gave 0% control, and 88% control for the combination. DCI at 250 g/ha gave 9% control, BFL at 125 g/ha gave 0% control, and 91% control for the combination.

For large crabgrass (DIGSA), BFL at 188 g/ha gave 19% control, DCI at 125 g/ha gave 17% control, and 85% control for the combination.

For wild oats (AVEFA), BFL at 125 g/ha gave 0% control, DCI at 250 g/ha gave 61% control, and 92% control for the combination.

For barnyardgrass (ECHCG), BFL at 125 g/ha gave 6% control, DCI at 125 g/ha gave 74% control, and 91% control for the combination.

FIG. 1 shows a photograph of green foxtail plants as untreated, treated with 125 g/ha of BFL, 25 g/ha of FPT, and a combination of 125 g/ha of BFL plus 25 g/ha of FPT applied early post-emergence and rated and photographed at 21 DAT. The enhanced effect of BFL plus FPT is shown by nearly complete destruction of the plants in the combination treatment.

Figure 2:
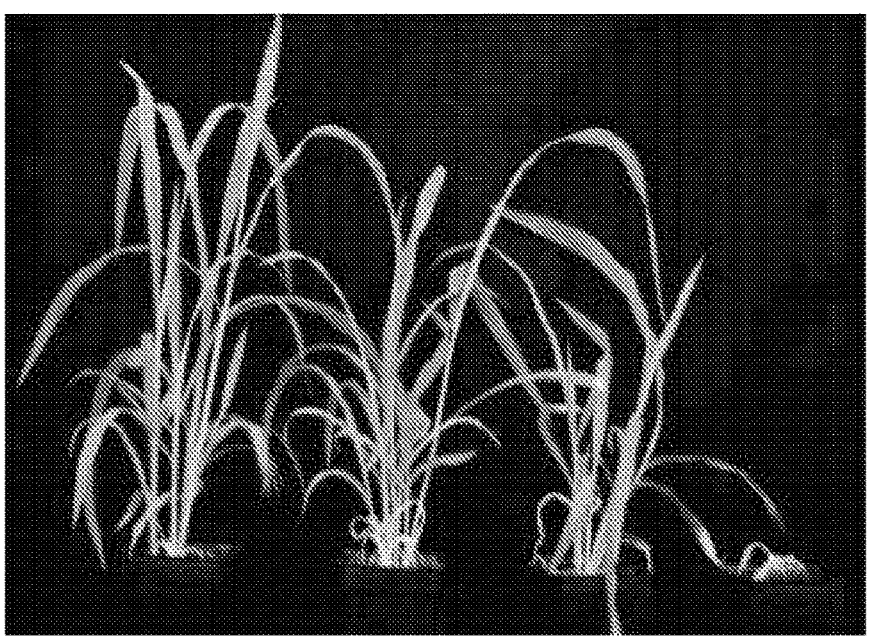
FIG. 2 shows a photograph of large crabgrass plants as untreated, treated with beflubutamid, treated with 2-(2,4-dichlorophenyl)methyl-4,4-dimethyl-3-isoxazolidinone, and treated with a combination of the two herbicides.

FIG. 2 shows a photograph of large crabgrass plants as untreated, treated with 125 g/ha of BFL, 125 g/ha of DCI, and a combination of 0 125 g/ha of BFL plus 125 g/ha of DCI applied early post-emergence and rated and photographed at 21 DAT. The enhanced effect of BFL plus DCI is shown by nearly complete destruction of the plants in the combination treatment.

Figure 3:
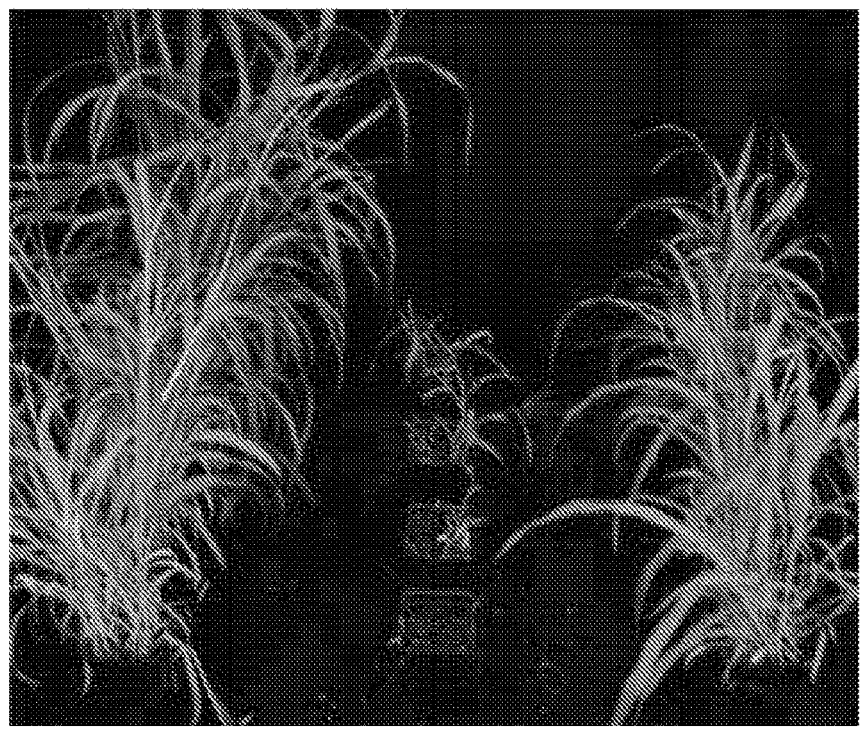
FIG. 3 shows a photograph of large crabgrass plants as treated with beflubutamid (left), treated with 4-(4-fluorophenyl)-6-(2-hydroxy-6-oxocyclohexane-1-carbonyl)-2-methyl-1,2,4-triazine-3,5(2H,4H)-dione (right), and treated with a combination of the two herbicides (center of the photograph).

FIG. 3 shows a photograph of large crabgrass plants as treated with 125 g/ha of BFL, 37.5 g/ha of FPT, and a combination of 125 g/ha of BFL plus 25 g/ha of FPT applied early post-emergence and rated and photographed at 28 DAT. The enhanced effect of BFL plus FPT is shown by nearly complete destruction of the plants in the combination treatment.

Table 15 summarizes the percentage of weed control at 21 DAT when BFL (racemic) was applied alone or as a tank-mix with GLY to glyphosate resistant strains of marestail and Palmer amaranth in post-emergent tests. All weed strains in this study were previously tested to confirm resistance to glyphosate. The results show that the combination of BFL at 188 g/ha with GLY was able to provide an enhanced effect against one glyphosate resistant strain of marestail and a glyphosate resistant strain of Palmer amaranth.

TABLE 15

| Treatment<br>Growth stage at treatment | Rate<br>g ai/ha | ERICA1<br>8-12 rosette | ERICA2<br>8-12 rosette | AMAPA1<br>8-12 cm height |
| --- | --- | --- | --- | --- |
| NTC | — | 0 | 0 | 0 |
| BFL | 94 | 1 | 1 | 9 |
| BFL | 188 | 2 | 5 | 13 |
| GLY | 560 | 20 | 13 | 64 |
| BFL + GLY | 94 + 560 | 6 | 4 | 52 |
| BFL + GLY | 188 + 560 | 39* | 15 | 81* |

Table 16 summarizes the percentage of wheat injury and weed control at 28 DAT when (−)-BFL (>95% e.e.) was applied alone or as a tank-mix with other herbicides in pre-emergent tests. Table 17 summarizes the percentage of wheat injury and weed control at 28 DAT when (+)-BFL (>95% e.e.) was applied alone or as a tank-mix with other herbicides in pre-emergent tests.

The results confirm that (−)-BFL is the more active enantiomer, although (+)-BFL shows low level weed control of common lambsquarters (CHEAL) alone. Mixtures of (−)-BFL with DCI, PTX or PYX provide excellent control of a number of important weed species. An enhanced effect was observed in control of common lambsquarters and Italian ryegrass (LOLMU) using the combination of (−)-BFL and DCI, with improved crop safety.

TABLE 16

| Treatment | Rate<br>g ai/ha | W | ALOMY | BROSE | CHEAL | SETVI | LOLMU | AMAPA | AVEFA | SETLU |
| --- | --- | --- | --- | --- | --- | --- | --- | --- | --- | --- |
| NTC | — | 0 | 0 | 0 | 0 | 0 | 0 | 0 | 0 | 0 |
| (−)-BFL | 62 | 1 | 19 | 7 | 7 | 80 | 12 | 70 | 7 | 86 |
| (−)-BFL | 125 | 6 | 32 | 26 | 65 | 97 | 5 | 97 | 11 | 100 |
| DCI | 125 | 16 | 98 | 43 | 76 | 98 | 81 | 94 | 38 | 75 |
| DCI | 250 | 17 | 99 | 53 | 67 | 99 | 86 | 99 | 82 | 96 |
| PTX | 445 | 13 | 59 | 77 | 91 | 98 | 87 | 98 | 89 | 99 |
| PTX | 890 | 32 | 83 | 92 | 98 | 100 | 98 | 100 | 92 | 100 |
| PYX | 45 | 20 | 100 | 97 | 79 | 99 | 100 | 100 | 100 | 100 |
| PYX | 90 | 15 | 99 | 99 | 98 | 99 | 98 | 100 | 99 | 100 |
| (−)-BFL + DCI | 62 + 125 | 10# | 95 | 38 | 83* | 99 | 83 | 97 | 38 | 99 |
| (−)-BFL + DCI | 125 + 125 | 11# | 91 | 20 | 63 | 99 | 82 | 97 | 25 | 93 |
| (−)-BFL + DCI | 62 + 250 | 22 | 95 | 28 | 85* | 100 | 96* | 99 | 69 | 100 |
| (−)-BFL + DCI | 125 + 250 | 14# | 98 | 35 | 91 | 99 | 99* | 100 | 66 | 100 |
| (−)-BFL + PTX | 62 + 445 | 27* | 64 | 79 | 96 | 100 | 96* | 100 | 69 | 100 |
| (−)-BFL + PTX | 125 + 445 | 23 | 28 | 81 | 100 | 99 | 99* | 100 | 81 | 100 |
| (−)-BFL + PTX | 62 + 890 | 41* | 51 | 94 | 96 | 100 | 96 | 100 | 81 | 100 |
| (−)-BFL + PTX | 125 + 890 | 37 | 72 | 91 | 100 | 100 | 98 | 100 | 99* | 100 |
| (−)-BFL + PYX | 62 + 45 | 23 | 95 | 90 | 88 | 99 | 98 | 100 | 97 | 100 |
| (−)-BFL + PYX | 125 + 45 | 17# | 95 | 91 | 93 | 99 | 92 | 100 | 97 | 100 |
| (−)-BFL + PYX | 62 + 90 | 33* | 97 | 100 | 100 | 99 | 98 | 100 | 99 | 100 |
| (−)-BFL + PYX | 125 + 90 | 22 | 97 | 91 | 98 | 100 | 98 | 100 | 94 | 100 |

TABLE 17

| Treatment | Rate g ai/ha | W | ALOMY | BROSE | CHEAL | SETVI | LOLMU | AVEFA | SETLU |
|---|---|---|---|---|---|---|---|---|---|
| NTC | — | 0 | 0 | 0 | 0 | 0 | 0 | 0 | 0 |
| (+)-BFL | 62.5 | 5 | 2 | 0 | 37 | 7 | 1 | 0 | 0 |
| (+)-BFL | 125 | 6 | 5 | 4 | 37 | 8 | 1 | 1 | 5 |
| DCI | 62.5 | 10 | 65 | 14 | 58 | 91 | 34 | 7 | 8 |
| DCI | 125 | 6 | 64 | 35 | 86 | 99 | 57 | 38 | 43 |
| PTX | 222 | 90 | 70 | 92 | 100 | 99 | 97 | 84 | 99 |
| PTX | 445 | 82 | 96 | 93 | 100 | 99 | 100 | 92 | 99 |
| PYX | 22.5 | 7 | 100 | 100 | 100 | 97 | 99 | 98 | 99 |
| PYX | 45 | 69 | 100 | 100 | 100 | 99 | 100 | 96 | 100 |
| (+)-BFL + DCI | 62.5 + 62.5 | 4# | 40 | 13 | 48 | 88 | 53* | 22* | 12* |
| (+)-BFL + DCI | 125 + 62.5 | 20 | 37 | 13 | 70 | 97 | 42* | 10 | 26* |
| (+)-BFL + DCI | 62.5 + 125 | 9 | 92 | 37 | 85 | 98 | 72* | 49 | 53* |
| (+)-BFL + DCI | 125 + 125 | 5# | 64 | 24 | 75 | 99 | 68* | 23 | 58* |
| (+)-BFL + PTX | 62.5 + 222 | 85 | 90* | 80 | 100 | 99 | 98 | 89 | 97 |
| (+)-BFL + PTX | 125 + 222 | 88 | 92* | 79 | 100 | 100 | 95 | 63 | 98 |
| (+)-BFL + PTX | 62.5 + 445 | 94 | 88 | 91 | 100 | 100 | 96 | 91 | 98 |
| (+)-BFL + PTX | 125 + 445 | 88 | 96 | 95 | 100 | 100 | 100 | 93 | 99 |
| (+)-BFL + PYX | 62.5 + 22.5 | 20 | 100 | 99 | 99 | 97 | 99 | 99 | 100 |
| (+)-BFL + PYX | 125 + 22.5 | 22 | 99 | 98 | 100 | 99 | 97 | 86 | 100 |
| (+)-BFL + PYX | 62.5 + 45 | 35# | 100 | 99 | 100 | 100 | 100 | 98 | 100 |
| (+)-BFL + PYX | 125 + 45 | 56# | 100 | 100 | 100 | 99 | 99 | 98 | 100 |

Table 18 summarizes the percentage of crop injury and weed control at 28 DAT when BFL (racemic) was applied alone or as a tank-mix with florasulam in post-emergent tests.

| Treatment | Rate g ai/ha | COC | Barnyardgrass ECHCG | Palmer amaranth AMAPA | Common chickweed STEME | Redroot pigweed AMARE | Dandelion TAROF | Beggerticks BIDPI | Volunteer Canola BRSNN | Wheat SW52 | Barley Robust |
|---|---|---|---|---|---|---|---|---|---|---|---|
| Non treated | — | — | 0 | 0 | 0 | 0 | 0 | 0 | 0 | 0 | 0 |
| BFL | 94 | 1% | 5 | 46 | 5 | 61 | 5 | 5 | 5 | 10 | 5 |
| BFL | 125 | 1% | 5 | 48 | 5 | 60 | 5 | 10 | 23 | 19 | 10 |
| BFL | 250 | 1% | 5 | 53 | 5 | 86 | 68 | 10 | 29 | 19 | 5 |
| Florasulam | 1.25 | 1% | 10 | 56 | 98 | 73 | 94 | 40 | 97 | 20 | 5 |
| Florasulam | 2.5 | 1% | 5 | 49 | 92 | 70 | 100 | 83 | 100 | 24 | 8 |
| Florasulam | 5 | 1% | 5 | 39 | 98 | 85 | 99 | 83 | 99 | 24 | 10 |
| BFL + florasulam | 94 + 1.25 | 1% | 5 | 51 | 98 | 40 | 96 | 66* | 92 | 21 | 10 |
| BFL + florasulam | 125 + 1.25 | 1% | 5 | 44 | 93 | 40 | 97 | 65* | 92 | 20 | 10 |
| BFL + florasulam | 94 + 2.5 | 1% | 5 | 36 | 98 | 69 | 100 | 69 | 98 | 25 | 10 |
| BFL + florasulam | 125 + 2.5 | 1% | 5 | 55 | 98 | 82 | 100 | 20 | 100 | 25 | 10 |
| BFL + florasulam | 94 + 5 | 1% | 5 | 54 | 98 | 97 | 100 | 84 | 100 | 20 | 10 |
| BFL + florasulam | 125 + 5 | 1% | 5 | 48 | 98 | 95 | 100 | 83 | 100 | 21 | 15 |

Table 19 summarizes the percentage of crop injury and weed control at 21 DAT when BFL (racemic) was applied alone or as a tank-mix with acetochlor in pre-emergent tests.

| Treatment | Rate g ai/ha | Velvetleaf ABUTH | Morningglory IPOHE | Barnyardgrass ECHCG | Wild Oat AVEFA | Soybean GLYMX |
|---|---|---|---|---|---|---|
| Non treated | — | 0 | 0 | 0 | 0 | 0 |
| BFL | 94 | 10 | 10 | 11 | 10 | 8 |
| BFL | 125 | 15 | 10 | 16 | 9 | 11 |
| BFL | 250 | 14 | 8 | 71 | 9 | 28 |
| Acetochlor | 125 | 10 | 5 | 8 | 13 | 4 |
| Acetochlor | 250 | 11 | 6 | 58 | 11 | 7 |
| Acetochlor | 500 | 10 | 8 | 72 | 13 | 4 |
| BFL + acetochlor | 94 + 125 | 11 | 5 | 16 | 9 | 9 |
| BFL + acetochlor | 125 + 125 | 10 | 8 | 30 | 9 | 8 |
| BFL + acetochlor | 94 + 250 | 10 | 9 | 56 | 8 | 3 |
| BFL + acetochlor | 125 + 250 | 10 | 6 | 79* | 11 | 3 |

| Treatment | Rate g ai/ha | Velvetleaf ABUTH | Morningglory IPOHE | Barnyardgrass ECHCG | Wild Oat AVEFA | Soybean GLYMX |
|---|---|---|---|---|---|---|
| BFL + acetochlor | 94 + 500 | 11 | 8 | 77 | 10 | 4 |
| BFL + acetochlor | 125 + 500 | 10 | 9 | 55 | 11 | 3 |

Table 20 summarizes the percentage of weed control at 14 DAT, 21 DAT and 28 DAT when BFL (racemic) was applied alone or as a tank-mix with acetochlor in pre-emergent tests. Comparative data for diflufenican (another WSSA Group 12 herbicide) are also shown.

| Treatment | Rate g ai/ha | 28 DAT DIGSA | 28 DAT CHEAL |
|---|---|---|---|
| Non-treated check | — | 0 | 0 |
| BFL | 94 | 25 | 16 |
| Diflufenican | 50 | 18 | 11 |
| Diflufenican | 100 | 30 | 71 |
| Acetochlor | 125 | 4 | 4 |
| Acetochlor | 250 | 3 | 13 |
| BFL + acetochlor | 94 + 125 | 28 | 17 |
| BFL + acetochlor | 94 + 250 | 30 | 40* |
| Diflufenican + acetochlor | 50 + 125 | 30 | 44 |
| Diflufenican + acetochlor | 50 + 250 | 71 | 59 |
| Diflufenican + acetochlor | 100 + 125 | 68 | 31 |
| Diflufenican + acetochlor | 100 + 250 | 57 | 79 |

Table 21 summarizes the percentage of crop injury and weed control at 28 DAT when BFL (racemic) was applied alone or as a tank-mix 0 with S-metolachlor or dimethenamid-P in pre-emergent tests.

Table 22 summarizes the percentage of weed control at 28 DAT when BFL (racemic) was applied alone or as a tank-mix with dimethenamid-P in pre-emergent tests. Comparative data for diflufenican (another WSSA Group 12 herbicide) are also shown.

| Treatment | Rate g ai/ha | 28 DAT DIGSA | 28 DAT CHEAL |
|---|---|---|---|
| Non-treated check | — | 0 | 0 |
| BFL | 94 | 25 | 16 |
| Diflufenican | 50 | 18 | 11 |
| Diflufenican | 100 | 30 | 71 |
| Dimethanamid-P | 52.5 | 20 | 10 |
| Dimethanamid-P | 70 | 25 | 11 |
| BFL + dimethenamid-P | 94 + 52.5 | 40 | 9 |
| BFL + dimethenamid-P | 94 + 70 | 59* | 11 |
| Diflufenican + dimethenamid-P | 50 + 52.5 | 60 | 33 |
| Diflufenican + dimethenamid-P | 50 + 70 | 99 | 88 |
| Diflufenican + dimethenamid-P | 100 + 52.5 | 97 | 16 |
| Diflufenican + dimethenamid-P | 100 + 70 | 100 | 60 |

| Treatment | Rate g ai/ha | Barnyard grass ECHCG | Cheat BROSE | Wild proso millet PANMI | Common waterhemp AMATA | Common lambsquaters CHEAL | Goosegrass ELEIN | Italian rye grass LOLMU | Rice flatsedge CYPIR | Oat O |
|---|---|---|---|---|---|---|---|---|---|---|
| Non-treated | | 0 | 0 | 0 | 0 | 0 | 0 | 0 | 0 | 0 |
| BFL | 94 | 10 | 11 | 6 | 64 | 40 | 44 | 10 | 96 | 6 |
| BFL | 125 | 21 | 8 | 7 | 97 | 51 | 49 | 7 | 93 | 5 |
| BFL | 250 | 63 | 10 | 6 | 94 | 81 | 86 | 10 | 100 | 5 |
| S-metolachlor | 62.5 | 80 | 11 | 11 | 54 | 23 | 92 | 27 | 96 | 5 |
| S-metolachlor | 125 | 95 | 23 | 24 | 44 | 33 | 95 | 86 | 98 | 6 |
| S-metolachlor | 250 | 100 | 80 | 66 | 100 | 24 | 96 | 98 | 98 | 5 |
| BFL + s-metolachlor | 94 + 62.5 | 100* | 15 | 6 | 96* | 43 | 96 | 58* | 98 | 3 |
| BFL + s-metolachlor | 125 + 62.5 | 100* | 21 | 31 | 95 | 36 | 95 | 68* | 99 | 4 |
| BFL + s-metolachlor | 94 + 125 | 100 | 31 | 27 | 84 | 39 | 95 | 94* | 98 | 5 |
| BFL + s-metolachlor | 125 + 125 | 100 | 33 | 14 | 95 | 43 | 96 | 84 | 99 | 3 |
| BFL + s-metolachlor | 94 + 250 | 100 | 28 | 66 | 95 | 63 | 96 | 99 | 100 | 3 |
| BFL + s-metolachlor | 125 + 250 | 100 | 69 | 80* | 100 | 56 | 96 | 100 | 99 | 6 |
| Dimethanamid-P | 78.8 | 100 | 52 | 69 | 95 | 38 | 96 | 97 | 100 | 5 |
| Dimethanamid-P | 157.5 | 100 | 100 | 99 | 100 | 34 | 96 | 98 | 99 | 12 |
| Dimethanamid-P | 315 | 100 | 100 | 100 | 100 | 34 | 96 | 99 | 99 | 9 |
| BFL + dimethenamid-P | 94 + 78.8 | 100 | 67* | 81* | 100 | 51 | 95 | 91 | 100 | 7 |
| BFL + dimethenamid-P | 125 + 78.8 | 100 | 31 | 91* | 97 | 73* | 96 | 96 | 100 | 7 |
| BFL + dimethenamid-P | 94 + 157.5 | 100 | 100 | 100 | 100 | 83* | 96 | 97 | 99 | 6 |
| BFL + dimethenamid-P | 125 + 157.5 | 100 | 86 | 94 | 100 | 49 | 96 | 99 | 100 | 5 |
| BFL + dimethenamid-P | 94 + 315 | 100 | 100 | 100 | 100 | 79* | 96 | 99 | 97 | 12 |
| BFL + dimethenamid-P | 125 + 315 | 100 | 100 | 100 | 100 | 78* | 96 | 100 | 100 | 9 |

Table 23 summarizes the percentage of weed control at 28 DAT when BFL (racemic) was applied alone or as a tank-mix with halosulfuron-methyl in pre-emergent tests.

| Treatment | Rate g ai/ha | Kochia KCHSC | Common lambsquarters CHEAL | Common chickweed STEME | Rice flatsedge CYPIR | Barnyardgrass ECHCG |
|---|---|---|---|---|---|---|
| Non-treated | — | 0 | 0 | 0 | 0 | 0 |
| BFL | 94 | 40 | 41 | 21 | 71 | 30 |
| BFL | 125 | 35 | 81 | 10 | 88 | 34 |
| BFL | 250 | 77 | 97 | 22 | 100 | 72 |
| Halosulfuron-methyl | 3.28 | 38 | 56 | 0 | 71 | 2 |
| Halosulfuron-methyl | 6.56 | 40 | 90 | 25 | 99 | 18 |
| Halosulfuron-methyl | 13.1 | 66 | 86 | 43 | 95 | 48 |
| BFL + halosulfuron-methyl | 94 + 3.28 | 62 | 88* | 25 | 100* | 46* |
| BFL + halosulfuron-methyl | 94 + 6.56 | 51 | 85 | 42 | 100 | 53* |
| BFL + halosulfuron-methyl | 94 + 13.1 | 70 | 87 | 20 | 99 | 61 |
| BFL + halosulfuron-methyl | 125 + 3.28 | 60 | 89 | 31* | 95 | 53* |
| BFL + halosulfuron-methyl | 125 + 6.56 | 65 | 89 | 23 | 99 | 65* |
| BFL + halosulfuron-methyl | 125 + 13.1 | 75 | 93 | 55 | 100 | 77* |

Table 24 summarizes the percentage of crop injury and weed control at 28 DAT when BFL (racemic) was applied alone or as a tank-mix with clomazone in pre-emergent tests.

| Treatment | Rate g ai/ha | Yellow nutsedge CYPES | Redroot pigweed AMARE | Velvetleaf ABUTH | Barnyardgrass ECHCG | Goosegrass ELEIN | Johnsongrass SORHA | Crops Rice | Crops Soybean |
|---|---|---|---|---|---|---|---|---|---|
| Non-treated | — | 0 | 0 | 0 | 0 | 0 | 0 | 0 | 0 |
| BFL | 94 | 0 | 50 | 2 | 55 | 48 | 30 | 0 | 0 |
| BFL | 125 | 0 | 60 | 4 | 77 | 73 | 50 | 0 | 0 |
| BFL | 250 | 0 | 73 | 20 | 100 | 100 | 70 | 16 | 3 |
| CLZ | 35 | 0 | 0 | 55 | 30 | 68 | 16 | 7 | 0 |
| CLZ | 70 | 0 | 0 | 87 | 63 | 100 | 51 | 28 | 0 |
| CLZ | 140 | 0 | 3 | 97 | 95 | 100 | 75 | 100 | 0 |
| BFL + CLZ | 94 + 35 | 3 | 66* | 65* | 84* | 100* | 50* | 10 | 0 |
| BFL + CLZ | 125 + 35 | 7 | 69* | 47 | 96* | 100* | 69* | 13 | 0 |
| BFL + CLZ | 94 + 70 | 13 | 68* | 87 | 100* | 100 | 83* | 28 | 0 |
| BFL + CLZ | 125 + 70 | 3 | 58 | 83 | 100* | 100 | 77 | 31 | 0 |
| BFL + CLZ | 94 + 140 | 3 | 63* | 100 | 100 | 100 | 99 | 71 | 0 |
| BFL + CLZ | 125 + 140 | 3 | 75* | 100 | 100 | 100 | 100 | 75 | 0 |

Table 25 summarizes the percentage of weed control at 21 DAT when BFL (racemic) was applied alone or as a tank-mix with glyphosate in post-emergent tests. Comparative data for diflufenican (another WSSA Group 12 herbicide) are also shown.

| Treatment | Rate g ai/ha | Common purslane POROL | Redroot pigweed AMARE | Scentless chamomile MATIN | Canada thistle CIRAR |
|---|---|---|---|---|---|
| Non-treated check | — | 0 | 0 | 0 | 0 |
| BFL | 94 | 52 | 32 | 1 | 7 |
| BFL | 125 | 60 | 46 | 5 | 6 |
| Diflufenican | 50 | 20 | 63 | 0 | 2 |
| Diflufenican | 100 | 23 | 89 | 3 | 2 |
| Glyphosate | 140 | 0 | 2 | 3 | 56 |
| Glyphosate | 280 | 13 | 35 | 61 | 76 |
| Glyphosate | 560 | 51 | 98 | 88 | 97 |
| BFL + glyphosate | 94 + 140 | 34 | 25 | 13 | 77* |
| BFL + glyphosate | 125 + 140 | 60 | 32 | 16 | 81* |
| BFL + glyphosate | 94 + 280 | 24 | 36 | 55 | 82 |
| BFL + glyphosate | 125 + 280 | 57 | 77* | 47 | 80 |
| BFL + glyphosate | 94 + 560 | 79 | 98 | 84 | 84* |
| BFL + glyphosate | 125 + 560 | 51 | 96 | 76 | 91 |
| Diflufenican + glyphosate | 50 + 140 | 35 | 92 | 12 | 32 |
| Diflufenican + glyphosate | 100 + 140 | 36 | 91 | 11 | 60 |
| Diflufenican + glyphosate | 50 + 280 | 64 | 86 | 75 | 84 |
| Diflufenican + glyphosate | 100 + 280 | 88 | 98 | 64 | 87 |

-continued

| Treatment | Rate g ai/ha | Common purslane POROL | Redroot pigweed AMARE | Scentless chamomile MATIN | Canada thistle CIRAR |
|---|---|---|---|---|---|
| Non-treated check | — | 0 | 0 | 0 | 0 |
| Diflufenican + glyphosate | 50 + 560 | 63 | 97 | 88 | 95 |
| Diflufenican + glyphosate | 100 + 560 | 61 | 92 | 86 | 92 |

Table 26 summarizes the percentage of weed control at 28 DAT when BFL (racemic) was applied alone or as a tank-mix with isoxaflutole in pre-emergent tests.

| Treatment | Rate g ai/ha | Field violet VIOAR | Common lambsquarters CHEAL | Velvet-leaf ABUTH | Shatter-cane SOBIA | Yellow foxtail SETLU |
|---|---|---|---|---|---|---|
| Non-treated check | — | 0 | 0 | 0 | 0 | 0 |
| BFL | 94 | 97 | 63 | 3 | 2 | 99 |
| BFL | 125 | 99 | 70 | 6 | 3 | 100 |
| BFL | 250 | 100 | 99 | 28 | 34 | 100 |
| Isoxaflutole | 13.1 | 81 | 99 | 96 | 53 | 93 |
| Isoxaflutole | 26.2 | 98 | 100 | 99 | 78 | 100 |
| Isoxaflutole | 52.5 | 100 | 100 | 100 | 96 | 100 |
| BFL + isoxaflutole | 94 + 13.1 | 100 | 100 | 93 | 85* | 100 |
| BFL + isoxaflutole | 125 + 13.1 | 100 | 100 | 98 | 88* | 100 |
| BFL + isoxaflutole | 94 + 26.2 | 100 | 100 | 99 | 95* | 100 |
| BFL + isoxaflutole | 125 + 26.2 | 99 | 100 | 100 | 91* | 100 |
| BFL + isoxaflutole | 94 + 52.5 | 100 | 100 | 100 | 100 | 100 |
| BFL + isoxaflutole | 125 + 52.5 | 100 | 100 | 100 | 100 | 100 |

Table 27 summarizes the percentage of weed control at 28 DAT when BFL (racemic) was applied alone or as a tank-mix with isoxaflutole in pre-emergent tests. Comparative data for diflufenican (another WSSA Group 12 herbicide) are also shown.

| Treatment | Rate g ai/ha | Shatter-cane SOBIA | Common lambsquarters CHEAL |
|---|---|---|---|
| Non treated | — | 0 | 0 |
| BFL | 94 | 2 | 55 |
| BFL | 125 | 5 | 73 |
| Isoxaflutole | 5 | 5 | 87 |
| Isoxaflutole | 7.5 | 7 | 92 |
| Isoxaflutole | 10 | 7 | 91 |
| BFL + isoxaflutole | 94 + 5 | 9 | 97 |
| BFL + isoxaflutole | 94 + 7.5 | 18 | 98 |
| BFL + isoxaflutole | 94 + 10 | 16 | 97 |
| BFL + isoxaflutole | 125 + 5 | 20* | 95 |
| BFL + isoxaflutole | 125 + 7.5 | 18 | 97 |
| BFL + isoxaflutole | 125 + 10 | 57* | 97 |

Table 28 summarizes the percentage of crop injury and weed control at 28 DAT when BFL (racemic) was applied alone or as a tank-mix 0

| Treatment | Rate g ai/ha | Corn | Wheat | Volunteer Canola BRSSN | Barnyard-grass ECHCG | Red rice ORYSA | Italian ryegrass LOLMU | Goose-grass ELEIN | Common waterhemp AMATA | Velvet-leaf ABUTH |
|---|---|---|---|---|---|---|---|---|---|---|
| Non treated | — | 0 | 0 | 0 | 0 | 0 | 0 | 0 | 0 | 0 |
| BFL | 94 | 0 | 20 | 17 | 47 | 3 | 4 | 43 | 94 | 42 |
| BFL | 250 | 5 | 10 | 50 | 97 | 4 | 32 | 95 | 100 | 27 |
| Mesotrione | 25 | 1 | 15 | 67 | 10 | 99 | 6 | 8 | 99 | 97 |
| Mesotrione | 50 | 0 | 10 | 83 | 32 | 99 | 5 | 9 | 100 | 100 |
| Mesotrione | 100 | 0 | 12 | 100 | 68 | 97 | 6 | 41 | 100 | 99 |
| BFL + mesotrione | 94 + 25 | 0 | 10 | 73 | 58 | 99 | 5 | 53 | 100 | 98 |
| BFL + mesotrione | 94 + 50 | 0 | 8 | 91 | 83* | 100 | 8 | 70* | 100 | 100 |
| BFL + mesotrione | 94 + 100 | 0 | 10 | 100 | 97* | 99 | 7 | 99* | 97 | 100 |

Table 29 summarizes the percentage of weed control at 14 DAT, 21 DAT and 28 DAT when BFL (racemic) was applied alone or as a tank-mix with mesotrione in pre-emergent tests. Comparative data for diflufenican (another WSSA Group 12 herbicide) are also shown.

| Treatment | Rate g ai/ha | 14 DAT DIGSA | 14 DAT CHEAL | 21 DAT DIGSA | 21 DAT CHEAL | 28 DAT DIGSA | 28 DAT CHEAL |
|---|---|---|---|---|---|---|---|
| Non-treated check | — | 0 | 0 | 0 | 0 | 0 | 0 |
| BFL | 94 | 44 | 28 | 36 | 17 | 25 | 16 |
| Diflufenican | 50 | 48 | 6 | 32 | 10 | 18 | 11 |
| Diflufenican | 100 | 77 | 43 | 58 | 57 | 30 | 71 |
| Mesotrione | 25 | 63 | 100 | 63 | 100 | 34 | 100 |
| Mesotrione | 50 | 92 | 100 | 93 | 100 | 96 | 98 |
| BFL + mesotrione | 94 + 25 | 89* | 99 | 83* | 99 | 92* | 96 |
| BFL + mesotrione | 94 + 50 | 100 | 100 | 100 | 100 | 100 | 99 |
| Diflufenican + mesotrione | 50 + 25 | 87 | 100 | 85 | 100 | 99 | 99 |
| Diflufenican + mesotrione | 50 + 50 | 99 | 100 | 100 | 100 | 100 | 99 |
| Diflufenican + mesotrione | 100 + 25 | 98 | 100 | 100 | 100 | 100 | 99 |
| Diflufenican + mesotrione | 100 + 50 | 100 | 100 | 100 | 100 | 100 | 99 |

Table 30 summarizes the percentage of weed control at 28 DAT when BFL (racemic) was applied alone or as a tank-mix with glufosinate-ammonium or paraquat in post-emergent tests. Comparative data for diflufenican (another WSSA Group 12 herbicide) are also shown.

| Treatment | Rate g ai/ha | Canada thistle CIRAR | Field bindweed CONAR | Barnyardgrass ECHCG | Common ragweed AMBEL | Velvetleaf ABUTH |
|---|---|---|---|---|---|---|
| Non treated | — | 0 | 0 | 0 | 0 | 0 |
| BFL | 94 | 21 | 15 | 2 | 8 | 3 |
| BFL | 125 | 13 | 8 | 3 | 6 | 5 |
| BFL | 250 | 7 | 9 | 8 | 9 | 3 |
| Glufosinate-ammonium | 56 | 18 | 19 | 12 | 26 | 3 |
| Glufosinate-ammonium | 112 | 14 | 10 | 20 | 66 | 5 |
| Glufosinate-ammonium | 224 | 46 | 19 | 52 | 100 | 15 |
| Paraquat | 35 | 38 | 9 | 24 | 18 | 7 |
| Paraquat | 70 | 89 | 11 | 30 | 90 | 87 |
| Paraquat | 140 | 99 | 43 | 45 | 100 | 100 |
| Diflufencan | 50 | 18 | 14 | 28 | 18 | 6 |
| Diflufencan | 100 | 23 | 25 | 30 | 21 | 18 |
| BFL + glufosinate-ammonium | 94 + 56 | 40 | 45* | 30* | 27 | 7 |
| BFL + glufosinate-ammonium | 94 + 112 | 39* | 40* | 32* | 48 | 9 |
| BFL + glufosinate-ammonium | 94 + 224 | 55 | 29 | 71* | 100 | 15 |
| BFL + glufosinate-ammonium | 125 + 56 | 38* | 39* | 30* | 37* | 7 |
| BFL + glufosinate-ammonium | 125 + 112 | 34* | 20 | 34* | 63 | 30* |
| BFL + glufosinate-ammonium | 125 + 224 | 34 | 22 | 65* | 67 | 52* |
| BFL + paraquat | 94 + 35 | 44 | 13 | 30 | 38* | 14 |
| BFL + paraquat | 94 + 70 | 79 | 10 | 28 | 100* | 75 |
| BFL + paraquat | 94 + 140 | 89 | 45 | 55* | 100 | 100 |
| BFL + paraquat | 125 + 35 | 46 | 14 | 14 | 28 | 15 |
| BFL + paraquat | 125 + 70 | 65 | 24* | 28 | 100* | 100* |
| BFL + paraquat | 125 + 140 | 100 | 67* | 51 | 100 | 100 |
| Diflufencan + glufosinate-ammonium | 50 + 56 | 36 | 27 | 28 | 36 | 22 |
| Diflufencan + glufosinate-ammonium | 50 + 112 | 39 | 20 | 28 | 61 | 23 |
| Diflufencan + glufosinate-ammonium | 50 + 224 | 72 | 65 | 61 | 93 | 20 |
| Diflufencan + glufosinate-ammonium | 100 + 56 | 34 | 39 | 23 | 41 | 28 |
| Diflufencan + glufosinate-ammonium | 100 + 112 | 34 | 23 | 33 | 56 | 22 |
| Diflufencan + glufosinate-ammonium | 100 + 224 | 54 | 31 | 60 | 100 | 12 |
| Diflufencan + paraquat | 50 + 35 | 35 | 29 | 35 | 13 | 18 |
| Diflufencan + paraquat | 50 + 70 | 94 | 16 | 45 | 87 | 8 |
| Diflufencan + paraquat | 50 + 140 | 94 | 24 | 43 | 100 | 83 |
| Diflufencan + paraquat | 100 + 35 | 43 | 42 | 35 | 42 | 45 |
| Diflufencan + paraquat | 100 + 70 | 61 | 39 | 41 | 100 | 57 |
| Diflufencan + paraquat | 100 + 140 | 100 | 64 | 51 | 100 | 100 |

Table 31 summarizes the percentage of weed control at 28 DAT when BFL (racemic) was applied alone or as a tank-mix with topramezone in post-emergent tests. Comparative data for diflufenican (another WSSA Group 12 herbicide) are also shown.

| Treatment | Rate g ai/ha | Canada thistle CIRAR | Common waterhemp AMATA | Common ragweed AMEBL | Kochia KCHSC | Common lambsqaurters CHEAL |
|---|---|---|---|---|---|---|
| Non treated | — | 0 | 0 | 0 | 0 | 0 |
| BFL | 94 | 10 | 22 | 11 | 7 | 4 |
| Diflufenican | 50 | 10 | 68 | 18 | 7 | 11 |
| Diflufenican | 100 | 7 | 60 | 21 | 9 | 11 |
| Topramezone | 3.5 | 36 | 8 | 12 | 5 | 7 |
| Topramezone | 7 | 4 | 9 | 43 | 13 | 4 |
| BFL + topramezone | 94 + 3.5 | 28 | 43* | 37* | 9 | 6 |
| BFL + topramezone | 94 + 7 | 31 | 43* | 35 | 11 | 11 |
| Diflufenican + topramezone | 50 + 3.5 | 31 | 57 | 21 | 9 | 4 |
| Diflufenican + topramezone | 50 + 7 | 23 | 50 | 25 | 8 | 9 |
| Diflufenican + topramezone | 100 + 3.5 | 19 | 63 | 32 | 16 | 15 |
| Diflufenican + topramezone | 100 + 7 | 24 | 78 | 15 | 11 | 6 |

Table 32 summarizes the percentage of weed control at 28 DAT when BFL (racemic) was applied alone or as a tank-mix with linuron in pre-emergent tests. Comparative data for diflufenican (another WSSA Group 12 herbicide) are 0 also shown.

| Treatment | Rate g ai/ha | Italian ryegrass LOLMU | Common lambsquaters CHEAL | Redroot pigweed AMARE | Barnyard-grass ECHCG | Common chickweed STEME |
|---|---|---|---|---|---|---|
| Nontreated ceck | — | 0 | 0 | 0 | 0 | 0 |
| BFL | 94 | 0 | 27 | 45 | 20 | 0 |
| BFL | 125 | 6 | 46 | 73 | 33 | 0 |
| BFL | 250 | 24 | 96 | 95 | 90 | 11 |
| Linuron | 100 | 0 | 21 | 35 | 0 | 0 |
| Linuron | 200 | 0 | 50 | 65 | 0 | 0 |
| Linuron | 400 | 45 | 100 | 100 | 16 | 61 |
| BFL + Linuron | 94 + 100 | 1 | 13 | 28 | 18 | 0 |
| BFL + Linuron | 94 + 200 | 2 | 85* | 87* | 35* | 46* |
| BFL + Linuron | 94 + 400 | 33 | 100 | 100 | 65* | 92* |
| BFL + Linuron | 125 + 100 | 2 | 80* | 83 | 43* | 0 |
| BFL + Linuron | 125 + 200 | 5 | 100* | 92 | 50* | 0 |
| BFL + Linuron | 125 + 400 | 50 | 100 | 100 | 75* | 90* |
| Diflufencan | 50 | 6 | 37 | 56 | 24 | 0 |
| Diflufencan | 100 | 25 | 63 | 97 | 58 | 5 |
| Diflufencan | 125 | 38 | 79 | 89 | 61 | 18 |
| Diflufencan + Linuron | 50 + 100 | 14 | 88 | 91 | 33 | 0 |
| Diflufencan + Linuron | 50 + 200 | 35 | 100 | 76 | 60 | 43 |
| Diflufencan + Linuron | 50 + 400 | 69 | 95 | 100 | 70 | 75 |
| Diflufencan + Linuron | 100 + 100 | 28 | 100 | 90 | 63 | 16 |
| Diflufencan + Linuron | 100 + 200 | 41 | 100 | 95 | 78 | 8 |
| Diflufencan + Linuron | 100 + 400 | 78 | 100 | 100 | 80 | 100 |

Table 33 summarizes t e percentage of crop injury and weed control at 28 DAT when BFL (racemic) was applied alone or as a tank-mix with metribuzin in pre-emergent tests.

| Treatment | Rate g ai/ha | Corn | Wheat | Volunteer Canola | Barnyard-grass ECHCG | Red rice ORYSA | Italian ryegrass LOLMU | Goose-grass ELEIN | Common waterhemp AMATA | Velvetleaf ABUTH |
|---|---|---|---|---|---|---|---|---|---|---|
| Non treated | — | 0 | 0 | 0 | 0 | 0 | 0 | 0 | 0 | 0 |
| BFL | 94 | 0 | 15 | 7 | 48 | 8 | 8 | 72 | 92 | 12 |
| BFL | 125 | 0 | 10 | 13 | 75 | 7 | 12 | 76 | 97 | 13 |
| BFL | 250 | 8 | 18 | 57 | 97 | 27 | 40 | 99 | 100 | 13 |
| Metribuzin | 25 | 0 | 18 | 33 | 10 | 20 | 10 | 23 | 85 | 43 |
| Metribuzin | 50 | 0 | 82 | 100 | 15 | 88 | 13 | 40 | 79 | 93 |
| Metribuzin | 100 | 0 | 100 | 100 | 42 | 100 | 65 | 98 | 99 | 100 |
| BFL + metribuzin | 94 + 25 | 0 | 23 | 92* | 57 | 25 | 10 | 27 | 99 | 17 |

-continued

| Treatment | Rate g ai/ha | Corn | Wheat | Volunteer Canola | Barnyard-grass ECHCG | Red rice ORYSA | Italian ryegrass LOLMU | Goose-grass ELEIN | Common waterhemp AMATA | Velvetleaf ABUTH |
|---|---|---|---|---|---|---|---|---|---|---|
| Non treated | — | 0 | 0 | 0 | 0 | 0 | 0 | 0 | 0 | 0 |
| BFL + metribuzin | 125 + 25 | 0 | 15 | 52* | 67 | 17 | 8 | 79 | 99 | 30 |
| BFL + metribuzin | 94 + 50 | 0 | 72* | 97 | 55 | 93 | 32* | 65 | 99 | 79 |
| BFL + metribuzin | 125 + 50 | 0 | 48* | 100 | 78 | 60 | 33 | 94 | 100 | 92 |
| BFL + metribuzin | 94 + 100 | 0 | 100 | 100 | 82* | 100 | 70 | 97 | 100 | 100 |
| BFL + metribuzin | 125 + 100 | 2 | 100 | 100 | 78 | 100 | 52 | 100 | 99 | 99 |

Table 34 summarizes the percentage of weed control at 28 DAT when BFL (racemic) was applied alone or as a tank-mix with atrazine in 0 pre-emergent tests.

| Treatment | Rate g ai/ha | Lambs-quarters CHEAL | Velvet-leaf IPOHE | Mexican Sunflower TITDI | Large crabgrass DIGSA |
|---|---|---|---|---|---|
| Non treated | — | 0 | 0 | 0 | 0 |
| BFL | 94 | 92 | 0 | 3 | 99 |
| BFL | 125 | 97 | 3 | 2 | 100 |
| BFL | 250 | 98 | 4 | 3 | 100 |
| Atrazine | 70 | 82 | 3 | 3 | 3 |
| Atrazine | 140 | 99 | 11 | 4 | 3 |
| Atrazine | 280 | 100 | 88 | 71 | 6 |
| BFL + atrazine | 94 + 70 | 99 | 4 | 5 | 100 |
| BFL + atrazine | 125 + 70 | 99 | 10 | 4 | 99 |
| BFL + atrazine | 94 + 140 | 100 | 47* | 15 | 100 |
| BFL + atrazine | 125 + 140 | 99 | 34* | 6 | 100 |
| BFL + atrazine | 94 + 280 | 100 | 99* | 81 | 99 |
| BFL + atrazine | 125 + 280 | 99 | 93 | 77 | 99 |

Table 35 summarizes the percentage of crop injury and weed control at 21 DAT when BFL (racemic) was applied alone or as a tank-mix with clethodim in post-emergent tests. Comparative data for diflufenican (another WSSA Group 12 herbicide) are also shown.

Figure 5:
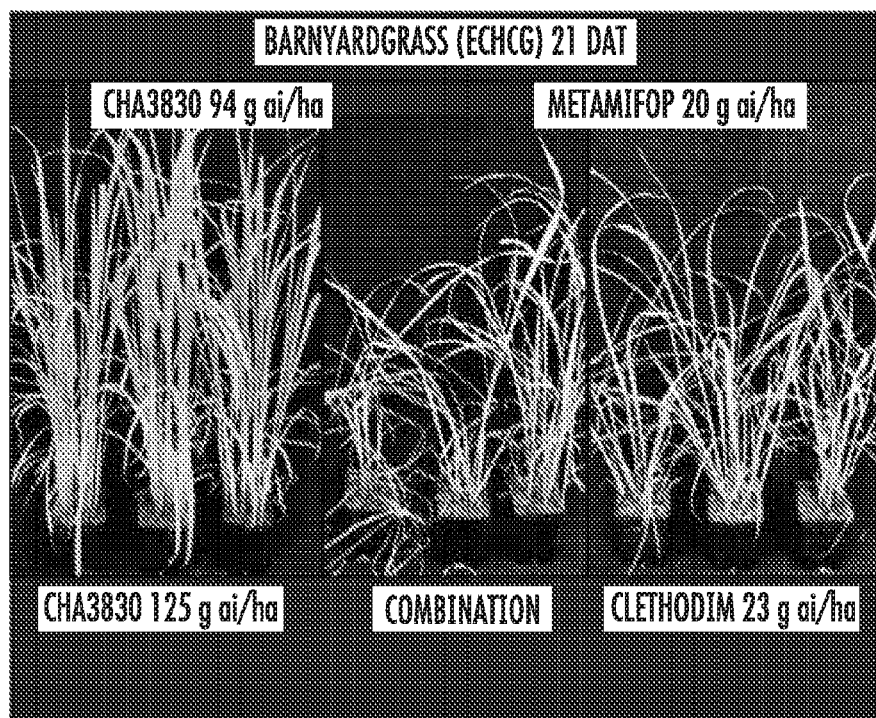
FIG. 5 shows a photograph of barnyardgrass as treated with beflubutamid (CHA3830) (left), treated with clethodim (right), and treated with a combination of the two herbicides (center of photograph).

FIG. 5 shows an enhanced effect of the combined use of beflubutamid and clethodim in the control of barnyardgrass.

Table 36 summarizes the percentage of barnyardgrass (ECHCG) control at 7 DAT and 14 DAT when BFL (racemic) was applied alone or as a tank-mix with fenoxaprop-P-ethyl in post-emergent tests. Comparative data for diflufenican (another WSSA Group 12 herbicide) are also shown.

| Treatment | Rate g ai/ha | 7 DAT | 14 DAT |
|---|---|---|---|
| Non-treated check | — | 0 | 0 |
| BFL | 94 | 2 | 0 |
| Diflufenican | 50 | 3 | 2 |
| Diflufenican | 100 | 2 | 4 |
| Fenoxaprop-P-ethyl | 12.5 | 70 | 82 |
| Fenoxaprop-P-ethyl | 25 | 89 | 98 |
| BFL + fenoxaprop-P-ethyl | 94 + 12.5 | 75 | 87* |
| BFL + fenoxaprop-P-ethyl | 94 + 25 | 90 | 98 |
| Diflufenican + fenoxaprop-P-ethyl | 50 + 12.5 | 73 | 92 |
| Diflufenican + fenoxaprop-P-ethyl | 100 + 12.5 | 80 | 94 |
| Diflufenican + fenoxaprop-P-ethyl | 50 + 25 | 92 | 98 |
| Diflufenican + fenoxaprop-P-ethyl | 100 + 25 | 91 | 100 |

Table 37 summarizes the percentage of barnyardgrass (ECHCG) control at 7 DAT, 14 DAT and 21 DAT when BFL (racemic) was applied alone or as a tank-mix with metamifop in pre-emergent tests. Comparative data for diflufenican (another WSSA-Group 12 herbicide) are also shown.

| Treatment | Rate g ai/ha | Littleseed canarygrass PHAMI | Barnyard-grass ECHCG | Wheat | Rice | Corn |
|---|---|---|---|---|---|---|
| Non-treated | — | 0 | 0 | 0 | 0 | 0 |
| BFL | 94 | 16 | 2 | 1 | 0 | 1 |
| BFL | 125 | 14 | 4 | 3 | 3 | 2 |
| BFL | 250 | 11 | 4 | 9 | 2 | 2 |
| Clethodim | 5.7 | 3 | 6 | 6 | 2 | 12 |
| Clethodim | 11.5 | 53 | 35 | 16 | 23 | 43 |
| Clethodim | 23.2 | 91 | 66 | 12 | 23 | 78 |
| BFL + Clethodim | 94 + 5.7 | 19 | 11 | 12 | 15 | 10 |
| BFL + Clethodim | 94 + 11.5 | 46 | 45* | 26 | 14 | 60 |
| BFL + Clethodim | 94 + 23.2 | 97 | 59 | 21 | 63 | 74 |
| BFL + Clethodim | 125 + 5.7 | 8 | 10 | 16 | 7 | 3 |
| BFL + Clethodim | 125 + 11.5 | 26 | 58* | 22 | 36 | 47 |
| BFL + Clethodim | 125 + 23.2 | 93 | 79* | 11 | 40 | 31 |
| Diflufencan | 50 | 2 | 6 | 5 | 3 | 1 |
| Dilflufencan | 100 | 17 | 6 | 22 | 3 | 5 |
| Diflufencan + Clethodim | 50 + 5.7 | 9 | 6 | 17 |  | 77 |
| Diflufencan + Clethodim | 50 + 11.5 | 52 | 20 | 15 | 36 | 56 |
| Diflufencan + Clethodim | 50 + 23.2 | 95 | 50 | 18 | 53 | 61 |
| Diflufencan + Clethodim | 100 + 5.7 | 10 | 10 | 15 | 10 | 16 |
| Diflufencan + Clethodim | 100 + 11.5 | 8 | 11 | 21 | 10 | 11 |
| Diflufencan + Clethodim | 100 + 23.2 | 94 | 61 | 25 | 46 | 67 |

| Treatment | Rate g ai/ha | 7 DAT | 14 DAT | 21 DAT |
|---|---|---|---|---|
| Non-treated check | — | 0 | 0 | 0 |
| BFL | 94 | 2 | 0 | 1 |
| Diflufencan | 50 | 3 | 2 | 2 |
| Diflufencan | 100 | 2 | 4 | 2 |
| Metamifop | 10 | 3 | 4 | 3 |
| Metamifop | 20 | 60 | 82 | 81 |
| BFL + metamifop | 94 + 10 | 8 | 4 | 4 |
| BFL + metamifop | 94 + 20 | 78* | 97* | 99* |
| Diflufencan + metamifop | 50 + 10 | 3 | 6 | 4 |
| Diflufencan + metamifop | 100 + 10 | 3 | 3 | 7 |
| Diflufencan + metamifop | 50 + 20 | 71 | 85 | 82 |
| Diflufencan + metamifop | 100 + 20 | 71 | 87 | 84 |

Figure 4:
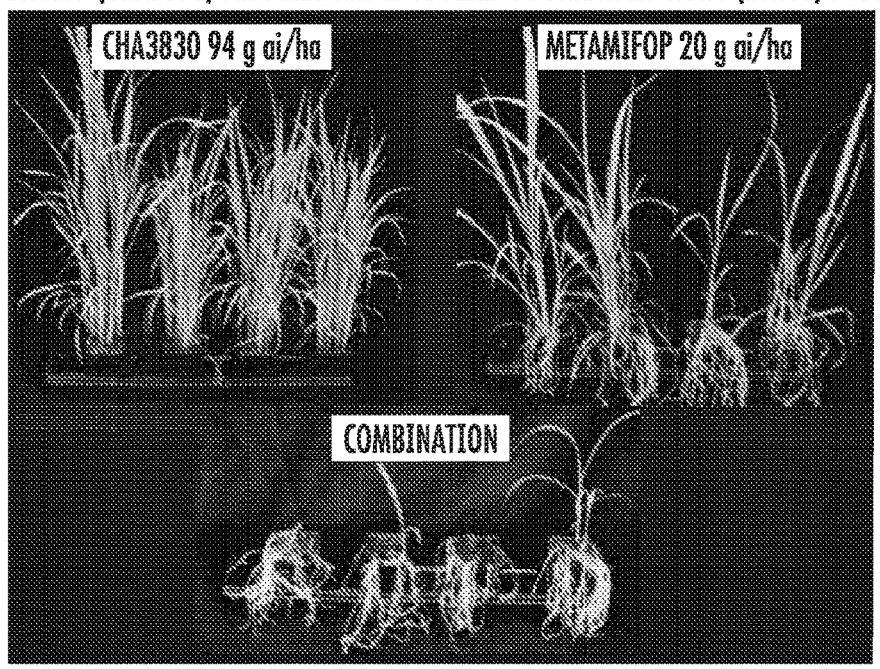
FIG. 4 shows a photograph of barnyardgrass as treated with beflubutamid (CHA3830), treated with metamifop, and treated with a combination of the two herbicides.

FIG. 4 shows an enhanced effect of the combined use of beflubutamid and Metamifop in the control of barnyardgrass.

Table 38 summarizes the percentage of weed control at 28 DAT when BFL (racemic) was applied alone or as a tank-mix with either 2,4-D or dicamba in post-emergent tests. Comparative data for diflufenican (another WSSA Group 12 herbicide) are shown.

| Treatment | Rate g ai/ha | Scentless chamomile MATIN | Common purslane POROL | Common lambsquarters CHEAL | Common waterhemp AMATA |
|---|---|---|---|---|---|
| Non treated | — | 0 | 0 | 0 | 0 |
| BFL | 94 | 2 | 6 | 11 | 14 |
| BFL | 125 | 2 | 5 | 8 | 21 |
| Diflufenican | 50 | 2 | 21 | 15 | 73 |
| Diflufenican | 100 | 2 | 29 | 5 | 91 |
| Dicamba | 8.75 | 3 | 11 | 10 | 19 |
| Dicamba | 17.5 | 4 | 12 | 32 | 24 |
| Dicamba | 35 | 4 | 38 | 47 | 61 |
| 2,4-D | 33.5 | 2 | 3 | 65 | 11 |
| 2,4-D | 67 | 2 | 6 | 62 | 25 |
| 2,4-D | 134 | 4 | 21 | 80 | 75 |
| BFL + dicamba | 94 + 8.75 | 4 | 7 | 36* | 43* |
| BFL + dicamba | 94 + 17.5 | 4 | 34* | 40 | 45* |
| BFL + dicamba | 94 + 35 | 3 | 61* | 70* | 68 |
| BFL + dicamba | 125 + 8.75 | 9 | 31* | 55* | 56* |
| BFL + dicamba | 125 + 17.5 | 11 | 66* | 64* | 66* |
| BFL + dicamba | 125 + 35 | 11 | 61* | 74* | 71 |
| Diflufenican + dicamba | 50 + 8.75 | 7 | 44 | 52 | 88 |
| Diflufenican + dicamba | 50 + 17.5 | 11 | 64 | 57 | 85 |
| Diflufenican + dicamba | 50 + 35 | 5 | 61 | 47 | 94 |
| Diflufenican + dicamba | 100 + 8.75 | 11 | 61 | 49 | 87 |
| Diflufenican + dicamba | 100 + 17.5 | 9 | 59 | 55 | 95 |
| Diflufenican + dicamba | 100 + 35 | 6 | 86 | 67 | 94 |
| BFL + 2,4-D | 94 + 33.5 | 7 | 31* | 64 | 74* |
| BFL + 2,4-D | 94 + 67 | 7 | 8 | 79* | 73* |
| BFL + 2,4-D | 94 + 134 | 11 | 29 | 79 | 80 |
| BFL + 2,4-D | 125 + 33.5 | 11 | 34* | 71 | 71* |
| BFL + 2,4-D | 125 + 67 | 8 | 41* | 75* | 88* |
| BFL + 2,4-D | 125 + 134 | 7 | 39* | 83 | 86 |
| Diflufenican + 2,4-D | 50 + 33.5 | 9 | 28 | 55 | 98 |
| Diflufenican + 2,4-D | 50 + 67 | 6 | 44 | 77 | 100 |
| Diflufenican + 2,4-D | 50 + 134 | 5 | 34 | 77 | 100 |
| Diflufenican + 2,4-D | 100 + 33.5 | 12 | 55 | 49 | 100 |
| Diflufenican + 2,4-D | 100 + 67 | 8 | 51 | 70 | 100 |
| Diflufenican + 2,4-D | 100 + 134 | 32 | 60 | 75 | 100 |

Table 39 summarizes the percentage of weed control at 21 DAT when BFL (racemic) was applied alone or as a tank-mix with imazethapyr in pre-emergent tests.

| Treatment | Rate g ai/ha | Barnyard-grass ECHCG | Jimson-weed DATST | Common lambsquarters CHEAL | Redroot pigweed AMARE |
|---|---|---|---|---|---|
| Non-treated check | — | 0 | 0 | 0 | 0 |
| BFL | 94 | 13 | 24 | 31 | 94 |
| BFL | 125 | 26 | 48 | 80 | 97 |
| BFL | 250 | 63 | 90 | 97 | 100 |
| Imazethapyr | 6.5 | 7 | 13 | 13 | 3 |
| Imazethapyr | 13.1 | 4 | 10 | 23 | 0 |
| Imazethapyr | 26.2 | 4 | 20 | 33 | 25 |
| BFL + Imazethapyr | 94 + 6.5 | 28* | 21 | 71* | 79 |
| BFL + Imazethapyr | 94 + 13.1 | 28* | 26 | 54* | 67 |
| BFL + Imazethapyr | 94 + 26.2 | 35* | 40 | 60* | 91 |

-continued

| Treatment | Rate g ai/ha | Barnyard-grass ECHCG | Jimson-weed DATST | Common lambsquarters CHEAL | Redroot pigweed AMARE |
|---|---|---|---|---|---|
| Non-treated check | — | 0 | 0 | 0 | 0 |
| BFL + Imazethapyr | 125 + 6.5 | 48* | 64* | 91* | 98 |
| BFL + Imazethapyr | 125 + 13.1 | 52* | 50 | 85 | 95 |
| BFL + Imazethapyr | 125 + 26.2 | 53* | 57 | 79 | 94 |

Table 40 summarizes the percentage of annual bluegrasee (POAAN) control at 14 DAT, 21 DAT and 28 DAT when BFL (racemic) was applied alone or as a tank-mix with prosulfocarb in pre-emergent tests. Comparative data for diflufenican (another WSSA Group 12 herbicide) are also shown.

| Treatment | Rate g ai/ha | Annual Bluegrass (POAAN) 14 DAT | 21 DAT | 28 DAT |
|---|---|---|---|---|
| Non-treated check | — | 0 | 0 | 0 |
| BFL | 94 | 10 | 3 | 1 |
| BFL | 125 | 26 | 8 | 4 |
| Diflufenican | 50 | 38 | 24 | 11 |
| Diflufenican | 100 | 66 | 67 | 50 |
| Prosulfocarb | 500 | 35 | 28 | 25 |
| Prosulfocarb | 750 | 65 | 67 | 65 |
| Prosulfocarb | 1000 | 63 | 76 | 71 |
| BFL + prosulfocarb | 94 + 500 | 25 | 20 | 22 |
| BFL + prosulfocarb | 94 + 750 | 37 | 20 | 14 |
| BFL + prosulfocarb | 94 + 1000 | 75* | 82* | 74 |
| BFL + prosulfocarb | 125 + 500 | 55 | 44* | 30 |
| BFL + prosulfocarb | 125 + 750 | 68 | 62 | 51 |
| BFL + prosulfocarb | 125 + 1000 | 84* | 81 | 69 |
| Diflufenican + prosulfocarb | 50 + 500 | 74 | 64 | 57 |
| Diflufenican + prosulfocarb | 50 + 750 | 75 | 70 | 70 |
| Diflufenican + prosulfocarb | 50 + 1000 | 78 | 82 | 75 |
| Diflufenican + prosulfocarb | 100 + 500 | 85 | 84 | 81 |
| Diflufenican + prosulfocarb | 100 + 750 | 83 | 87 | 75 |
| Diflufenican + prosulfocarb | 100 + 1000 | 91 | 95 | 92 |

Table 41 summarizes the percentage of weed control at 28 DAT when BFL (racemic) was applied alone or as a tank-mix with flumioxazin in pret-emergent tests. Comparative data for diflufenican (another WSSA Group 12 herbicide) are also shown.

| Treatment | Rate g ai/ha | Common chickweed STEME | Goose-grass ELEIN | Large crabgrass DIGSA | Barnyard-grass ECHCG | Common wateremp AMATA |
|---|---|---|---|---|---|---|
| Non-treated check | — | 0 | 0 | 0 | 0 | 0 |
| BFL | 94 | 14 | 30 | 77 | 19 | 73 |
| BFL | 125 | 25 | 56 | 88 | 31 | 70 |
| BFL | 250 | 61 | 73 | 89 | 65 | 94 |
| Flumioxazin | 8.9 | 45 | 51 | 66 | 41 | 95 |
| Flumioxazin | 17.8 | 61 | 71 | 76 | 58 | 100 |
| Flumioxazin | 35.6 | 90 | 90 | 98 | 84 | 100 |
| BFL + flumioxazin | 94 + 8.9 | 56 | 53 | 73 | 48 | 100 |
| BFL + flumioxazin | 94 + 17.8 | 74* | 78 | 90 | 65 | 100 |
| BFL + flumioxazin | 94 + 35.6 | 95 | 95 | 100 | 88 | 100 |
| BFL + flumioxazin | 125 + 8.9 | 48 | 55 | 80 | 48 | 100 |
| BFL + flumioxazin | 125 + 17.8 | 80* | 79 | 100 | 64 | 100 |
| BFL + flumioxazin | 125 + 35.6 | 100* | 100 | 100 | 91 | 100 |
| Diflufenican | 50 | 10 | 82 | 71 | 40 | 93 |
| Diflufenican | 100 | 48 | 100 | 100 | 68 | 100 |
| Diflufenican + flumioxazin | 50 + 8.9 | 55 | 65 | 67 | 45 | 100 |
| Diflufenican + flumioxazin | 50 + 17.8 | 70 | 87 | 100 | 66 | 100 |
| Diflufenican + flumioxazin | 50 + 35.6 | 83 | 100 | 100 | 96 | 100 |
| Diflufenican + flumioxazin | 100 + 8.9 | 50 | 77 | 86 | 55 | 100 |
| Diflufenican + flumioxazin | 100 + 17.8 | 91 | 100 | 100 | 78 | 100 |
| Diflufenican + flumioxazin | 100 + 35.6 | 100 | 100 | 100 | 100 | 100 |

Table 42 summarizes the percentage of weed control at 28 DAT when BFL (racemic) was applied alone or as a tank-mix with fomesafen C in post-emergent tests.

| Treatment | Rate g ai/ha | Canada thistle CIRAR | Common waterhemp AMATA | Common ragweed AMBEL | Kochia KCHSC | Common lambsqaurters CHEAL |
|---|---|---|---|---|---|---|
| Non treated | — | 0 | 0 | 0 | 0 | 0 |
| BFL | 94 | 10 | 22 | 11 | 7 | 4 |
| Diflufenican | 50 | 10 | 68 | 18 | 7 | 11 |
| Diflufenican | 100 | 7 | 60 | 21 | 9 | 11 |
| Fomesafen | 33 | 11 | 18 | 20 | 8 | 25 |
| Fomesafen | 66 | 10 | 62 | 5 | 10 | 13 |
| BFL + fomesafen | 94 + 33 | 21 | 17 | 12 | 10 | 7 |
| BFL + fomesafen | 94 + 66 | 15 | 83* | 37* | 10 | 14 |
| Diflufenican + fomesafen | 50 + 33 | 13 | 65 | 30 | 9 | 7 |
| Diflufenican + fomesafen | 50 + 66 | 14 | 70 | 16 | 8 | 4 |
| Diflufenican + fomesafen | 100 + 33 | 11 | 63 | 27 | 11 | 8 |
| Diflufenican + fomesafen | 100 + 66 | 16 | 73 | 38 | 10 | 9 |

Table 43 summarizes the percentage of crop injury and weed control at 28 DAT when BFL (racemic) was applied alone or as a tank-mix with oxyfluorfen in pre-emergent tests.

| Treatment | Rate g ai/ha | Yellow nutsedge CYPES | Velvet-leaf ABUTH | Redroot pigweed AMARE | Barnyard-grass ECHCG | Goose-grass ELEIN | Johnson-grass SORHA | Rice ORYSA |
|---|---|---|---|---|---|---|---|---|
| Non treated | — | 0 | 0 | 0 | 0 | 0 | 0 | 0 |
| BFL | 94 | 5 | 7 | 52 | 20 | 50 | 17 | 7 |
| BFL | 125 | 8 | 7 | 45 | 55 | 85 | 13 | 5 |
| BFL | 250 | 2 | 17 | 84 | 97 | 95 | 23 | 7 |
| Oxyfluorfen | 35 | 13 | 12 | 54 | 5 | 95 | 10 | 5 |
| Oxyfluorfen | 70 | 4 | 14 | 92 | 37 | 99 | 30 | 7 |
| Oxyfluorfen | 140 | 7 | 15 | 99 | 95 | 100 | 62 | 7 |
| BFL + oxyfluorfen | 94 + 35 | 5 | 12 | 45 | 22 | 65 | 17 | 5 |
| BFL + oxyfluorfen | 94 + 70 | 11 | 15 | 90 | 45 | 99 | 42* | 8 |
| BFL + oxyfluorfen | 94 + 140 | 33* | 33* | 93* | 88 | 100 | 68* | 5 |
| BFL + oxyfluorfen | 125 + 35 | 16 | 8 | 76 | 58 | 95 | 15 | 7 |
| BFL + oxyfluorfen | 125 + 70 | 7 | 24 | 82 | 77 | 100 | 52 | 7 |
| BFL + oxyfluorfen | 125 + 140 | 21 | 20 | 99 | 96 | 100 | 93 | 7 |

Table 44 summarizes the percentage of weed control at 21 DAT when BFL (racemic) was applied alone or as a tank-mix with saflufenacil in post-emergent tests. Comparative data for diflufenican (another WSSA Group 12 herbicide) are also shown.

| Treatment | Rate g ai/ha | Common purslane POROL | Redroot pigweed AMARE | Scentless chamomile MATIN | Canada thistle CIRAR |
|---|---|---|---|---|---|
| Non treated | — | 0 | 0 | 0 | 0 |
| BFL | 94 | 14 | 12 | 17 | 11 |
| BFL | 125 | 21 | 21 | 9 | 17 |
| Saflufenacil | 1.5 | 7 | 4 | 5 | 4 |
| Saflufenacil | 3 | 8 | 12 | 6 | 4 |
| Saflufenacil | 6 | 13 | 23 | 17 | 9 |
| BFL + saflufenacil | 94 + 1.5 | 25 | 33* | 8 | 14 |
| BFL + saflufenacil | 94 + 3 | 39* | 45* | 10 | 13 |
| BFL + saflufenacil | 94 + 6 | 40* | 48* | 17 | 11 |
| BFL + saflufenacil | 125 + 1.5 | 41* | 50* | 14 | 19 |
| BFL + saflufenacil | 125 + 3 | 43* | 62* | 16 | 19 |
| BFL + saflufenacil | 125 + 6 | 50* | 48 | 11 | 27 |
| Diflufenican | 50 | 21 | 68 | 19 | 11 |
| Diflufenican | 100 | 49 | 67 | 19 | 9 |
| Diflufenican + saflufenacil | 50 + 1.5 | 36 | 35 | 12 | 12 |
| Diflufenican + saflufenacil | 50 + 3 | 29 | 77 | 12 | 13 |
| Diflufenican + saflufenacil | 50 + 6 | 36 | 58 | 11 | 22 |
| Diflufenican + saflufenacil | 100 + 1.5 | 49 | 82 | 11 | 16 |

-continued

| Treatment | Rate g ai/ha | Common purslane POROL | Redroot pigweed AMARE | Scentless chamomile MATIN | Canada thistle CIRAR |
|---|---|---|---|---|---|
| Non treated | — | 0 | 0 | 0 | 0 |
| Diflufenican + saflufenacil | 100 + 3 | 51 | 87 | 12 | 15 |
| Diflufenican + saflufenacil | 100 + 6 | 56 | 93 | 43 | 16 |

Table 45 summarizes the percentage of weed control at 28 DAT when BFL (racemic) was applied alone or as a tank-mix with sulfentrazone in pre-emergent tests.

| Treatment | Rate g ai/ha | Cocklebur XANST | Yellow nutsedge CYPES | Redroot pigweed AMARE | Velvet-leaf ABUTH | Barnyard-grass ECHCG | Goose-grass ELEIN | Johnson-grass SORHA |
|---|---|---|---|---|---|---|---|---|
| Non-treated | — | 0 | 0 | 0 | 0 | 0 | 0 | 0 |
| BFL | 94 | 36 | 0 | 66 | 26 | 51 | 79 | 38 |
| BFL | 125 | 25 | 0 | 92 | 0 | 84 | 95 | 39 |
| BFL | 250 | 50 | 1 | 95 | 48 | 86 | 96 | 78 |
| Sulfentrazone | 25 | 41 | 51 | 100 | 60 | 54 | 57 | 80 |
| Sulfentrazone | 50 | 86 | 80 | 100 | 100 | 95 | 93 | 94 |
| Sulfentrazone | 75 | 90 | 91 | 100 | 96 | 97 | 97 | 98 |
| BFL + Sulfentrazone | 94 + 25 | 16 | 48 | 99 | 52 | 76 | 68 | 86 |
| BFL + Sulfentrazone | 125 + 25 | 53 | 65* | 100 | 72* | 61 | 68 | 77 |
| BFL + Sulfentrazone | 94 + 50 | 43 | 72 | 100 | 87 | 85 | 83 | 95 |
| BFL + Sulfentrazone | 125 + 50 | 70 | 74 | 100 | 92 | 95 | 87 | 92 |
| BFL + Sulfentrazone | 94 + 75 | 87 | 93 | 100 | 93 | 95 | 96 | 98 |
| BFL + Sulfentrazone | 125 + 75 | 87 | 76 | 100 | 97 | 94 | 95 | 94 |

Table 46 summarizes the percentage of weed control at 28 DAT when BFL (racemic) was applied alone or as a tank-mix with diflufenican in pre-emergent tests.

| Treatment | Rate g ai/ha | Barnyard-grass ECHCG | Volunteer Canola BRSNN | Common Lambsquarters CHEAL | Common Chickweed STEME |
|---|---|---|---|---|---|
| Non treated | — | 0 | 0 | 0 | 0 |
| BFL | 94 | 40 | 10 | 28 | 20 |
| BFL | 125 | 77 | 38 | 84 | 38 |
| BFL | 250 | 84 | 48 | 98 | 73 |
| Diflufenican | 25 | 23 | 25 | 64 | 10 |
| Diflufenican | 50 | 74 | 20 | 96 | 46 |
| Diflufenican | 100 | 83 | 53 | 99 | 70 |
| BFL + diflufenican | 94 + 25 | 75* | 17 | 92* | 32 |
| BFL + diflufenican | 94 + 50 | 83 | 52 | 98 | 67* |
| BFL + diflufenican | 94 + 100 | 92 | 55* | 100 | 97* |
| BFL + diflufenican | 125 + 25 | 76 | 60 | 99 | 92* |
| BFL + diflufenican | 125 + 50 | 87 | 32 | 99 | 68 |
| BFL + diflufenican | 125 + 100 | 87 | 27 | 100 | 97* |

Table 47 summarizes the percentage of crop injury and weed control at 28 DAT when BFL (racemic) was applied alone or as a tank-mix with trifluralin in pre-emergent tests.

| Treatment | Rate g ai/ha | Green foxtail SETVI | Barnyard-grass ECHCG | Large crabgrass DIGSA | Black-grass ALOMY | Wheat |
|---|---|---|---|---|---|---|
| Untreated control | — | 0 | 0 | 0 | 0 | 0 |
| BFL | 94 | 100 | 27 | 92 | 8 | 1 |
| BFL | 125 | 99 | 52 | 94 | 1 | 5 |
| BFL | 250 | 100 | 99 | 99 | 19 | 6 |
| Trifluralin | 210 | 77 | 91 | 61 | 21 | 4 |
| Trifluralin | 420 | 99 | 98 | 93 | 63 | 19 |
| Trifluralin | 840 | 100 | 99 | 99 | 78 | 22 |
| BFL + trifluralin | 94 + 210 | 100 | 87 | 96 | 43 | 12 |
| BFL + trifluralin | 125 + 210 | 100 | 90 | 100 | 45 | 9 |

-continued

| Treatment | Rate g ai/ha | Green foxtail SETVI | Barnyard-grass ECHCG | Large crabgrass DIGSA | Black-grass ALOMY | Wheat |
|---|---|---|---|---|---|---|
| Untreated control | — | 0 | 0 | 0 | 0 | 0 |
| BFL + trifluralin | 94 + 420 | 99 | 99 | 99 | 85* | 8 |
| BFL + trifluralin | 125 + 420 | 100 | 100 | 100 | 96 | 13 |
| BFL + trifluralin | 94 + 840 | 100 | 100 | 100 | 96* | 20 |
| BFL + trifluralin | 125 + 840 | 100 | 100 | 100 | 99 | 4 |

Table 48 summarizes the percentage of weed control at 28 DAT when BFL (racemic) was applied alone or as a tank-mix with trifluralin in pre-emergent tests.

| Treatment | Rate g ai/ha | Black-grass ALOMY | Barnyard grass ECHCG |
|---|---|---|---|
| Non treated | — | 0 | 0 |
| BFL | 94 | 14 | 22 |
| BFL | 125 | 23 | 35 |
| Trifluralin | 105 | 20 | 49 |
| Trifluralin | 157.5 | 22 | 32 |
| Trifluralin | 210 | 17 | 13 |
| BFL + trifluralin | 94 + 105 | 13 | 20 |
| BFL + trifluralin | 94 + 157.5 | 47* | 38 |
| BFL + trifluralin | 94 + 210 | 20 | 87* |
| BFL + trifluralin | 125 + 105 | 18 | 48 |
| BFL + trifluralin | 125 + 157.5 | 17 | 50 |
| BFL + trifluralin | 125 + 210 | 50* | 72* |

Table 49 summarizes the percentage of weed control at 28 DAT when BFL (racemic) was applied alone or as a tank-mix with bromoxynil in post-emergent tests.

| Treatment | Rate g ai/ha | Canada thistle CIRAR | Common waterhemp AMATA | Common ragweed XANST | Kochia KCHSC | Common lambsqaurters CHEAL |
|---|---|---|---|---|---|---|
| Non treated | — | 0 | 0 | 0 | 0 | 0 |
| BFL | 94 | 10 | 22 | 11 | 7 | 4 |
| Diflufenican | 50 | 10 | 68 | 18 | 7 | 11 |
| Diflufenican | 100 | 7 | 60 | 21 | 9 | 11 |
| Bromoxynil | 35 | 9 | 3 | 8 | 7 | 7 |
| Bromoxynil | 70 | 24 | 3 | 12 | 9 | 5 |
| BFL + bromoxynil | 94 + 35 | 22 | 19 | 16 | 7 | 9 |
| BFL + bromoxynil | 94 + 70 | 64* | 18 | 12 | 11 | 7 |
| Diflufenican + bromoxynil | 50 + 35 | 61 | 83 | 45 | 8 | 9 |
| Diflufenican + bromoxynil | 50 + 70 | 30 | 78 | 38 | 8 | 9 |
| Diflufenican + bromoxynil | 100 + 35 | 24 | 56 | 19 | 8 | 6 |
| Diflufenican + bromoxynil | 100 + 70 | 22 | 84 | 42 | 10 | 7 |

It is understood that there may be variations from the specific embodiments describe herein without departing from the spirit or concept of the present invention as defined in the following claims.

The invention claimed is:

1. A herbicidal composition containing a first herbicide beflubutamid (BFL), or an optically enriched form thereof, and a second herbicide, wherein the second herbicide is selected from 2-(2,4-dichlorophenyl)methyl-4,4-dimethyl-3-isoxazolidinone (DCI); including isomers and/or $C_{1-8}$-alkyl esters and/or salts thereof, and wherein the BFL and DCI together yields better weed control in comparison to either BFL alone or DCI alone.

2. The herbicidal composition according to claim 1, wherein the first herbicide is beflubutamid enriched with respect to the (−)-enantiomer.

3. The herbicidal composition of claim 1 further comprising at least one formulation component selected from formulation agents for emulsifiable concentrate formulations, formulation agents for suspension concentrate formulations, and formulation agents for capsule suspension formulations.

4. A method of controlling undesired vegetation in a crop, wherein the method includes applying to the locus of said vegetation a herbicidally effective amount of the herbicidal composition according to claim 1.

5. The method according to claim 4, wherein the undesired vegetation is present together with a crop selected from wheat, barley, rye, triticale, corn, soybean and rice.

6. The method according to claim 4, wherein the herbicidal composition comprising beflubutamid in combination with 2-(2,4-dichlorophenyl)methyl-4,4-dimethyl-3-isoxazolidinone, and wherein beflubutamid is applied in an amount of 30-400 g ai/ha, 45-320 g ai/ha, or 60-250 g ai/ha, and 2-(2,4-dichlorophenyl)methyl-4,4-dimethyl-3-isoxazolidinone is applied in an amount of 10-500 g ai/ha, 45-400 g ai/ha, or 20-300 g ai/ha.

7. The herbicidal composition of claim 2 further comprising at least one formulation component selected from formulation agents for emulsifiable concentrate formulations, formulation agents for suspension concentrate formulations, and formulation agents for capsule suspension formulations.

8. A method of controlling undesired vegetation in a crop, wherein the method includes applying to the locus of said vegetation a herbicidally effective amount of the herbicidal composition according to claim 2.

9. A method of controlling undesired vegetation in a crop, wherein the method includes applying to the locus of said vegetation a herbicidally effective amount of the herbicidal composition according to claim 3.

10. The method according to claim 8, wherein the undesired vegetation is present together with a crop selected from wheat, barley, rye, triticale, corn, soybean and rice.

11. The method according to claim 9, wherein the undesired vegetation is present together with a crop selected from wheat, barley, rye, triticale, corn, soybean and rice.

12. The method according to claim 5, wherein the herbicidal composition comprising beflubutamid in combination with 2-(2,4-dichlorophenyl)methyl-4,4-dimethyl-3-isoxazolidinone, and wherein beflubutamid is applied in an amount of 30-400 g ai/ha, 45-320 g ai/ha, or 60-250 g ai/ha, and 2-(2,4-dichlorophenyl)methyl-4,4-dimethyl-3-isoxazolidinone is applied in an amount of 10-500 g ai/ha, 45-400 g ai/ha, or 20-300 g ai/ha.

13. The method according to claim 10, wherein the herbicidal composition comprising beflubutamid in combination with 2-(2,4-dichlorophenyl)methyl-4,4-dimethyl-3-isoxazolidinone, and wherein beflubutamid is applied in an amount of 30-400 g ai/ha, 45-320 g ai/ha, or 60-250 g ai/ha, and 2-(2,4-dichlorophenyl)methyl-4,4-dimethyl-3-isoxazolidinone is applied in an amount of 10-500 g ai/ha, 45-400 g ai/ha, or 20-300 g ai/ha.

14. The method according to claim 11, wherein the herbicidal composition comprising beflubutamid in combination with 2-(2,4-dichlorophenyl)methyl-4,4-dimethyl-3-isoxazolidinone, and wherein beflubutamid is applied in an amount of 30-400 g ai/ha, 45-320 g ai/ha, or 60-250 g ai/ha, and 2-(2,4-dichlorophenyl)methyl-4,4-dimethyl-3-isoxazolidinone is applied in an amount of 10-500 g ai/ha, 45-400 g ai/ha, or 20-300 g ai/ha.

\* \* \* \* \*